(12) United States Patent
Jia et al.

(10) Patent No.: US 11,899,281 B2
(45) Date of Patent: Feb. 13, 2024

(54) OPTICAL IMAGING LENS

(71) Applicant: ZHEJIANG SUNNY OPTICS CO., LTD., Zhejiang (CN)

(72) Inventors: Yuanlin Jia, Zhejiang (CN); Wuchao Xu, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 291 days.

(21) Appl. No.: 17/258,754

(22) PCT Filed: Jul. 11, 2019

(86) PCT No.: PCT/CN2019/095626
§ 371 (c)(1),
(2) Date: Jan. 8, 2021

(87) PCT Pub. No.: WO2020/191951
PCT Pub. Date: Oct. 1, 2020

(65) Prior Publication Data
US 2022/0365316 A1  Nov. 17, 2022

(30) Foreign Application Priority Data

Mar. 26, 2019 (CN) .......................... 201910231446.8

(51) Int. Cl.
*G02B 9/64* (2006.01)
(52) U.S. Cl.
CPC ..................... *G02B 9/64* (2013.01)
(58) Field of Classification Search
CPC ...................................... G02B 9/64

USPC ........................................................ 359/755
See application file for complete search history.

(56) References Cited

U.S. PATENT DOCUMENTS 3,804,493 A * 4/1974 Matsubara ............. G02B 13/00
359/755
7,848,032 B1  12/2010 Chen et al.

FOREIGN PATENT DOCUMENTS

| CN | 107272166 A | 10/2017 |
| CN | 107664813 A | 2/2018 |
| CN | 107797243 A | 3/2018 |
| CN | 109752826 A | 5/2019 |

* cited by examiner

*Primary Examiner* — Wyatt A Stoffa
*Assistant Examiner* — Mitchell T Oestreich
(74) *Attorney, Agent, or Firm* — Gang Yu

(57) ABSTRACT

An optical imaging lens sequentially includes, from an object side to an image side along an optical axis: a first lens (E1) with refractive power; a second lens (E2) with positive refractive power; a third lens (E3) with positive refractive power; a fourth lens (E4) with refractive power; a fifth lens (E5) with positive refractive power; a sixth lens (E6) with refractive power; and a seventh lens (E7) with refractive power. A total effective focal length f of the optical imaging lens and a curvature radius R4 of an image-side surface of the second lens meet $0.6<R4/f<1.5$. TTL is a distance from an object-side surface of the first lens to an imaging surface of the optical imaging lens on the optical axis, and ImgH is a half of a diagonal length of an effective pixel region on the imaging surface of the optical imaging lens, TTL and ImgH meet $0.55<TTL/(ImgH\times2)<0.75$.

20 Claims, 30 Drawing Sheets

OPTICAL IMAGING LENS

CROSS-REFERENCE TO RELATED APPLICATIONS

The disclosure claims priority to and the benefit of Chinese Patent Application No. 201910231446.8, filed in the China National Intellectual Property Administration (CHIPA) on Mar. 26, 2019, which is incorporated herein by reference in its entirety.

TECHNICAL FIELD

The disclosure relates to an optical imaging lens, and more particularly to an optical imaging lens including seven lenses.

BACKGROUND

Recently, with the booming of the field of smart phones, various major smart phone producers have made more new requirements on mobile phone lenses, and particularly for main cameras of high-end flagship phones, imaging lenses of mobile phones have been increasingly developed to large image surfaces, wide angles, large apertures and ultrathin designs, which poses greater challenges to design of optical systems.

Changes of these principal value parameters of a conventional mobile phone lens greatly improve imaging capabilities and competitive advantages of the mobile phone lens. A large image surface means a higher resolution. A wide angle means a larger field of view. A large aperture represents a higher effective luminous flux and a higher signal-to-noise ratio. An ultrathin design may achieve higher compatibility with a smart phone and make the smart phone convenient to carry. Based on these requirement challenges posed by mobile phone suppliers, a conventional five- or six-element lens structure cannot effectively meet these challenges, and seven lenses optical imaging lens systems may gradually become a mainstream.

SUMMARY

Some embodiments of the disclosure provide an optical imaging lens applicable to a portable electronic product and capable of at least overcoming or partially overcoming at least one shortcoming in a related art.

The disclosure provides an optical imaging lens, which may sequentially include, from an object side to an image side along an optical axis: a first lens with refractive power; a second lens with positive refractive power; a third lens with positive refractive power, wherein an image-side surface thereof is a convex surface; a fourth lens with refractive power, wherein an object-side surface thereof is a concave surface; a fifth lens with positive refractive power, wherein an object-side surface thereof is a concave surface; a sixth lens with refractive power; and a seventh lens with refractive power.

In an implementation mode, a total effective focal length f of the optical imaging lens and a curvature radius R4 of an image-side surface of the second lens may meet $0.6<R4/f<1.5$.

In an implementation mode, a maximum field of view (FOV) of the optical imaging lens may meet $FOV>90°$.

In an implementation mode, TTL is a distance from an object-side surface of the first lens to an imaging surface of the optical imaging lens on the optical axis, and ImgH is a half of a diagonal length of an effective pixel region on the imaging surface of the optical imaging lens, TTL and ImgH meet $0.55<TTL/(ImgH\times 2)<0.75$.

In an implementation mode, the total effective focal length f of the optical imaging lens and an effective focal length f2 of the second lens may meet $0<f/f2<0.8$.

In an implementation mode, the total effective focal length f of the optical imaging lens and an effective focal length f3 of the third lens may meet $0.2<f/f3<0.7$.

In an implementation mode, a maximum effective radius DT11 of the object-side surface of the first lens and a maximum effective radius DT71 of an object-side surface of the seventh lens may meet $0.2<DT11/DT71<0.7$.

In an implementation mode, a center thickness CT3 of the third lens on the optical axis and an air space T23 of the second lens and the third lens on the optical axis may meet $0.1<T23/CT3<0.9$.

In an implementation mode, an air space T12 of the first lens and the second lens on the optical axis and an air space T34 of the third lens and the fourth lens on the optical axis may meet $0<T12/T34<0.4$.

In an implementation mode, an effective focal length f5 of the fifth lens and a curvature radius R9 of the object-side surface of the fifth lens may meet $-1<f5/R9<0$.

In an implementation mode, a curvature radius R7 of the object-side surface of the fourth lens and a curvature radius R8 of an image-side surface of the fourth lens may meet $0<|R8-R7|/|R8+R7|\le 0.5$.

In an implementation mode, the total effective focal length f of the optical imaging lens and a curvature radius R6 of an image-side surface of the third lens may meet $-1<f/R6<-0.5$.

In an implementation mode, the total effective focal length f of the optical imaging lens and an entrance pupil diameter (EPD) of the optical imaging lens may meet $f/EPD<2$.

In an implementation mode, a curvature radius R13 of an object-side surface of the seventh lens and a curvature radius R14 of an image-side surface of the seventh lens may meet $0.4<R14/R13<0.9$.

According to the disclosure, the seven lenses are adopted, and the refractive power and surface types of each lens, the center thickness of each lens, on-axis distances between the lenses and the like are reasonably configured to achieve at least one beneficial effect of large image surface, wide angle, large aperture, ultrathin design and the like of the optical imaging lens.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
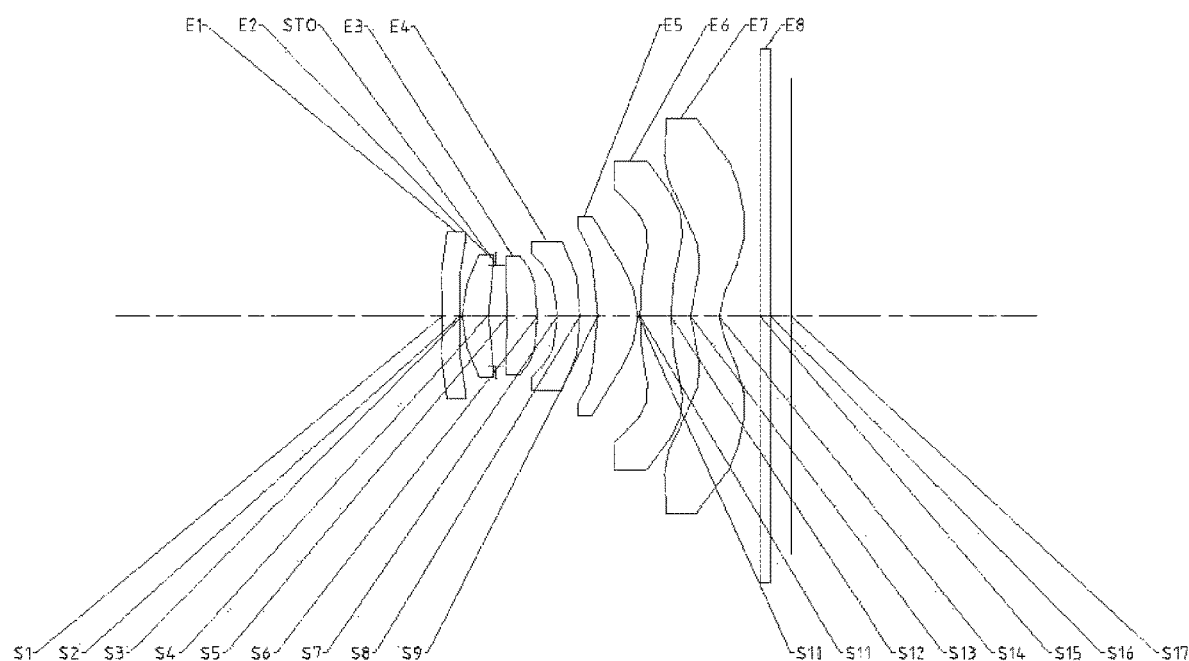
FIG. 1 shows a structure diagram of an optical imaging lens according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

An optical imaging lens according to an exemplary implementation mode of the disclosure may include, for example, seven lenses with refractive power, i.e., a first lens, a second lens, a third lens, a fourth lens, a fifth lens, a sixth lens and a seventh lens. The seven lenses are sequentially arranged from an object side to an image side along an optical axis.

In the first lens to the seventh lens, there may be an air space between any two adjacent lenses.

In an exemplary implementation mode, the first lens has positive refractive power or negative refractive power; the second lens may have positive refractive power; the third lens may have positive refractive power, and an image-side surface thereof may be a convex surface; the fourth lens has positive refractive power or negative refractive power, and an object-side surface thereof may be a concave surface; the fifth lens may have positive refractive power, and an object-side surface thereof may be a concave surface; the sixth lens has positive refractive power or negative refractive power; and the seventh lens has positive refractive power or negative refractive power. Surface types and refractive power of each lens in the first lens to the seventh lens are reasonably configured, so that the performance of an optical system may be ensured, meanwhile, the tolerance sensitivity is reduced, and relatively high mass productivity is achieved.

In the exemplary implementation mode, an object-side surface of the second lens may be a convex surface, while an image-side surface may be a concave surface.

In the exemplary implementation mode, an object-side surface of the third lens may be a convex surface.

In the exemplary implementation mode, the fourth lens may have negative refractive power, and an image-side surface may be a convex surface.

In the exemplary implementation mode, an image-side surface of the fifth lens may be a convex surface.

In the exemplary implementation mode, an image-side surface of the sixth lens may be a concave surface.

In the exemplary implementation mode, the seventh lens may have negative refractive power, an object-side surface thereof may be a convex surface, while an image-side surface may be a concave surface.

In the exemplary implementation mode, the optical imaging lens of the disclosure may meet a conditional expression $0.6 < R4/f < 1.5$, wherein f is a total effective focal length of the optical imaging lens, and R4 is a curvature radius of the image-side surface of the second lens. More specifically, R4 and f may further meet $0.82 \le R4/f \le 1.21$. Meeting the conditional expression $0.6 < R4/f < 1.5$ is met is favorable for obtaining a larger aperture angle and also favorable for correcting a spherical aberration.

In the exemplary implementation mode, the optical imaging lens of the disclosure may meet a conditional expression $FOV > 90°$, wherein FOV is a maximum field of view of the optical imaging lens. More specifically, FOV may further meet $90° < FOV < 120°$, for example, $97.3° \le FOV \le 112.3°$. When the conditional expression $FOV > 90°$, a larger field of view may be obtained, and the object information collection capability may be improved.

In the exemplary implementation mode, the optical imaging lens of the disclosure may meet a conditional expression $0.55 < TTL/(ImgH \times 2) < 0.75$, wherein TTL is a distance from an object-side surface of the first lens to an imaging surface on the optical axis, and ImgH is a half of a diagonal length of an effective pixel region on the imaging surface of the optical imaging lens. More specifically, TTL and ImgH may further meet $0.60 \le TTL/(ImgH \times 2) \le 0.68$. When the conditional expression $0.55 < TTL/(ImgH \times 2) < 0.75$ is met, requirements on a large image surface and an ultrathin design may be met at the same time.

In the exemplary implementation mode, the optical imaging lens of the disclosure may meet a conditional expression $0 < f/f2 < 0.8$, wherein f is the total effective focal length of the optical imaging lens, and f2 is an effective focal length of the second lens. More specifically, f and f2 may further meet $0.13 \le f/f2 \le 0.52$. Reasonably configuring the refractive power of the second lens is favorable for improving the field of view of the optical imaging lens and improving the object information collection capability.

In the exemplary implementation mode, the optical imaging lens of the disclosure may meet a conditional expression $0.2 < f/f3 < 0.7$, wherein f is the total effective focal length of the optical imaging lens, and f3 is an effective focal length of the third lens. More specifically, f and f3 may further meet $0.4 < f/f3 < 0.7$, for example, $0.53 \le f/f3 \le 0.59$. Reasonably configuring the refractive power of the third lens is favorable for correcting a chromatic dispersion of the optical imaging lens and also favorable for ensuring a compact structure of the optical imaging lens.

In the exemplary implementation mode, the optical imaging lens of the disclosure may meet a conditional expression $0.2 < DT11/DT71 < 0.7$, wherein DT11 is a maximum effective radius of the object-side surface of the first lens, and DT71 is a maximum effective radius of the object-side surface of the seventh lens. More specifically, DT11 and DT71 may further meet $0.3 < DT11/DT71 < 0.6$, for example, $0.44 \le DT11/DT71 \le 0.52$. The maximum effective radii of the first lens and the seventh lens may be reasonably configured to meet a machinability requirement.

In the exemplary implementation mode, the optical imaging lens of the disclosure may meet a conditional expression $0.1 < T23/CT3 < 0.9$, wherein CT3 is a center thickness of the third lens on the optical axis, and T23 is an air space of the second lens and the third lens on the optical axis. More specifically, T23 and CT3 may further meet $0.3 < T23/CT3 < 0.8$, for example, $0.48 \le T23/CT3 \le 0.64$. Meeting the conditional expression $0.1 < T23/CT3 < 0.9$ is favorable for ensuring the compact structure of the optical imaging lens and also favorable for reducing the sensitivity of T23 and CT3 to a field curvature.

In the exemplary implementation mode, the optical imaging lens of the disclosure may meet a conditional expression $0 < T12/T34 < 0.4$, wherein T12 is an air space of the first lens and the second lens on the optical axis, and T34 is an air space of the third lens and the fourth lens on the optical axis. More specifically, T12 and T34 may further meet $0.09 \le T12/T34 \le 0.26$. Meeting the conditional expression $0 < T12/T34 < 0.4$ is favorable for ensuring the compact structure of the optical imaging lens and meeting the requirement on the ultrathin design.

In the exemplary implementation mode, the optical imaging lens of the disclosure may meet a conditional expression $f/EPD < 2$, wherein f is the total effective focal length of the optical imaging lens, and EPD is an entrance pupil diameter of the optical imaging lens. More specifically, f and EPD may further meet $1.5 < f/EPD < 2$, for example, $1.80 \le f/EPD \le 1.95$. Meeting the conditional expression $f/EPD < 2$ is favorable for enlarging a relative aperture of the optical imaging lens, improving chip responsivity and achieving a higher imaging definition.

In the exemplary implementation mode, the optical imaging lens of the disclosure may meet a conditional expression $-1 < f5/R9 < 0$, wherein f5 is an effective focal length of the fifth lens, and R9 is a curvature radius of the object-side surface of the fifth lens. More specifically, f5 and R9 may further meet $-0.86 \le f5/R9 \le -0.33$. Reasonably configuring the refractive power of the fifth lens and the curvature radius of the object-side surface thereof is favorable for correcting the spherical aberration of the optical imaging lens and improving the imaging performance.

In the exemplary implementation mode, the optical imaging lens of the disclosure may meet a conditional expression 0<|R8−R7|/|R8+R7|≤0.5, wherein R7 is a curvature radius of the object-side surface of the fourth lens, and R8 is a curvature radius of the image-side surface of the fourth lens. More specifically, R8 and R7 may further meet 0.26≤|R8−R7|/|R8+R7|≤0.50. Configuring the curvature radii of the object-side surface and the image-side surface of the fourth lens is favorable for correcting an off-axis aberration of the optical imaging lens and also favorable for achieving the performance of large image surface and ultrathin design.

In the exemplary implementation mode, the optical imaging lens of the disclosure may meet a conditional expression −1<f/R6<−0.5, wherein f is the total effective focal length of the optical imaging lens, and R6 is a curvature radius of the image-side surface of the third lens. More specifically, f and R6 may further meet −0.89≤f/R6≤−0.73. Meeting the conditional expression −1<f/R6<−0.5 is favorable for correcting the spherical aberration and axial chromatic aberration of the optical imaging lens and improving the imaging quality.

In the exemplary implementation mode, the optical imaging lens of the disclosure may meet a conditional expression 0.4<R14/R13<0.9, wherein R13 is a curvature radius of the object-side surface of the seventh lens, and R14 is a curvature radius of the image-side surface of the seventh lens. More specifically, R13 and R14 may further meet 0.61≤R14/R13≤0.76. The curvature radii of the object-side surface and the image-side surface of the seventh lens may be reasonably configured to meet machinability and processability requirements of the seventh lens.

In the exemplary implementation mode, the optical imaging lens may further include at least one diaphragm. The diaphragm may be arranged at a proper position as required, for example, arranged between the second lens and the third lens. Optionally, the optical imaging lens may further include an optical filter configured to correct a chromatic aberration and/or protective glass configured to protect a photosensitive element on the imaging surface.

The optical imaging lens according to the implementation mode of the disclosure may adopt seven lenses, for example, the abovementioned seven lenses. The refractive power and surface types of each lens, a center thickness of each lens, on-axis distances between the lenses and the like are reasonably configured to effectively reduce the size of the imaging lens, reduce the sensitivity of the imaging lens, improve the machinability of the imaging lens and ensure that the optical imaging lens is more favorable for production and machining and applicable to a portable electronic product. The disclosure discloses a solution to a seven lenses. The lenses have the characteristics of large image surface, wide angle, large aperture, ultrathin design and the like and may be matched with a higher-resolution sensor and a stronger image processing technology.

In the implementation mode of the disclosure, at least one of mirror surfaces of each lens is an aspherical mirror surface, namely at least one of the object-side surface and the image-side surface of each lens in the first lens, the second lens, the third lens, the fourth lens, the fifth lens, the sixth lens and the seventh lens is an aspherical mirror surface. An aspherical lens has a characteristic that a curvature keeps changing from a center of the lens to a periphery of the lens. Unlike a spherical lens with a constant curvature from a center of the lens to a periphery of the lens, the aspherical lens has a better curvature radius characteristic and the advantages of improving distortions and improving astigmatic aberrations. With adoption of the aspherical lens, the astigmatic aberrations during imaging may be eliminated as much as possible, thereby improving the imaging quality. Optionally, both the object-side surface and the image-side surface of each lens in the first lens, the second lens, the third lens, the fourth lens, the fifth lens, the sixth lens and the seventh lens are aspherical mirror surfaces.

However, those skilled in the art should know that the number of the lenses forming the optical imaging lens may be changed without departing from the technical solutions claimed in the disclosure to achieve each result and advantage described in the specification. For example, although descriptions are made in the implementation with seven lenses as an example, the optical imaging lens is not limited to seven lenses. If necessary, the optical imaging lens may further include another number of lenses.

Specific embodiments of the optical imaging lens applied to the abovementioned implementation mode will further be described below with reference to the drawings.

Embodiment 1

An optical imaging lens according to embodiment 1 of the disclosure will be described below with reference to FIG. 1 to FIG. 2D. FIG. 1 shows a structure diagram of an optical imaging lens according to embodiment 1 of the disclosure.

As shown in FIG. 1, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a concave surface, while an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has negative refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 1 is a basic parameter table of the optical imaging lens of embodiment 1, and units of the curvature radius, the thickness and the focal length are all millimeter (mm).

TABLE 1

Embodiment 1: f = 4.40 mm, TTL = 6.87 mm, ImgH = 5.35 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| S1 | Aspherical | −13.3669 | 0.3502 | 1.65 | 23.53 | 49.45 | −95.0000 |
| S2 | Aspherical | −9.5140 | 0.0400 | | | | −95.0000 |
| S3 | Aspherical | 2.6868 | 0.5109 | 1.55 | 56.11 | 12.13 | −1.2831 |
| S4 | Aspherical | 4.2168 | 0.1567 | | | | −52.3298 |
| STO | Spherical | Infinite | 0.2202 | | | | |
| S5 | Aspherical | 15.5893 | 0.5891 | 1.55 | 56.11 | 8.05 | −93.5821 |
| S6 | Aspherical | −6.0343 | 0.3909 | | | | 16.6054 |
| S7 | Aspherical | −4.2473 | 0.4399 | 1.68 | 19.25 | −9.57 | 6.2168 |
| S8 | Aspherical | −12.8183 | 0.3628 | | | | 26.0596 |
| S9 | Aspherical | −7.1132 | 0.7936 | 1.55 | 56.11 | 4.05 | 11.2594 |
| S10 | Aspherical | −1.7523 | 0.0100 | | | | −2.9333 |
| S11 | Aspherical | 111.2178 | 0.6000 | 1.67 | 20.37 | −15.03 | 95.0000 |
| S12 | Aspherical | 9.1714 | 0.3897 | | | | 0.5962 |
| S13 | Aspherical | 1.7882 | 0.5600 | 1.53 | 55.87 | −7.30 | −7.8730 |
| S14 | Aspherical | 1.0934 | 0.8099 | | | | −3.5656 |
| S15 | Aspherical | Infinite | 0.2100 | 1.52 | 64.17 | | |
| S16 | Aspherical | Infinite | 0.4013 | | | | |
| S17 | Spherical | Infinite | Infinite | | | | | f is a total effective focal length, of the optical imaging system, TTL is a distance from a center of the object-side surface S1 of the first lens E1 to the imaging surface S17 on the optical axis, and ImgH is a half of a diagonal length of an effective pixel region on the imaging surface S17.

In embodiment 1, both the object-side surface and the image-side surface of any lens in the first lens E1 to the seventh lens E7 are aspherical surfaces, and a surface type x of each aspherical lens may be defined through, but not limited to, the following aspherical surface formula:

$$x = \frac{ch^2}{1+\sqrt{1-(k+1)c^2h^2}} + \sum A_i h^i, \quad (1)$$

wherein x is the distance vector height from a vertex of the aspherical surface when the aspherical surface is at a height of h along the optical axis direction; c is a paraxial curvature of the aspherical surface, c=1/R (namely, the paraxial curvature c is a reciprocal of the curvature radius R in Table 1); k is a conic coefficient; and Ai is the correction coefficient of the i-th order of the aspherical surface. Table 2 shows higher-order coefficients $A_4$, $A_6$, $A_8$, $A_{10}$, $A_{12}$, $A_{14}$, $A_{16}$, $A_{18}$ and $A_{20}$ that can be used for each of aspherical mirror surfaces S1 and S14 in embodiment 1.

TABLE 2

| Surface number | A4 | A6 | A8 | A10 | A12 |
|---|---|---|---|---|---|
| S1 | 1.9050E−02 | 2.7201E−04 | −9.8131E−04 | 4.3070E−04 | −7.4331E−05 |
| S2 | 2.8303E−02 | −1.1794E−03 | −5.0756E−04 | 7.5537E−04 | −1.7796E−04 |
| S3 | 2.7064E−03 | −1.7680E−02 | 3.8132E−02 | −5.4951E−02 | 4.3550E−02 |
| S4 | 3.6584E−02 | −9.1771E−02 | 1.1953E−01 | −1.2835E−01 | 9.7366E−02 |
| S5 | −2.4924E−02 | 3.4395E−03 | −4.7643E−02 | 9.9075E−02 | −1.2016E−01 |
| S6 | −3.8125E−02 | 5.8806E−03 | −5.1176E−02 | 9.9500E−02 | −1.1000E−01 |
| S7 | −8.9961E−02 | 5.8110E−02 | −1.5929E−01 | 2.5728E−01 | −2.7062E−01 |
| S8 | −7.5962E−02 | 7.3692E−02 | −9.0669E−02 | 7.0023E−02 | −3.3597E−02 |
| S9 | −8.8807E−02 | 1.7029E−01 | −1.4507E−01 | 7.3092E−02 | −2.2318E−02 |
| S10 | −2.7462E−02 | 4.8371E−02 | −4.3015E−02 | 2.2157E−02 | −6.4095E−03 |
| S11 | 1.2183E−01 | −8.0709E−02 | 2.5750E−02 | −4.9618E−03 | 5.7384E−04 |
| S12 | 9.5135E−02 | −6.9531E−02 | 2.4069E−02 | −5.3251E−03 | 7.8592E−04 |
| S13 | −2.7673E−02 | −1.8679E−02 | 8.3315E−03 | −1.5247E−03 | 1.5926E−04 |
| S14 | −4.0948E−02 | 4.6734E−03 | 2.2449E−05 | −6.4986E−05 | 7.2317E−06 |

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | −1.8077E−02 | 3.1657E−03 | 0.0000E+00 | 0.0000E+00 |
| S4 | −4.3384E−02 | 8.9052E−03 | 0.0000E+00 | 0.0000E+00 |
| S5 | 8.4775E−02 | −3.1738E−02 | 4.9355E−03 | 0.0000E+00 |
| S6 | 7.1963E−02 | −2.5573E−02 | 3.7982E−03 | 0.0000E+00 |
| S7 | 1.9684E−01 | −9.2037E−02 | 2.4328E−02 | −2.7134E−03 |
| S8 | 1.0110E−02 | −1.7669E−03 | 1.3526E−04 | 2.0521E−06 |
| S9 | 3.6937E−03 | −1.7331E−04 | −3.6689E−05 | 4.5046E−06 |

TABLE 2-continued

| | | | | |
|---|---|---|---|---|
| S10 | 9.1906E−04 | −2.6559E−05 | −7.9555E−06 | 6.7279E−07 |
| S11 | −4.2180E−05 | 2.5507E−06 | −1.4435E−07 | 4.3934E−09 |
| S12 | −7.7085E−05 | 4.8209E−06 | −1.7337E−07 | 2.7167E−09 |
| S13 | −1.0180E−05 | 3.9441E−07 | −8.5158E−09 | 7.8626E−11 |
| S14 | −3.4139E−07 | 4.9822E−09 | 1.2912E−10 | −3.8108E−12 |

Figure 2A:
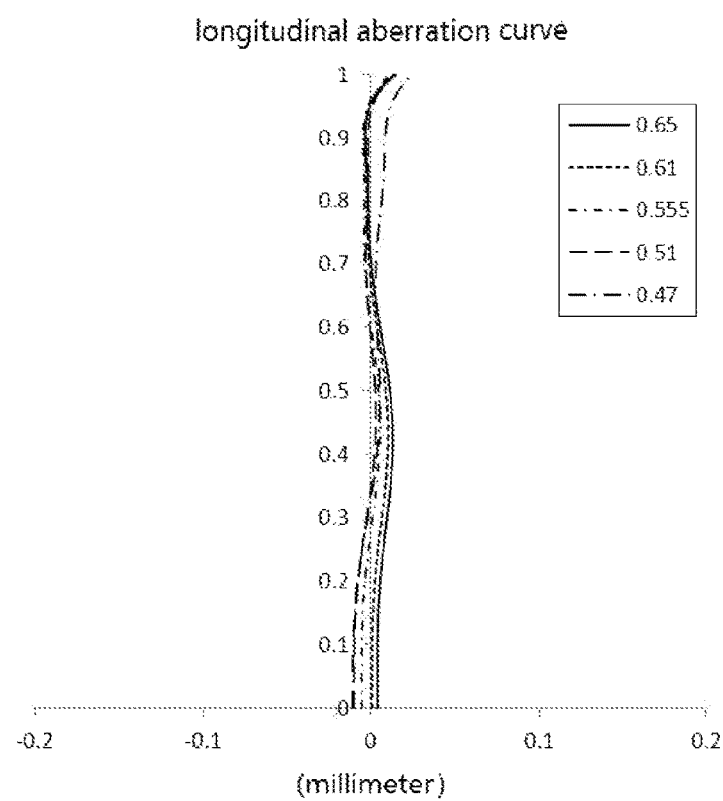
FIG. 2A to FIG. 2D show a longitudinal aberration curve, an astigmatism curve, a distortion curve and a lateral color curve of an optical imaging lens according to embodiment 1 respectively.
Figure 2B:
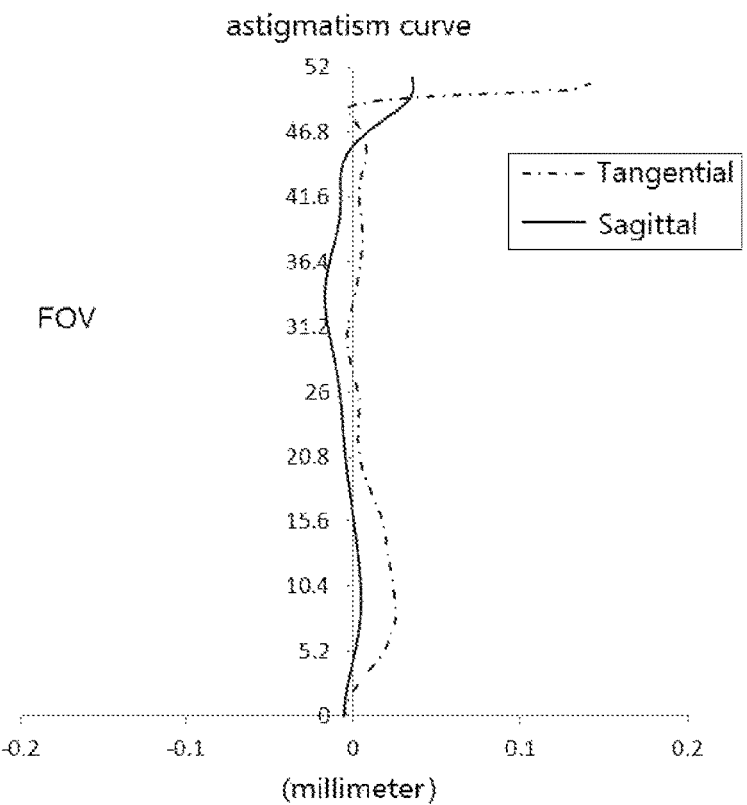
Figure 2C:
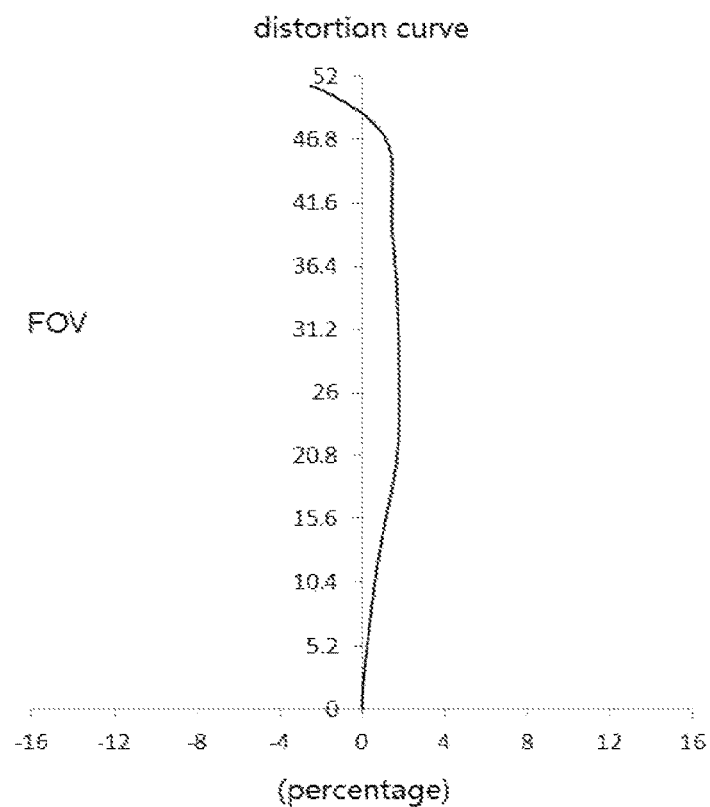
Figure 2D:
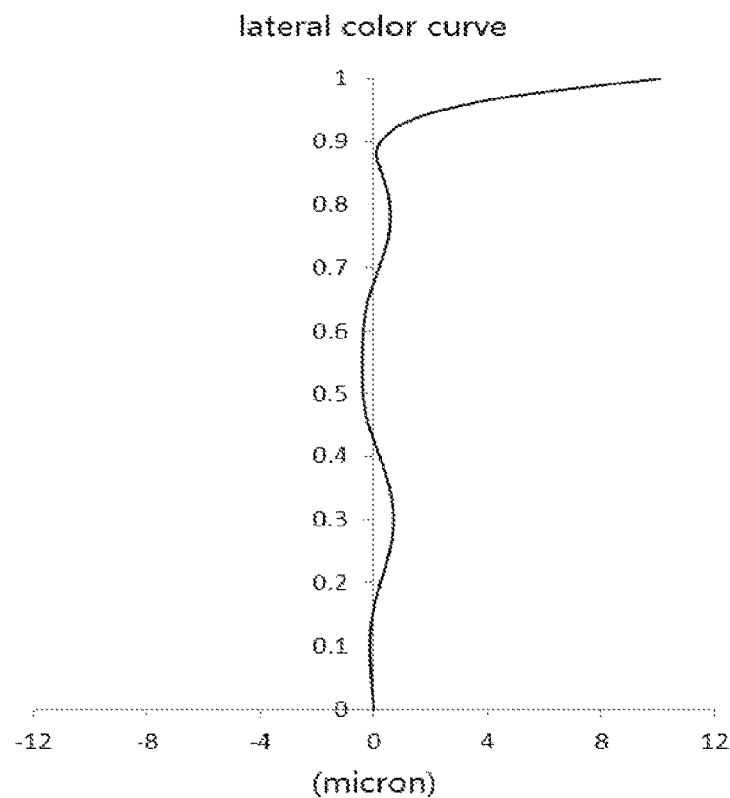

FIG. 2A shows a longitudinal aberration curve of the optical imaging lens according to embodiment 1 to represent deviation of a convergence focal point after light with different wavelengths passes through the lens. FIG. 2B shows an astigmatism curve of the optical imaging lens according to embodiment 1 to represent a meridian image surface curvature and a sagittal image surface curvature. FIG. 2C shows a distortion curve of the optical imaging lens according to embodiment 1 to represent distortion values corresponding to different fields of view. FIG. 2D shows a lateral color curve of the optical imaging lens according to embodiment 1 to represent deviation of different image heights on the imaging surface after the light passes through the lens. According to FIG. 2A to FIG. 2D, it can be seen that the optical imaging lens provided in embodiment 1 may achieve high imaging quality.

Embodiment 2

Figure 3:
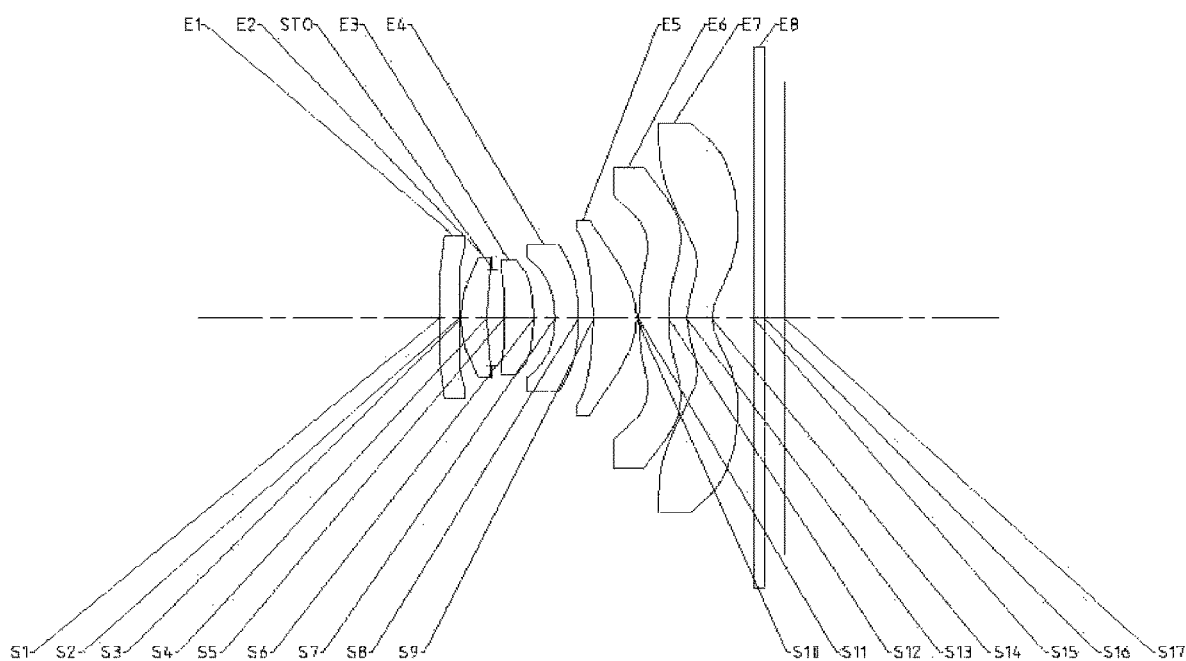
FIG. 3 shows a structure diagram of an optical imaging lens according to embodiment 2 of the disclosure.

An optical imaging lens according to embodiment 2 of the disclosure will be described below with reference to FIG. 3 to FIG. 4D. In the embodiment and the following embodiments, parts of descriptions similar to those about embodiment are omitted for simplicity. FIG. 3 shows a structure diagram of an optical imaging lens according to embodiment 2 of the disclosure.

As shown in FIG. 3, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a concave surface, while an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has negative refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 3 is a basic parameter table of the optical imaging lens of embodiment 2, and units of the curvature radius, the thickness and the focal length are all millimeter (mm). Table 4 shows high-order coefficients applied to each aspherical mirror surface in embodiment 2. A surface type of each aspherical surface may be defined by formula (1) given in embodiment 1.

TABLE 3

Embodiment 2: f = 4.28 mm, TTL = 6.81 mm, ImgH = 5.35 mm

| Surface number | Surface type | Curvature radius | Thickness | Material Refractive index | Material Abbe number | Focal length | Conic coefficient |
|---|---|---|---|---|---|---|---|
| OBJ | Spherical | Infinite | Infinite | | | | |
| S1 | Aspherical | −102.8605 | 0.3937 | 1.65 | 23.53 | 58.67 | −99.0000 |
| S2 | Aspherical | −28.7179 | 0.0400 | | | | −94.1064 |
| S3 | Aspherical | 2.7137 | 0.4979 | 1.55 | 56.11 | 10.81 | −0.5199 |
| S4 | Aspherical | 4.6971 | 0.1214 | | | | −52.8602 |
| STO | Spherical | Infinite | 0.2201 | | | | |
| S5 | Aspherical | 24.9836 | 0.5920 | 1.55 | 56.11 | 7.78 | −82.8902 |
| S6 | Aspherical | −5.0763 | 0.4112 | | | | 11.6555 |
| S7 | Aspherical | −3.2150 | 0.4633 | 1.68 | 19.25 | −7.93 | 2.6158 |
| S8 | Aspherical | −8.4742 | 0.3148 | | | | 7.0606 |
| S9 | Aspherical | −9.8847 | 0.8395 | 1.55 | 56.11 | 4.29 | 19.5116 |
| S10 | Aspherical | −1.9519 | 0.0400 | | | | −2.0973 |
| S11 | Aspherical | 11.9048 | 0.5889 | 1.67 | 20.37 | −18.67 | −73.6082 |
| S12 | Aspherical | 5.9631 | 0.3597 | | | | −0.0912 |
| S13 | Aspherical | 1.4051 | 0.4943 | 1.53 | 55.87 | −8.81 | −6.4847 |
| S14 | Aspherical | 0.9502 | 0.8258 | | | | −3.4468 |
| S15 | Aspherical | Infinite | 0.2100 | 1.52 | 64.17 | | |
| S16 | Aspherical | Infinite | 0.3984 | | | | |
| S17 | Spherical | Infinite | Infinite | | | | |

TABLE 4

| Surface number | A4 | A6 | A8 | A10 | A12 |
|---|---|---|---|---|---|
| S1 | 1.1767E−02 | 1.8967E−03 | −1.1916E−03 | 3.7415E−04 | −6.3162E−05 |
| S2 | 2.8078E−02 | −4.9000E−03 | 3.1846E−03 | −9.1557E−04 | 8.1337E−05 |
| S3 | 4.2608E−03 | −1.3238E−02 | 1.9875E−02 | −2.7443E−02 | 2.3575E−02 |
| S4 | 2.9007E−02 | −6.9232E−02 | 7.6777E−02 | −7.0526E−02 | 4.3145E−02 |
| S5 | −2.4769E−02 | −2.3248E−02 | 3.6446E−02 | −7.0457E−02 | 8.3199E−02 |
| S6 | −3.1222E−02 | 2.2347E−03 | −3.6789E−02 | 7.1607E−02 | −8.2510E−02 |
| S7 | −8.0242E−02 | 1.1048E−01 | −3.5447E−01 | 6.7408E−01 | −8.1722E−01 |
| S8 | −9.1257E−02 | 1.5983E−01 | −2.5209E−01 | 2.5312E−01 | −1.6583E−01 |
| S9 | −1.1551E−01 | 2.4490E−01 | −2.6571E−01 | 1.8132E−01 | −8.1803E−02 |
| S10 | −3.4474E−02 | 7.3160E−02 | −7.3349E−02 | 4.1370E−02 | −1.4117E−02 |
| S11 | 1.0948E−01 | −7.8288E−02 | 2.7982E−02 | −7.2839E−03 | 1.5490E−03 |
| S12 | 8.1866E−02 | −6.5942E−02 | 2.3441E−02 | −5.4260E−03 | 8.5716E−04 |
| S13 | −4.2696E−02 | −1.9011E−02 | 1.0363E−02 | −2.1091E−03 | 2.4012E−04 |
| S14 | −4.8571E−02 | 5.7973E−03 | 2.4215E−04 | −1.4006E−04 | 1.6630E−05 |

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | −1.1580E−02 | 2.4672E−03 | 0.0000E+00 | 0.0000E+00 |
| S4 | −1.4971E−02 | 2.7781E−03 | 0.0000E+00 | 0.0000E+00 |
| S5 | −6.0346E−02 | 2.4899E−02 | −4.3722E−03 | 0.0000E+00 |
| S6 | 5.7219E−02 | −2.1722E−02 | 3.4401E−03 | 0.0000E+00 |
| S7 | 6.3944E−01 | −3.0983E−01 | 8.3931E−02 | −9.6350E−03 |
| S8 | 7.0948E−02 | −1.9092E−02 | 2.9203E−03 | −1.9089E−04 |
| S9 | 2.4351E−02 | −4.6033E−03 | 4.9939E−04 | −2.3544E−05 |
| S10 | 2.9979E−03 | −3.8781E−04 | 2.7936E−05 | −8.5872E−07 |
| S11 | −2.7176E−04 | 3.4044E−05 | −2.4826E−06 | 7.6630E−08 |
| S12 | −9.1432E−05 | 6.2758E−06 | −2.4870E−07 | 4.2975E−09 |
| S13 | −1.6579E−05 | 6.9055E−07 | −1.5998E−08 | 1.5859E−10 |
| S14 | −1.0114E−06 | 3.3840E−08 | −5.7078E−10 | 3.4922E−12 |

Figure 4A:
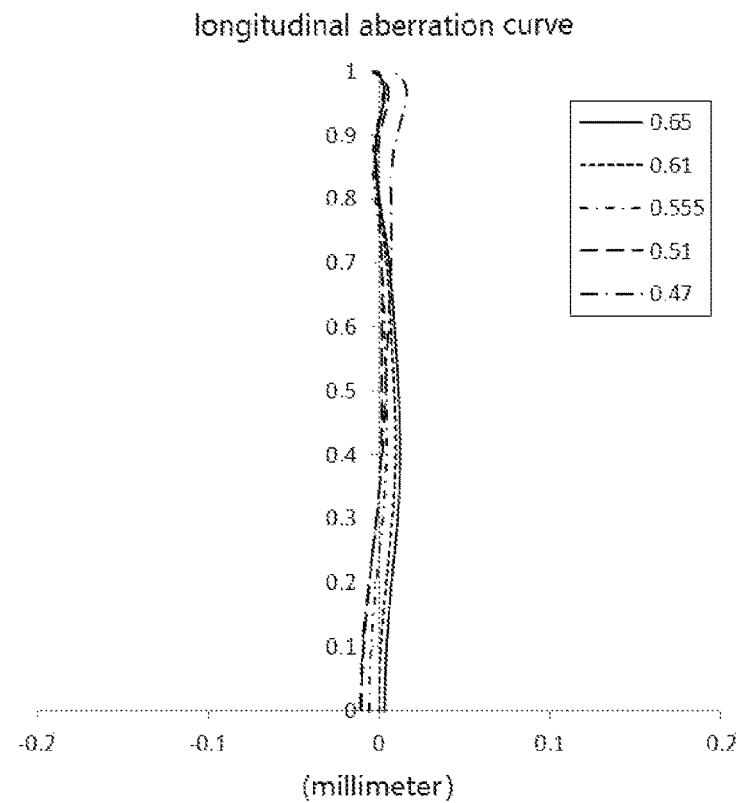
FIG. 4A to FIG. 4D show a longitudinal aberration curve, an astigmatism curve, a distortion curve and a lateral color curve of an optical imaging lens according to embodiment 2 respectively.
Figure 4B:
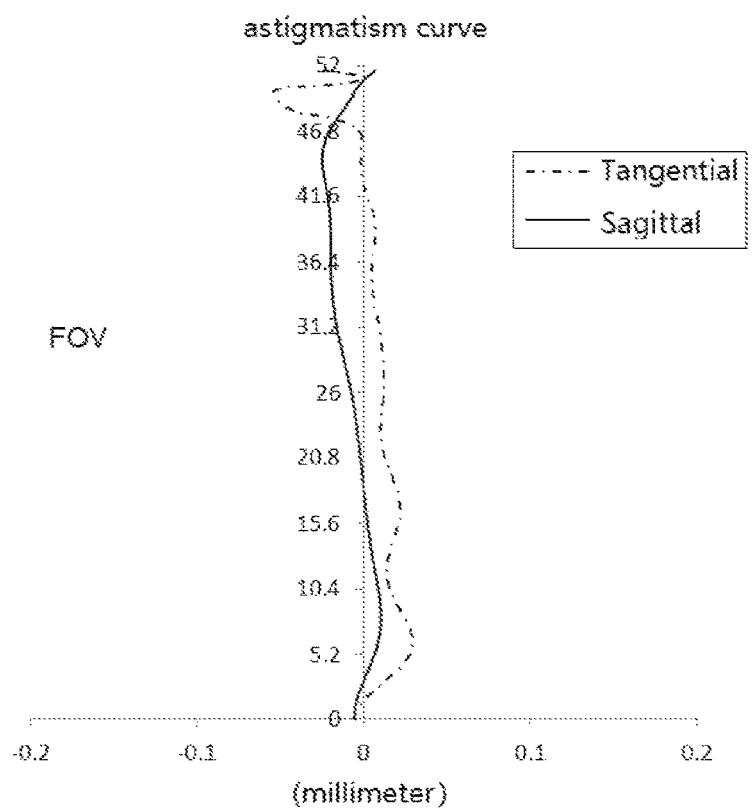
Figure 4C:
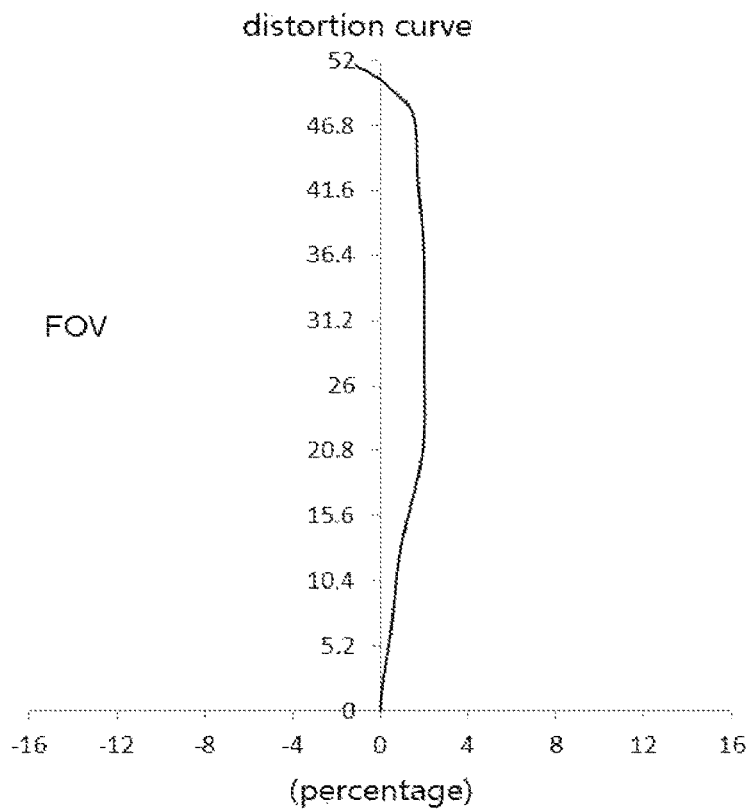
Figure 4D:
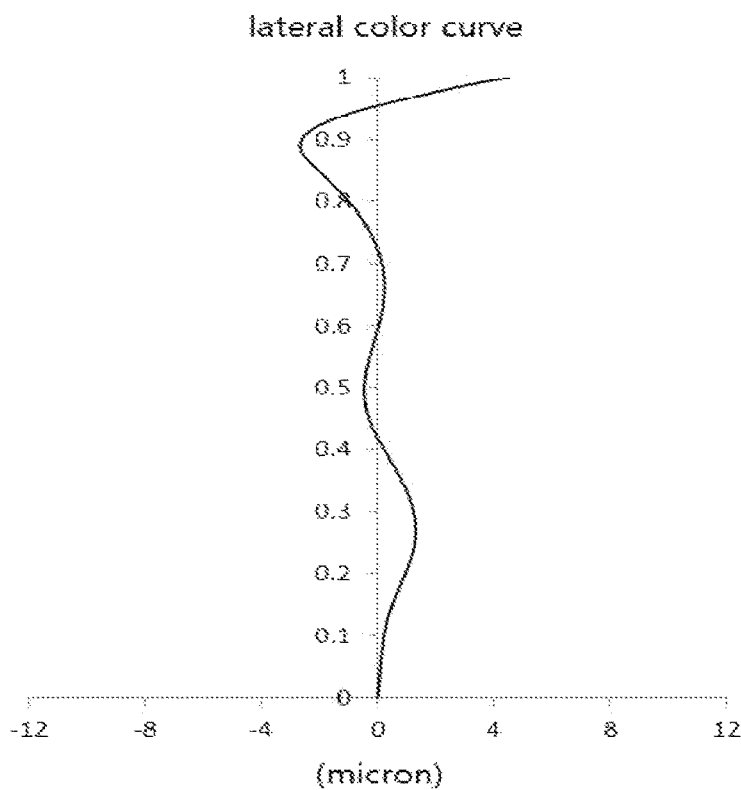

FIG. 4A shows a longitudinal aberration curve of the optical imaging lens according to embodiment 2 to represent deviation of a convergence focal point after light with different wavelengths passes through the lens. FIG. 4B shows an astigmatism curve of the optical imaging lens according to embodiment 2 to represent a meridian image surface curvature and a sagittal image surface curvature. FIG. 4C shows a distortion curve of the optical imaging lens according to embodiment 2 to represent distortion values corresponding to different fields of view. FIG. 4D shows a lateral color curve of the optical imaging lens according to embodiment 2 to represent deviation of different image heights on the imaging surface after the light passes through the lens. According to FIG. 4A to FIG. 4D, it can be seen that the optical imaging lens provided in embodiment 2 may achieve high imaging quality.

Embodiment 3

Figure 5:
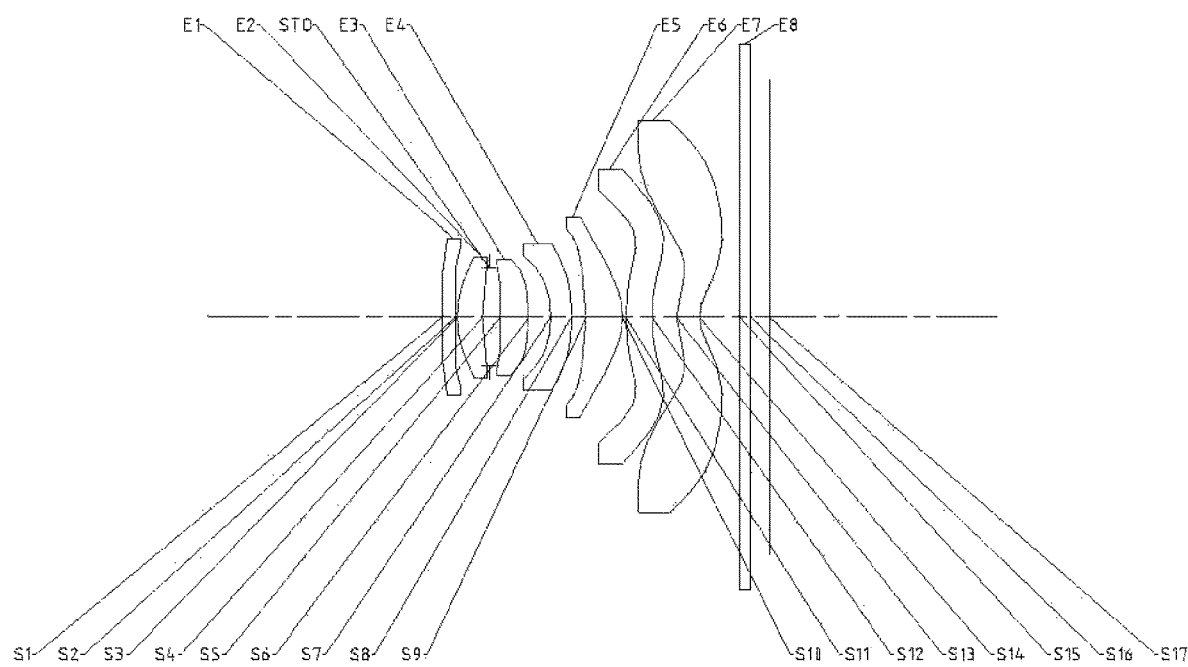
FIG. 5 shows a structure diagram of an optical imaging lens according to embodiment 3 of the disclosure.

An optical imaging lens according to embodiment 3 of the disclosure is described below with reference to FIG. 5 to FIG. 6D. FIG. 5 shows a structure diagram of an optical imaging lens according to embodiment 3 of the disclosure.

As shown in FIG. 5, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a concave surface, while an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has negative refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 5 is a basic parameter table of the optical imaging lens of embodiment 3, and units of the curvature radius, the thickness and the focal length are all millimeter (mm). Table 6 shows high-order coefficients applied to each aspherical mirror surface in embodiment 3. A surface type of each aspherical surface may be defined by formula (1) given in embodiment 1.

TABLE 5

Embodiment 3: f = 4.32 mm, TTL = 6.45 mm, ImgH = 5.35 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| S1 | Aspherical | −197.7834 | 0.2623 | 1.65 | 23.53 | 40.83 | −99.0000 |
| S2 | Aspherical | −24.2856 | 0.0400 | | | | −87.9609 |
| S3 | Aspherical | 2.7569 | 0.4989 | 1.55 | 56.11 | 10.81 | −0.4662 |
| S4 | Aspherical | 4.8422 | 0.1224 | | | | −51.1813 |
| STO | Spherical | Infinite | 0.2201 | | | | |
| S5 | Aspherical | 34.1445 | 0.5636 | 1.55 | 56.11 | 8.14 | −99.0000 |
| S6 | Aspherical | −5.0782 | 0.4318 | | | | 11.8201 |
| S7 | Aspherical | −3.2219 | 0.4060 | 1.68 | 19.25 | −8.20 | 2.4686 |
| S8 | Aspherical | −8.0582 | 0.2974 | | | | 6.4245 |
| S9 | Aspherical | −9.3512 | 0.7202 | 1.55 | 56.11 | 4.61 | 19.3572 |
| S10 | Aspherical | −2.0357 | 0.0656 | | | | −2.4058 |
| S11 | Aspherical | 9.7953 | 0.5190 | 1.67 | 20.37 | −32.86 | −74.5173 |
| S12 | Aspherical | 6.6247 | 0.4795 | | | | 0.0760 |
| S13 | Aspherical | 1.4640 | 0.4504 | 1.53 | 55.87 | −6.95 | −7.9545 |
| S14 | Aspherical | 0.9384 | 0.7941 | | | | −3.6513 |
| S15 | Aspherical | Infinite | 0.2100 | 1.52 | 64.17 | | |
| S16 | Aspherical | Infinite | 0.3673 | | | | |
| S17 | Spherical | Infinite | Infinite | | | | |

TABLE 6

| Surface number | A4 | A6 | A8 | A10 | A12 |
|---|---|---|---|---|---|
| S1 | 6.8895E−03 | 8.3236E−03 | −3.9403E−03 | 9.7288E−04 | −1.2932E−04 |
| S2 | 2.4088E−02 | 6.4550E−04 | 8.9430E−03 | −8.4803E−03 | 1.6603E−04 |
| S3 | 8.0448E−03 | −1.5217E−02 | 2.0660E−02 | −2.7236E−02 | 2.1442E−02 |
| S4 | 2.8167E−02 | −6.6379E−02 | 7.6572E−02 | −7.1036E−02 | 3.8855E−02 |
| S5 | −2.5704E−02 | −2.2422E−02 | 2.3850E−02 | −3.1176E−02 | 1.9984E−02 |
| S6 | −2.7884E−02 | −1.0398E−02 | −2.8969E−02 | 1.8812E−02 | −3.1412E−02 |
| S7 | −7.6978E−02 | 8.8793E−02 | −2.9208E−01 | 5.6109E−01 | −6.7109E−01 |
| S8 | −9.7063E−02 | 1.7082E−01 | −2.8463E−01 | 2.9916E−01 | −2.0266E−01 |
| S9 | −1.2912E−01 | 2.9650E−01 | −3.4518E−01 | 2.4868E−01 | −1.1700E−01 |
| S10 | −4.4101E−02 | 9.8443E−02 | −1.0087E−01 | 5.7391E−02 | −1.9473E−02 |
| S11 | 1.1848E−01 | −8.6004E−02 | 2.8621E−02 | −5.5671E−03 | 5.7350E−04 |
| S12 | 8.2266E−02 | −7.5017E−02 | 2.8220E−02 | −6.8249E−03 | 1.1088E−03 |
| S13 | −5.8573E−02 | −2.2844E−02 | 1.5067E−02 | −3.5212E−03 | 4.5986E−04 |
| S14 | −5.8072E−02 | 8.8376E−03 | −2.1773E−04 | −1.0790E−04 | 1.6661E−05 |

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | −1.0162E−02 | 2.2252E−03 | 0.0000E+00 | 0.0000E+00 |
| S4 | −1.0374E−02 | 1.5386E−03 | 0.0000E+00 | 0.0000E+00 |
| S5 | −4.7465E−03 | −8.3373E−04 | 5.6374E−04 | 0.0000E+00 |
| S6 | 2.6811E−02 | −1.1605E−02 | 1.9923E−03 | 0.0000E+00 |
| S7 | 5.1636E−01 | −2.4735E−01 | 6.6651E−02 | −7.6452E−03 |
| S8 | 8.9209E−02 | −2.4721E−02 | 3.9085E−03 | −2.6492E−04 |
| S9 | 3.6074E−02 | −7.0427E−03 | 7.8837E−04 | −3.8357E−05 |
| S10 | 4.0549E−03 | −5.0607E−04 | 3.4306E−05 | −9.4881E−07 |
| S11 | −2.0445E−05 | −9.6260E−07 | 6.9980E−08 | 1.6908E−10 |
| S12 | −1.2010E−04 | 8.2999E−06 | −3.2953E−07 | 5.6905E−09 |
| S13 | −3.6572E−05 | 1.7635E−06 | −4.7519E−08 | 5.5006E−10 |
| S14 | −1.1967E−06 | 4.8143E−08 | −1.0460E−09 | 9.5882E−12 |

Figure 6A:
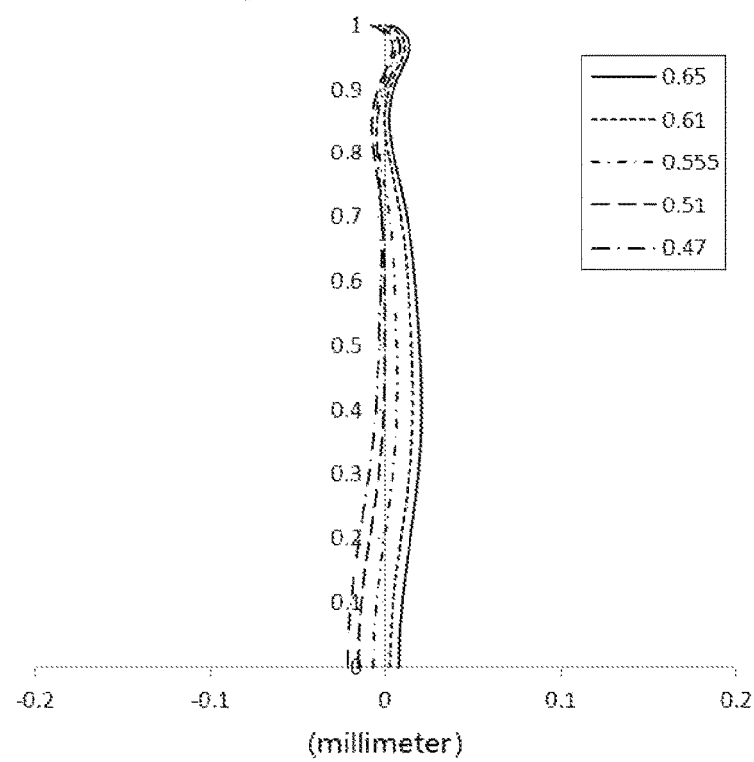
FIG. 6A to FIG. 6D show a longitudinal aberration curve, an astigmatism curve, a distortion curve and a lateral color curve of an optical imaging lens according to embodiment 3 respectively.
Figure 6B:
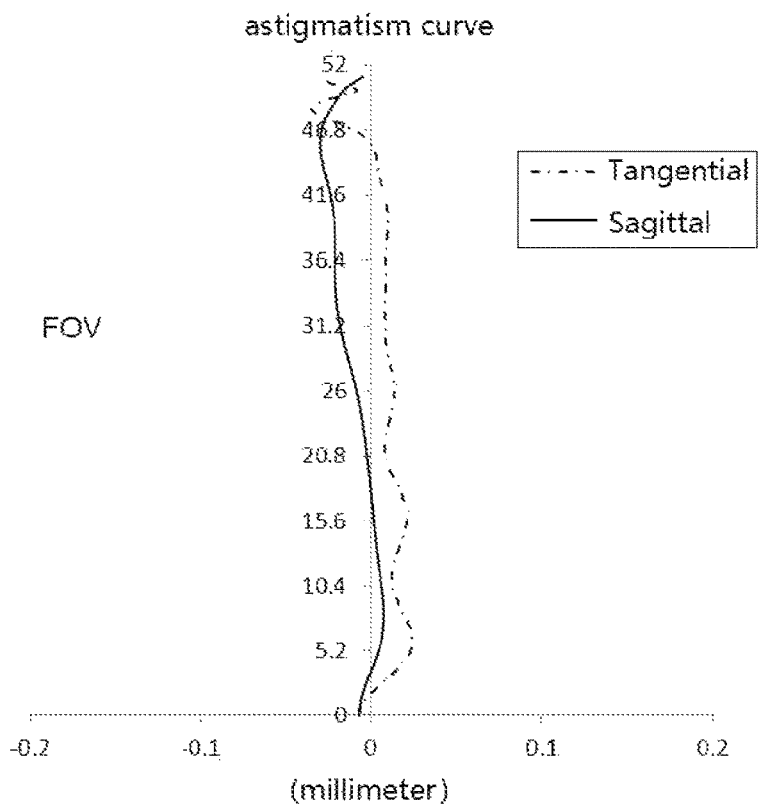
Figure 6C:
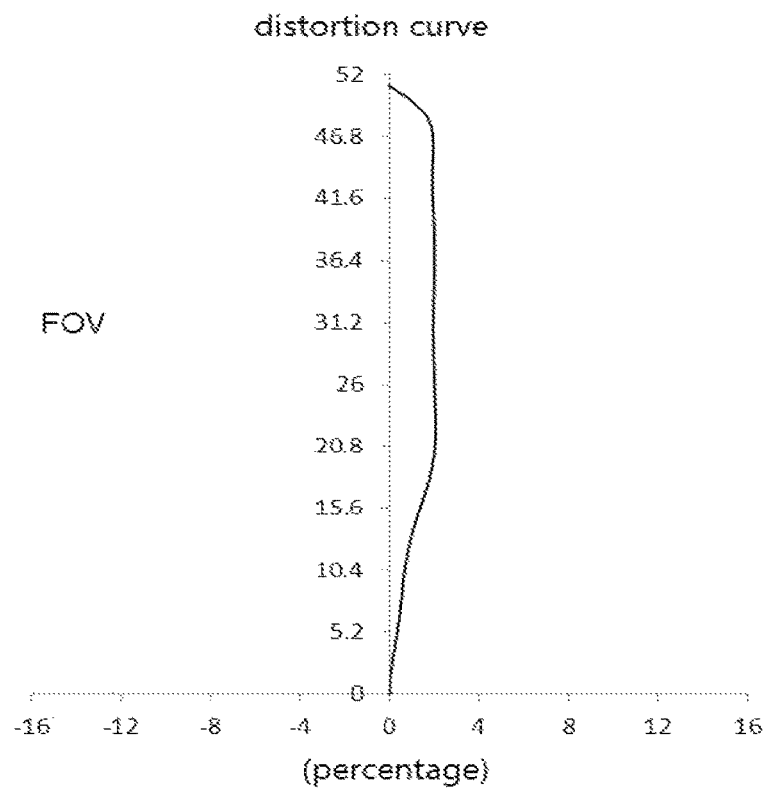
Figure 6D:
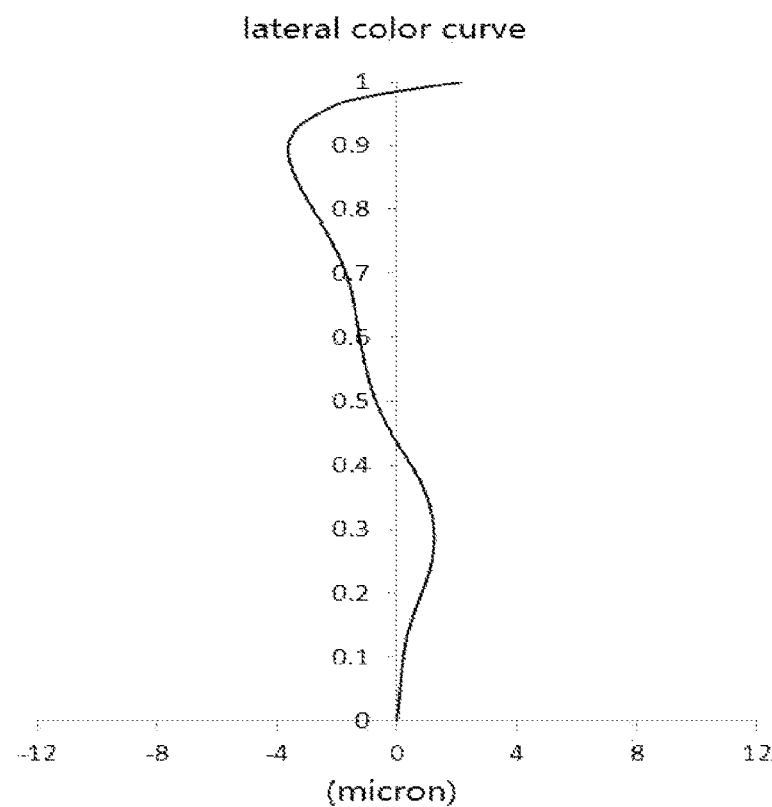

FIG. 6A shows a longitudinal aberration curve of the optical imaging lens according to embodiment 3 to represent deviation of a convergence focal point after light with different wavelengths passes through the lens. FIG. 6B shows an astigmatism curve of the optical imaging lens according to embodiment 3 to represent a meridian image surface curvature and a sagittal image surface curvature. FIG. 6C shows a distortion curve of the optical imaging lens according to embodiment 3 to represent distortion values corresponding to different fields of view. FIG. 6D shows a lateral color curve of the optical imaging lens according to embodiment 3 to represent deviation of different image heights on the imaging surface after the light passes through the lens. According to FIG. 6A to FIG. 6D, it can be seen that the optical imaging lens provided in embodiment 3 may achieve high imaging quality.

Embodiment 4

Figure 7:
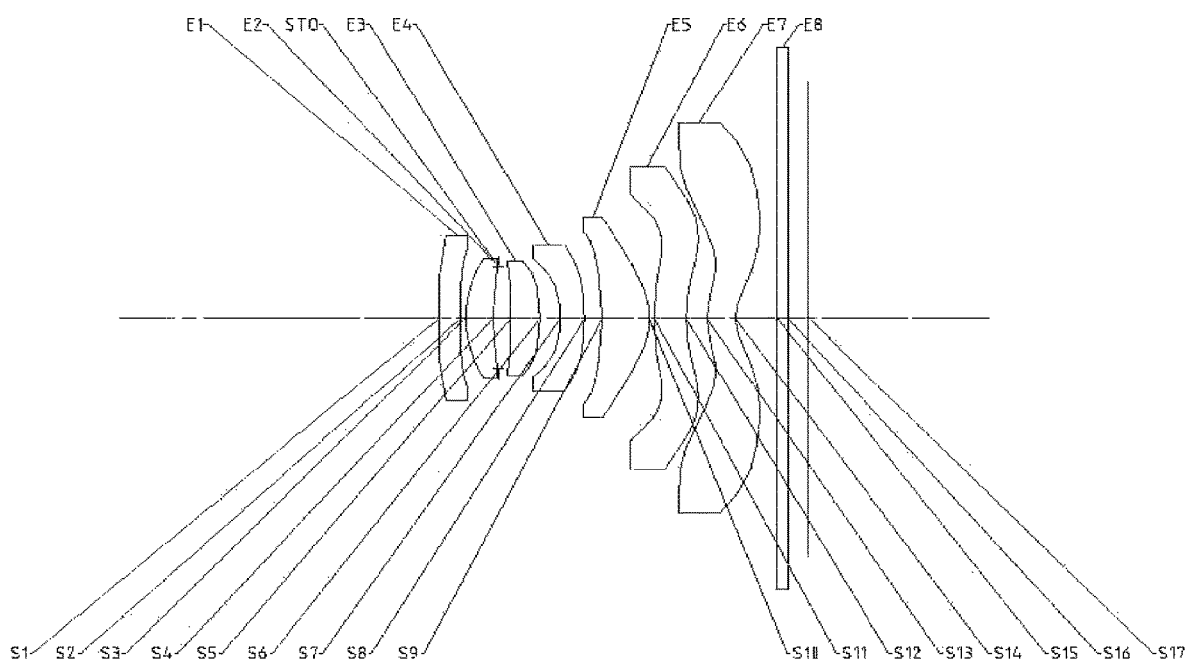
FIG. 7 shows a structure diagram of an optical imaging lens according to embodiment 4 of the disclosure.

An optical imaging lens according to embodiment 4 of the disclosure is described below with reference to FIG. 7 to FIG. 8D. FIG. 7 shows a structure diagram of an optical imaging lens according to embodiment 4 of the disclosure.

As shown in FIG. 7, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a convex surface, while an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has negative refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 7 is a basic parameter table of the optical imaging lens of embodiment 4, and units of the curvature radius, the thickness and the focal length are all millimeter (mm). Table 8 shows high-order coefficients applied to each aspherical mirror surface in embodiment 4. A surface type of each aspherical surface may be defined by formula (1) given in embodiment 1.

TABLE 7

Embodiment 4: f = 4.48 mm, TTL = 7.28 mm, ImgH = 5.35 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| S1 | Aspherical | 96.5476 | 0.4302 | 1.65 | 23.53 | 71.77 | 98.9029 |
| S2 | Aspherical | −97.8179 | 0.1040 | | | | 90.0000 |
| S3 | Aspherical | 2.6980 | 0.5276 | 1.55 | 56.11 | 10.70 | −0.4081 |
| S4 | Aspherical | 4.6688 | 0.1084 | | | | −50.0236 |
| STO | Spherical | Infinite | 0.2401 | | | | |
| S5 | Aspherical | 21.9064 | 0.5762 | 1.55 | 56.11 | 7.58 | −70.0000 |
| S6 | Aspherical | −5.0565 | 0.4011 | | | | 11.3762 |
| S7 | Aspherical | −3.1537 | 0.4849 | 1.68 | 19.25 | −7.85 | 2.6661 |
| S8 | Aspherical | −8.2301 | 0.3513 | | | | 10.1240 |
| S9 | Aspherical | −9.5153 | 0.9262 | 1.55 | 56.11 | 4.18 | 19.2402 |
| S10 | Aspherical | −1.9051 | 0.0994 | | | | −2.3451 |
| S11 | Aspherical | 19.3213 | 0.6261 | 1.67 | 20.37 | −15.40 | −92.1230 |
| S12 | Aspherical | 6.6148 | 0.4088 | | | | 0.5042 |
| S13 | Aspherical | 1.8451 | 0.5583 | 1.53 | 55.87 | −8.26 | −7.1303 |
| S14 | Aspherical | 1.1652 | 0.8274 | | | | −3.4193 |
| S15 | Aspherical | Infinite | 0.2100 | 1.52 | 64.17 | | |
| S16 | Aspherical | Infinite | 0.3999 | | | | |
| S17 | Spherical | Infinite | Infinite | | | | |

TABLE 8

| Surface number | A4 | A6 | A8 | A10 | A12 |
|---|---|---|---|---|---|
| S1 | 1.2906E−02 | 1.8395E−03 | −1.8792E−03 | 6.6905E−04 | −9.7309E−05 |
| S2 | 2.6948E−02 | −1.5342E−03 | −1.1896E−03 | 1.1656E−03 | −2.5216E−04 |
| S3 | −2.0791E−03 | 6.1975E−03 | −8.3412E−03 | −8.4080E−03 | 2.0252E−02 |
| S4 | 3.4350E−02 | −1.0647E−01 | 1.9373E−01 | −2.6778E−01 | 2.2802E−01 |
| S5 | −3.2346E−02 | 1.3633E−02 | −7.8506E−02 | 1.2553E−01 | −1.1033E−01 |
| S6 | −2.5174E−02 | −2.7151E−02 | 3.6834E−02 | −4.3066E−02 | 2.8304E−02 |
| S7 | −1.1247E−01 | 2.6899E−01 | −7.7602E−01 | 1.3808E+00 | −1.5975E+00 |
| S8 | −8.9136E−02 | 1.3169E−01 | −1.6676E−01 | 1.3019E−01 | −6.5336E−02 |
| S9 | −1.0008E−01 | 1.8513E−01 | −1.7468E−01 | 1.0457E−01 | −4.2182E−02 |
| S10 | −1.1716E−02 | 1.9740E−02 | −1.5878E−02 | 6.7035E−03 | −1.2490E−03 |
| S11 | 9.7988E−02 | −6.6446E−02 | 2.1146E−02 | −4.3078E−03 | 6.2746E−04 |
| S12 | 7.7513E−02 | −6.0625E−02 | 2.0522E−02 | −4.3778E−03 | 6.2079E−04 |
| S13 | −3.9746E−02 | −1.3054E−02 | 6.9298E−03 | −1.2948E−03 | 1.3343E−04 |
| S14 | −4.6246E−02 | 5.8872E−03 | 1.3354E−04 | −1.3981E−04 | 2.0022E−05 |

TABLE 8-continued

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | −1.3310E−02 | 3.0784E−03 | 0.0000E+00 | 0.0000E+00 |
| S4 | −1.0541E−01 | 2.0938E−02 | 0.0000E+00 | 0.0000E+00 |
| S5 | 5.0760E−02 | −9.2482E−03 | 7.3662E−05 | 0.0000E+00 |
| S6 | −7.0789E−03 | −1.0240E−03 | 6.1003E−04 | 0.0000E+00 |
| S7 | 1.2027E+00 | −5.6438E−01 | 1.4913E−01 | −1.6847E−02 |
| S8 | 2.1214E−02 | −4.2828E−03 | 4.7520E−04 | −1.8961E−05 |
| S9 | 1.1451E−02 | −2.0106E−03 | 2.0569E−04 | −9.2283E−06 |
| S10 | −3.5475E−05 | 5.7726E−05 | −9.4091E−06 | 5.1035E−07 |
| S11 | −7.9832E−05 | 8.9792E−06 | −6.5808E−07 | 2.0714E−08 |
| S12 | −5.8504E−05 | 3.5262E−06 | −1.2277E−07 | 1.8709E−09 |
| S13 | −8.2449E−06 | 3.0309E−07 | −6.0758E−09 | 5.0571E−11 |
| S14 | −1.4967E−06 | 6.4390E−08 | −1.5097E−09 | 1.4989E−11 |

Figure 8A:
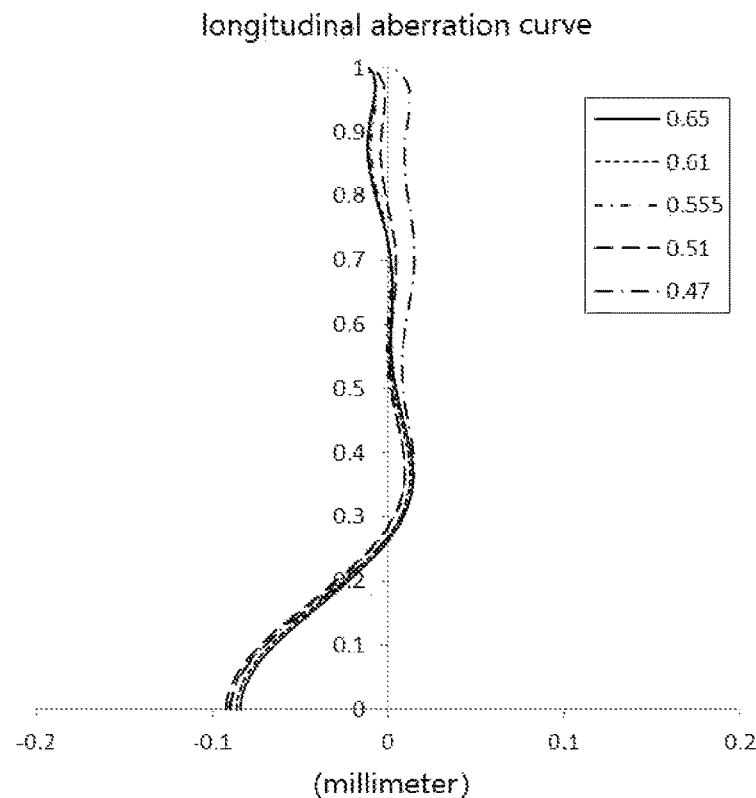
FIG. 8A to FIG. 8D show a longitudinal aberration curve, an astigmatism curve, a distortion curve and a lateral color curve of an optical imaging lens according to embodiment 4 respectively.
Figure 8B:
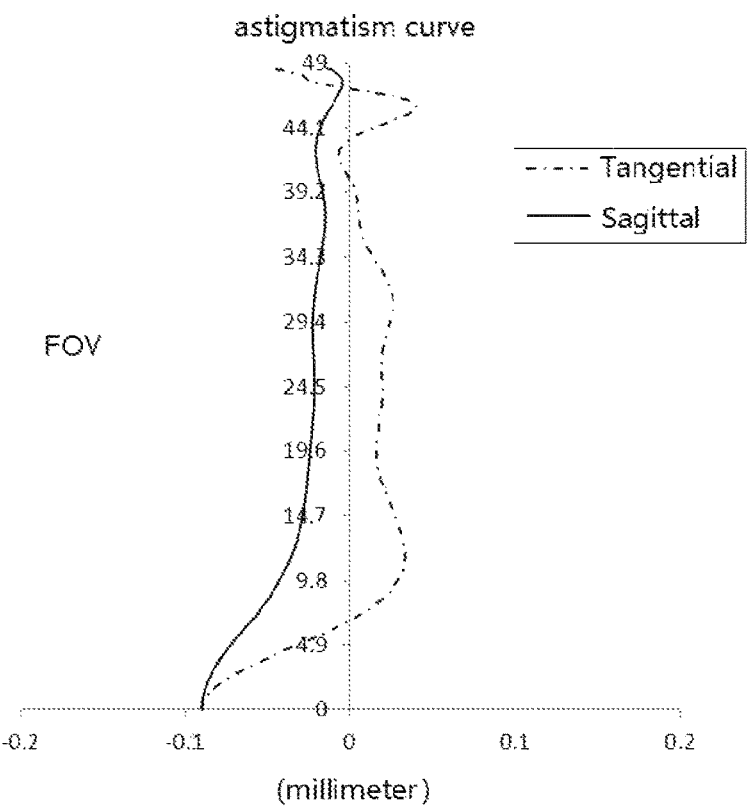
Figure 8C:
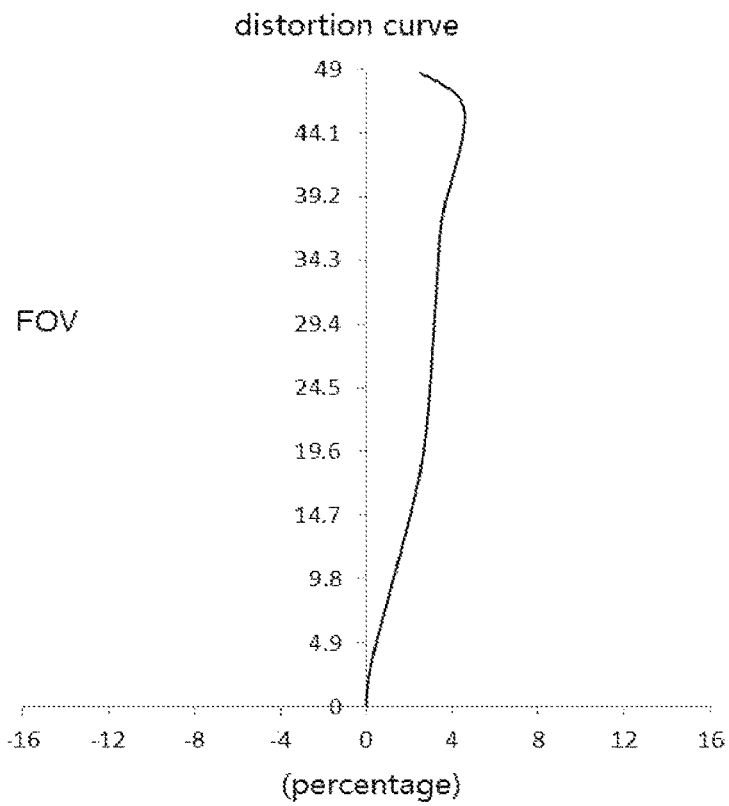
Figure 8D:
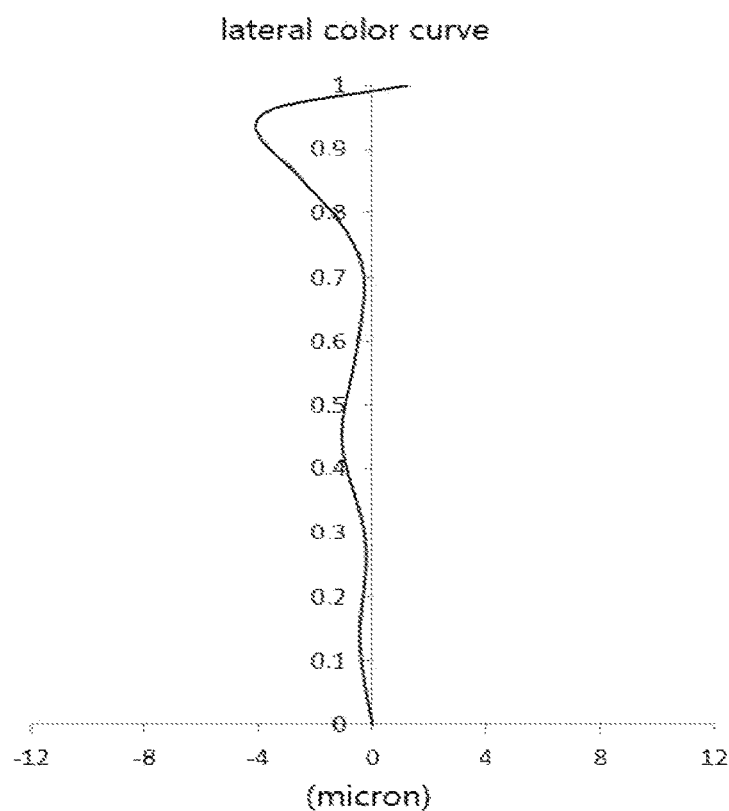

FIG. 8A shows a longitudinal aberration curve of the optical imaging lens according to embodiment 4 to represent deviation of a convergence focal point after light with different wavelengths passes through the lens. FIG. 8B shows an astigmatism curve of the optical imaging lens according to embodiment 4 to represent a meridian image surface curvature and a sagittal image surface curvature. FIG. 8C shows a distortion curve of the optical imaging lens according to embodiment 4 to represent distortion values corresponding to different fields of view. FIG. 8D shows a lateral color curve of the optical imaging lens according to embodiment 4 to represent deviation of different image heights on the imaging surface after the light passes through the lens. According to FIG. 8A to FIG. 8D, it can be seen that the optical imaging lens provided in embodiment 4 may achieve high imaging quality.

Embodiment 5

Figure 9:
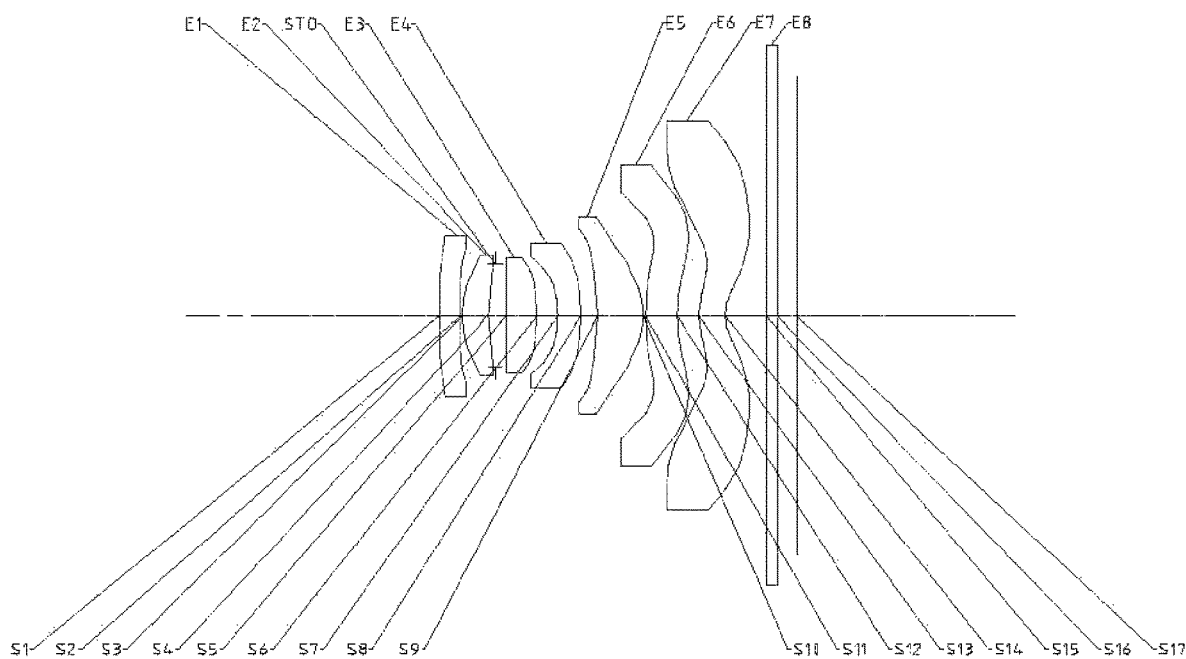
FIG. 9 shows a structure diagram of an optical imaging lens according to embodiment 5 of the disclosure.

An optical imaging lens according to embodiment 5 of the disclosure is described below with reference to FIG. 9 to FIG. 10D. FIG. 9 shows a structure diagram of an optical imaging lens according to embodiment 5 of the disclosure.

As shown in FIG. 9, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a concave surface, while an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has negative refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 9 is a basic parameter table of the optical imaging lens of embodiment 5, and units of the curvature radius, the thickness and the focal length are all millimeter (mm). Table 10 shows high-order coefficients applied to each aspherical mirror surface in embodiment 5. A surface type of each aspherical surface may be defined by formula (1) given in embodiment 1.

TABLE 9

Embodiment 5: f = 4.50 mm, TTL = 7.03 mm, ImgH = 5.35 mm

| Surface number | Surface type | Curvature radius | Thickness | Material Refractive index | Material Abbe number | Focal length | Conic coefficient |
|---|---|---|---|---|---|---|---|
| OBJ | Spherical | Infinite | Infinite | | | | |
| S1 | Aspherical | −444.0164 | 0.4176 | 1.65 | 23.53 | 56.50 | 15.4050 |
| S2 | Aspherical | −35.2605 | 0.0400 | | | | −99.0000 |
| S3 | Aspherical | 2.7102 | 0.5059 | 1.55 | 56.11 | 11.30 | −0.5853 |
| S4 | Aspherical | 4.5138 | 0.1317 | | | | −49.7550 |
| STO | Spherical | Infinite | 0.2176 | | | | |
| S5 | Aspherical | 13.9312 | 0.6026 | 1.55 | 56.11 | 7.71 | 96.9150 |
| S6 | Aspherical | −5.9351 | 0.4122 | | | | 11.3060 |
| S7 | Aspherical | −3.2266 | 0.4588 | 1.68 | 19.25 | −8.19 | 2.8677 |
| S8 | Aspherical | −8.1452 | 0.3377 | | | | 7.5707 |
| S9 | Aspherical | −9.4265 | 0.8907 | 1.55 | 56.11 | 4.39 | 19.3921 |
| S10 | Aspherical | −1.9760 | 0.0451 | | | | −2.1973 |
| S11 | Aspherical | 14.6429 | 0.6227 | 1.67 | 20.37 | −18.78 | −90.0189 |

TABLE 9-continued

Embodiment 5: f = 4.50 mm, TTL = 7.03 mm, ImgH = 5.35 mm

| Surface number | Surface type | Curvature radius | Thickness | Material Refractive index | Material Abbe number | Focal length | Conic coefficient |
|---|---|---|---|---|---|---|---|
| S12 | Aspherical | 6.6327 | 0.4186 | | | | 0.1754 |
| S13 | Aspherical | 1.6533 | 0.5247 | 1.53 | 55.87 | −7.67 | −7.4227 |
| S14 | Aspherical | 1.0487 | 0.8095 | | | | −3.5304 |
| S15 | Aspherical | Infinite | 0.2100 | 1.52 | 64.17 | | |
| S16 | Aspherical | Infinite | 0.3820 | | | | |
| S17 | Spherical | Infinite | Infinite | | | | |

TABLE 10

| Surface number | A4 | A6 | A8 | A10 | A12 |
|---|---|---|---|---|---|
| S1 | 1.1267E−02 | 2.6339E−03 | −1.7291E−03 | 5.4264E−04 | −8.3368E−05 |
| S2 | 2.6779E−02 | −4.2676E−04 | −7.8903E−04 | 7.2044E−04 | −1.7429E−04 |
| S3 | 2.8001E−03 | −1.6317E−02 | 3.7675E−02 | −5.7770E−02 | 4.7642E−02 |
| S4 | 2.3270E−02 | 9.0950E−03 | −2.5328E−01 | 5.8449E−01 | −6.3029E−01 |
| S5 | −2.5231E−02 | −7.3120E−03 | −1.0935E−02 | 2.3958E−02 | −2.4242E−02 |
| S6 | −2.8187E−02 | −3.3463E−03 | −2.5422E−02 | 5.3773E−02 | −6.7521E−02 |
| S7 | −8.0623E−02 | 1.2022E−01 | −3.7542E−01 | 6.7998E−01 | −7.8750E−01 |
| S8 | −8.9818E−02 | 1.5455E−01 | −2.3895E−01 | 2.3345E−01 | −1.4857E−01 |
| S9 | −1.1079E−01 | 2.2360E−01 | −2.2923E−01 | 1.4673E−01 | −6.1558E−02 |
| S10 | −2.8782E−02 | 6.2264E−02 | −6.0079E−02 | 3.1620E−02 | −9.7751E−03 |
| S11 | 9.7554E−02 | −6.1292E−02 | 1.5311E−02 | −1.2991E−03 | −2.6379E−04 |
| S12 | 7.7029E−02 | −6.0247E−02 | 2.0317E−02 | −4.3010E−03 | 6.0148E−04 |
| S13 | −4.1884E−02 | −1.9429E−02 | 1.0629E−02 | −2.2023E−03 | 2.5751E−04 |
| S14 | −4.7823E−02 | 5.6053E−03 | 3.6418E−04 | −1.9042E−04 | 2.6321E−05 |

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | −2.0733E−02 | 3.8239E−03 | 0.0000E+00 | 0.0000E+00 |
| S4 | 3.3213E−01 | −6.8003E−02 | 0.0000E+00 | 0.0000E+00 |
| S5 | 1.2087E−02 | −1.4040E−03 | −2.5370E−04 | 0.0000E+00 |
| S6 | 5.0948E−02 | −2.0796E−02 | 3.5522E−03 | 0.0000E+00 |
| S7 | 5.8874E−01 | −2.7203E−01 | 7.0056E−02 | −7.6151E−03 |
| S8 | 6.1758E−02 | −1.6119E−02 | 2.3793E−03 | −1.4855E−04 |
| S9 | 1.6867E−02 | −2.8967E−03 | 2.7999E−04 | −1.1382E−05 |
| S10 | 1.8103E−03 | −1.9306E−04 | 1.0401E−05 | −1.9185E−07 |
| S11 | 7.9604E−05 | −8.0323E−06 | 3.4263E−07 | −4.4012E−09 |
| S12 | −5.5585E−05 | 3.2760E−06 | −1.1160E−07 | 1.6690E−09 |
| S13 | −1.8400E−05 | 7.9909E−07 | −1.9442E−08 | 2.0385E−10 |
| S14 | −1.9942E−06 | 8.8646E−08 | −2.1636E−09 | 2.2362E−11 |

Figure 10A:
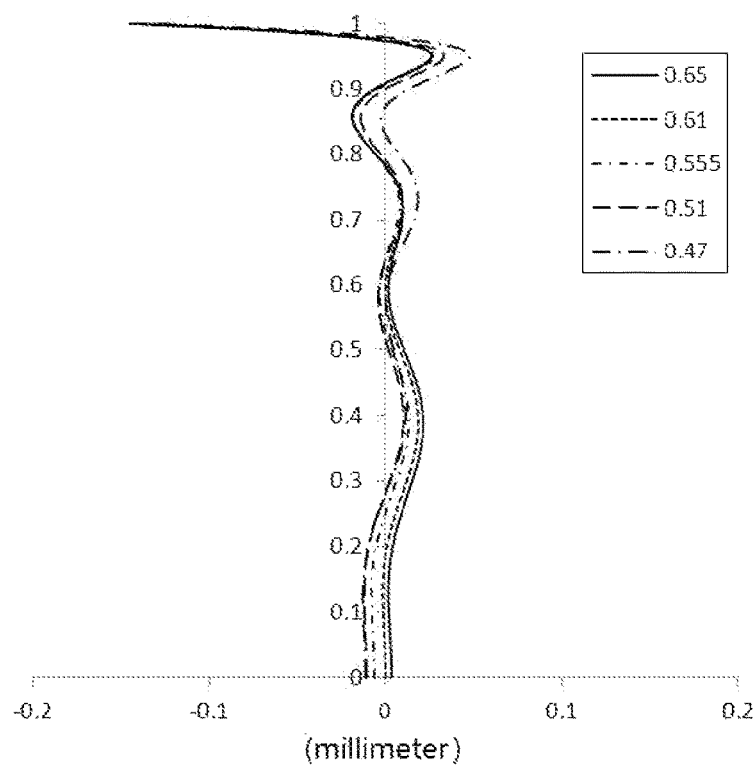
FIG. 10A to FIG. 10D show a longitudinal aberration curve, an astigmatism curve, a distortion curve and a lateral color curve of an optical imaging lens according to embodiment 5 respectively.
Figure 10B:
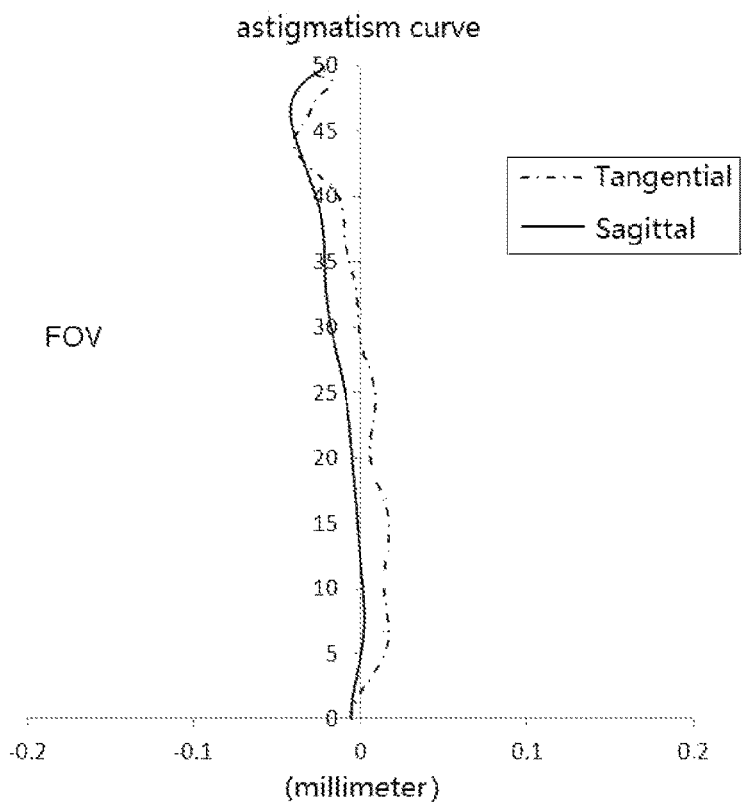
Figure 10C:
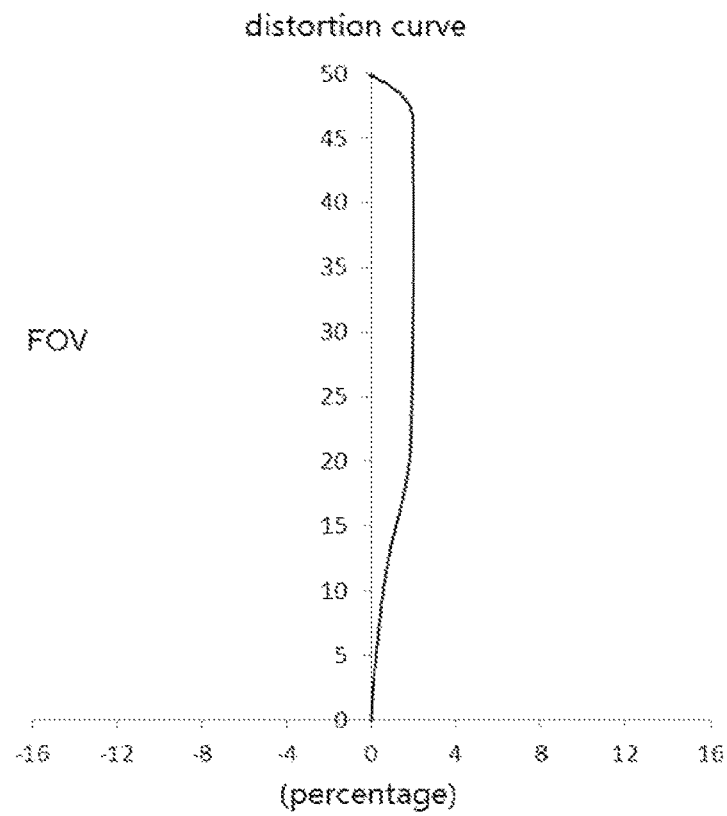
Figure 10D:
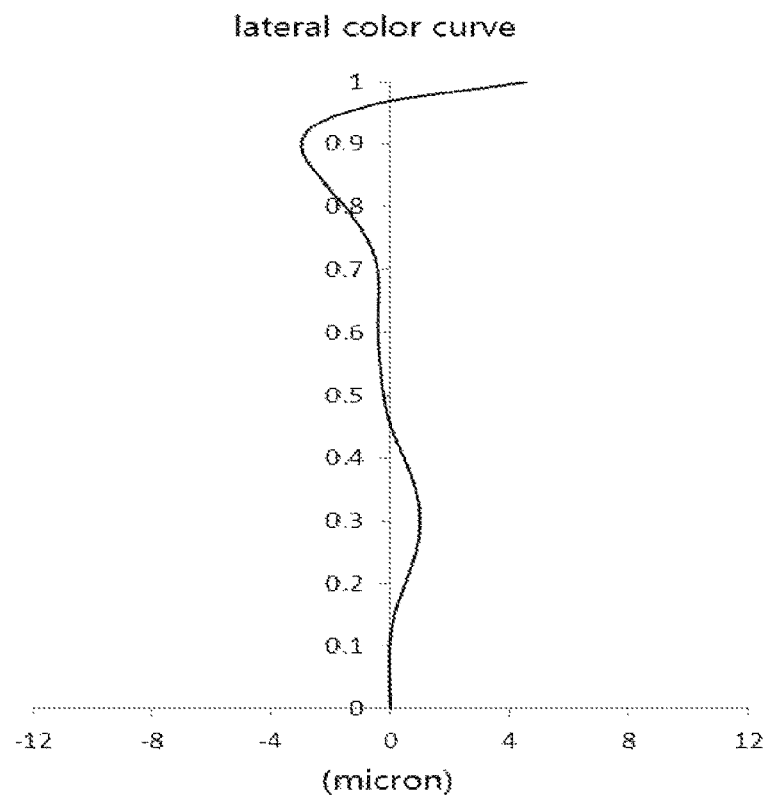

FIG. 10A shows a longitudinal aberration curve of the optical imaging lens according to embodiment 5 to represent deviation of a convergence focal point after light with different wavelengths passes through the lens. FIG. 10B shows an astigmatism curve of the optical imaging lens according to embodiment 5 to represent a meridian image surface curvature and a sagittal image surface curvature. FIG. 10C shows a distortion curve of the optical imaging lens according to embodiment 5 to represent distortion values corresponding to different fields of view. FIG. 10D shows a lateral color curve of the optical imaging lens according to embodiment 5 to represent deviation of different image heights on the imaging surface after the light passes through the lens. According to FIG. 10A to FIG. 10D, it can be seen that the optical imaging lens provided in embodiment 5 may achieve high imaging quality.

Embodiment 6

Figure 11:
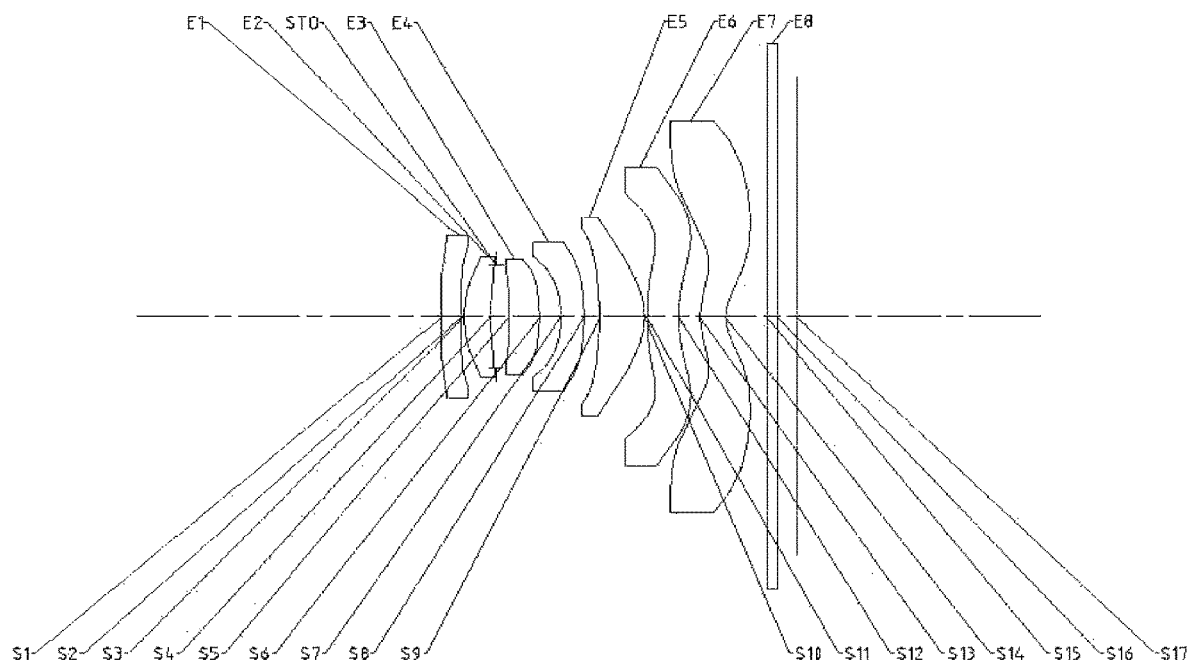
FIG. 11 shows a structure diagram of an optical imaging lens according to embodiment 6 of the disclosure.

An optical imaging lens according to embodiment 6 of the disclosure is described below with reference to FIG. 11 to FIG. 12D. FIG. 11 shows a structure diagram of an optical imaging lens according to embodiment 6 of the disclosure.

As shown in FIG. 11, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a convex surface, while an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has negative refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 11 is a basic parameter table of the optical imaging lens of embodiment 6, and units of the curvature radius, the thickness and the focal length are all millimeter (mm). Table 12 shows high-order coefficients applied to each aspherical mirror surface in embodiment 6. A surface type of each aspherical surface may be defined by formula (1) given in embodiment 1.

TABLE 11

Embodiment 6: f = 4.48 mm, TTL = 7.01 mm, ImgH = 5.35 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| S1 | Aspherical | 778.8930 | 0.3952 | 1.65 | 23.53 | 69.21 | −99.0000 |
| S2 | Aspherical | −49.8871 | 0.0503 | | | | −76.7481 |
| S3 | Aspherical | 2.7089 | 0.5137 | 1.55 | 56.11 | 10.45 | −0.4778 |
| S4 | Aspherical | 4.8107 | 0.1235 | | | | −52.4486 |
| STO | Spherical | Infinite | 0.2380 | | | | |
| S5 | Aspherical | 25.4197 | 0.6156 | 1.55 | 56.11 | 7.81 | −21.4033 |
| S6 | Aspherical | −5.0825 | 0.4187 | | | | 11.4640 |
| S7 | Aspherical | −3.1844 | 0.4608 | 1.68 | 19.25 | −8.01 | 2.6488 |
| S8 | Aspherical | −8.1501 | 0.3240 | | | | 9.5003 |
| S9 | Aspherical | −9.5154 | 0.8627 | 1.55 | 56.11 | 4.35 | 19.0239 |
| S10 | Aspherical | −1.9630 | 0.0499 | | | | −2.2466 |
| S11 | Aspherical | 13.9206 | 0.6252 | 1.67 | 20.37 | −19.09 | −83.0612 |
| S12 | Aspherical | 6.5284 | 0.4130 | | | | 0.4070 |
| S13 | Aspherical | 1.6149 | 0.5079 | 1.53 | 55.87 | −7.60 | −6.9149 |
| S14 | Aspherical | 1.0300 | 0.8126 | | | | −3.5656 |
| S15 | Aspherical | Infinite | 0.2100 | 1.52 | 64.17 | | |
| S16 | Aspherical | Infinite | 0.3855 | | | | |
| S17 | Spherical | Infinite | Infinite | | | | |

TABLE 12

| Surface number | A4 | A6 | A8 | A10 | A12 |
|---|---|---|---|---|---|
| S1 | 1.2018E−02 | 1.7075E−03 | −1.2070E−03 | 4.0985E−04 | −6.8162E−05 |
| S2 | 2.7146E−02 | −3.7195E−03 | 2.0881E−03 | −3.7556E−04 | −1.7825E−05 |
| S3 | 4.1928E−03 | −1.4870E−02 | 2.7543E−02 | −3.9373E−02 | 3.2963E−02 |
| S4 | 2.6439E−02 | −6.0522E−02 | 6.1124E−02 | −5.0284E−02 | 2.8436E−02 |
| S5 | −2.6441E−02 | −1.5380E−02 | 1.3460E−02 | −2.6562E−02 | 3.3868E−02 |
| S6 | −3.0398E−02 | −8.8967E−03 | 9.5403E−05 | 4.0424E−02 | −6.3175E−03 |
| S7 | −8.2610E−02 | 1.1117E−01 | −3.3893E−01 | 6.2269E−01 | −7.3336E−01 |
| S8 | −9.0908E−02 | 1.5368E−01 | −2.3694E−01 | 2.3441E−01 | −1.5195E−01 |
| S9 | −1.0844E−01 | 2.2209E−01 | −2.3387E−01 | 1.5511E−01 | −6.8038E−02 |
| S10 | −2.4314E−02 | 5.5645E−02 | −5.6929E−02 | 3.1578E−02 | −1.0226E−02 |
| S11 | 1.0004E−01 | −6.6054E−02 | 1.8418E−02 | −2.3322E−03 | −6.6646E−05 |
| S12 | 7.8622E−02 | −6.2561E−02 | 2.1750E−02 | −4.7893E−03 | 7.0171E−04 |
| S13 | −4.2571E−02 | −2.1337E−02 | 1.1833E−02 | −2.5153E−03 | 3.0251E−04 |
| S14 | −5.0312E−02 | 6.1758E−03 | 2.6071E−04 | −1.6896E−04 | 2.3094E−05 |

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | −1.5067E−02 | 2.9121E−03 | 0.0000E+00 | 0.0000E+00 |
| S4 | −9.9517E−03 | 2.1561E−03 | 0.0000E+00 | 0.0000E+00 |
| S5 | −2.6991E−02 | 1.2222E−02 | −2.3016E−03 | 0.0000E+00 |
| S6 | 6.1495E−03 | −3.0576E−03 | 5.8465E−04 | 0.0000E+00 |
| S7 | 5.6055E−01 | −2.6644E−01 | 7.0981E−02 | −8.0270E−03 |
| S8 | 6.4503E−02 | −1.7269E−02 | 2.6337E−03 | −1.7194E−04 |
| S9 | 1.9685E−02 | −3.6160E−03 | 3.8077E−04 | −1.7349E−05 |
| S10 | 1.9715E−03 | −2.1614E−04 | 1.1550E−05 | −1.8049E−07 |

TABLE 12-continued

| | | | | |
|---|---|---|---|---|
| S11 | 5.6276E−05 | −6.0516E−06 | 2.0997E−07 | 4.7334E−10 |
| S12 | −6.8410E−05 | 4.2800E−06 | −1.5555E−07 | 2.4911E−09 |
| S13 | −2.2266E−05 | 9.9713E−07 | −2.5045E−08 | 2.7139E−10 |
| S14 | −1.6994E−06 | 7.2965E−08 | −1.7153E−09 | 1.7031E−11 |

Figure 12A:
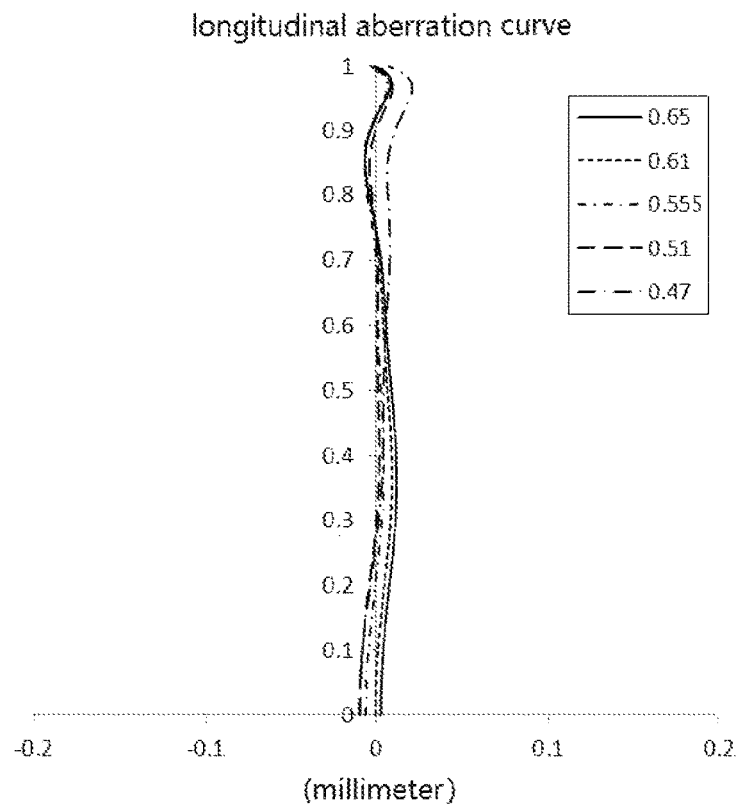
FIG. 12A to FIG. 12D show a longitudinal aberration curve, an astigmatism curve, a distortion curve and a lateral color curve of an optical imaging lens according to embodiment 6 respectively.
Figure 12B:
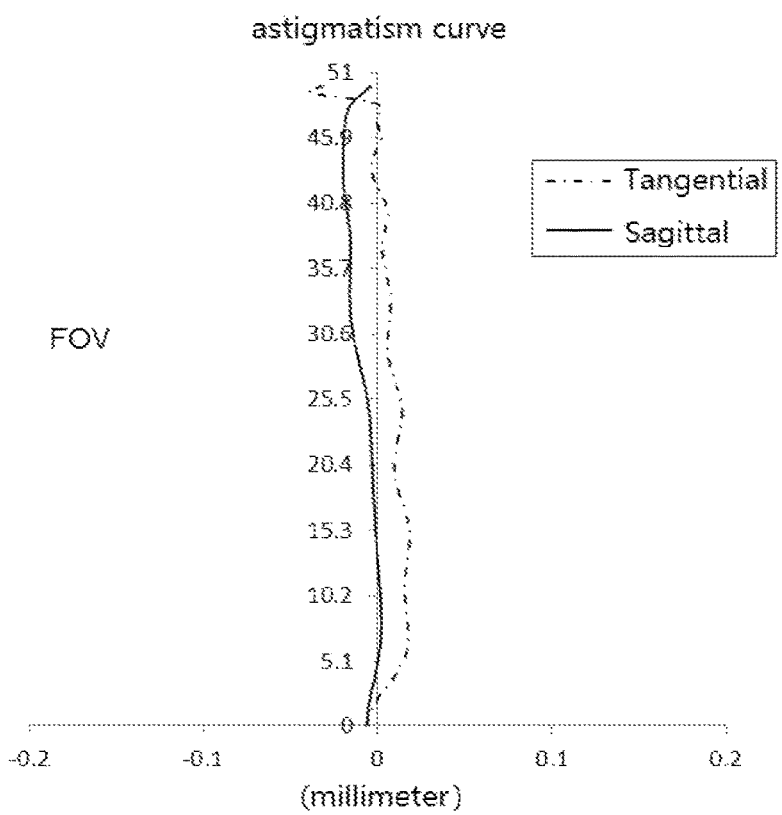
Figure 12C:
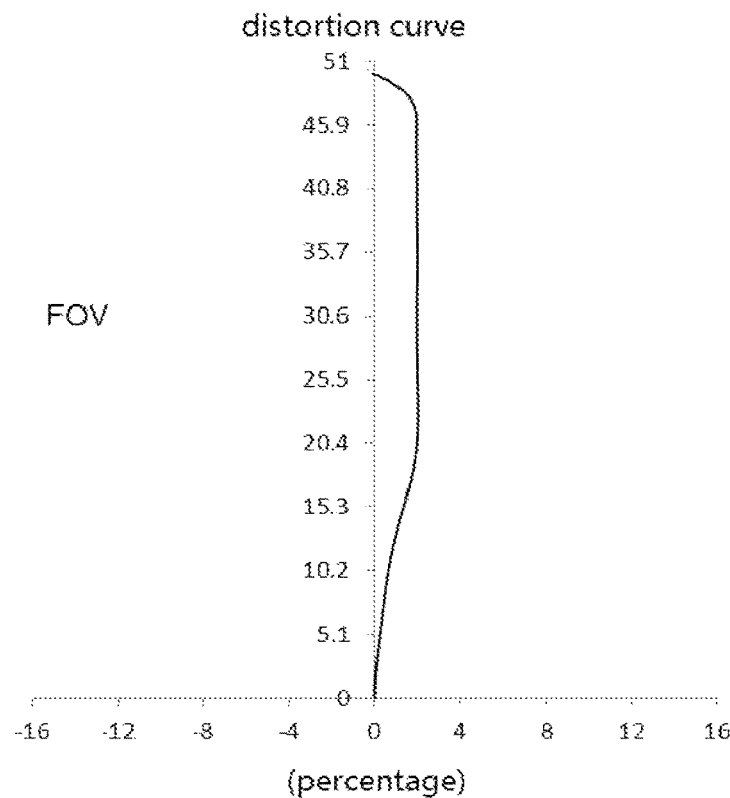
Figure 12D:
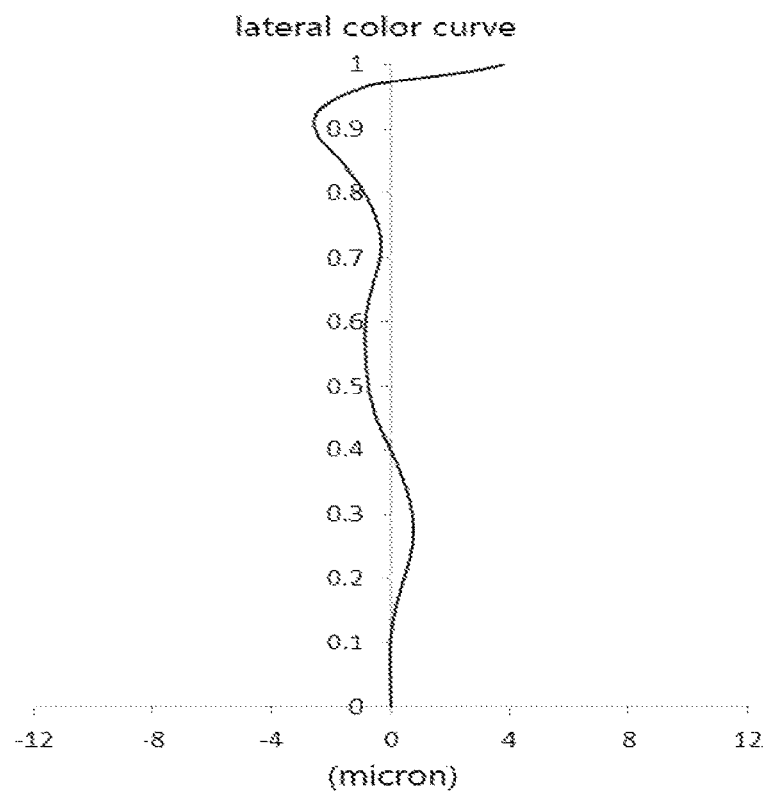

FIG. 12A shows a longitudinal aberration curve of the optical imaging lens according to embodiment 6 to represent deviation of a convergence focal point after light with different wavelengths passes through the lens. FIG. 12B shows an astigmatism curve of the optical imaging lens according to embodiment 6 to represent a meridian image surface curvature and a sagittal image surface curvature. FIG. 12C shows a distortion curve of the optical imaging lens according to embodiment 6 to represent distortion values corresponding to different fields of view. FIG. 12D shows a lateral color curve of the optical imaging lens according to embodiment 6 to represent deviation of different image heights on the imaging surface after the light passes through the lens. According to FIG. 12A to FIG. 12D, it can be seen that the optical imaging lens provided in embodiment 6 may achieve high imaging quality.

Embodiment 7

Figure 13:
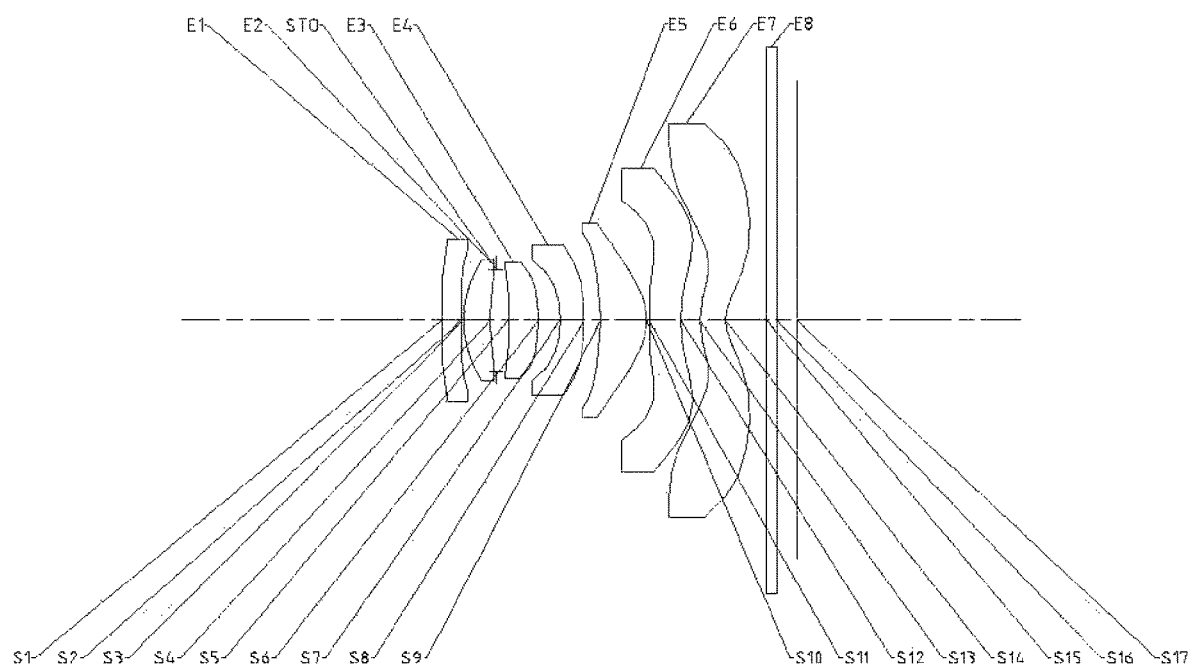
FIG. 13 shows a structure diagram of an optical imaging lens according to embodiment 7 of the disclosure.

An optical imaging lens according to embodiment 7 of the disclosure is described below with reference to FIG. 13 to FIG. 14D. FIG. 13 shows a structure diagram of an optical imaging lens according to embodiment 7 of the disclosure.

As shown in FIG. 13, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a concave surface, while an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has negative refractive power, an object-side surface S11 thereof is a concave surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 13 is a basic parameter table of the optical imaging lens of embodiment 7, and units of the curvature radius, the thickness and the focal length are all millimeter (mm). Table 14 shows high-order coefficients applied to each aspherical mirror surface in embodiment 7. A surface type of each aspherical surface may be defined by formula (1) given in embodiment 1.

TABLE 13

Embodiment 7: f = 4.45 mm, TTL = 6.99 mm, ImgH = 5.35 mm

| Surface number | Surface type | Curvature radius | Thickness | Material Refractive index | Material Abbe number | Focal length | Conic coefficient |
|---|---|---|---|---|---|---|---|
| OBJ | Spherical | Infinite | Infinite | | | | |
| S1 | Aspherical | −715.5514 | 0.3975 | 1.65 | 23.53 | 57.94 | 98.1010 |
| S2 | Aspherical | −37.2247 | 0.0400 | | | | −98.1564 |
| S3 | Aspherical | 2.7141 | 0.5126 | 1.55 | 56.11 | 10.76 | −0.4531 |
| S4 | Aspherical | 4.7071 | 0.1258 | | | | −51.8357 |
| STO | Spherical | Infinite | 0.2317 | | | | |
| S5 | Aspherical | 24.7795 | 0.5966 | 1.55 | 56.11 | 7.75 | −23.1466 |
| S6 | Aspherical | −5.0608 | 0.4254 | | | | 11.5560 |
| S7 | Aspherical | −3.1770 | 0.4735 | 1.68 | 19.25 | −7.76 | 2.6732 |
| S8 | Aspherical | −8.5087 | 0.3324 | | | | 9.6063 |
| S9 | Aspherical | −9.8753 | 0.9050 | 1.55 | 56.11 | 3.23 | 19.1112 |
| S10 | Aspherical | −1.5455 | 0.0510 | | | | −2.4378 |
| S11 | Aspherical | −47.1921 | 0.6241 | 1.67 | 20.37 | −8.47 | 73.9504 |
| S12 | Aspherical | 6.4497 | 0.3587 | | | | −0.0087 |
| S13 | Aspherical | 1.7542 | 0.5081 | 1.53 | 55.87 | −6.78 | −7.3627 |
| S14 | Aspherical | 1.0637 | 0.8123 | | | | −3.4997 |
| S15 | Aspherical | Infinite | 0.2100 | 1.52 | 64.17 | | |
| S16 | Aspherical | Infinite | 0.3848 | | | | |
| S17 | Spherical | Infinite | Infinite | | | | |

TABLE 14

| Surface number | A4 | A6 | A8 | A10 | A12 |
|---|---|---|---|---|---|
| S1 | 1.2063E−02 | 2.0476E−03 | −1.5965E−03 | 5.5889E−04 | −8.9715E−05 |
| S2 | 2.7714E−02 | −3.4572E−03 | 1.2893E−03 | 6.6993E−05 | −9.0553E−05 |
| S3 | 3.3348E−03 | −1.3662E−02 | 2.6028E−02 | −3.9866E−02 | 3.5096E−02 |
| S4 | 2.7996E−02 | −6.7856E−02 | 8.0037E−02 | −8.1854E−02 | 5.8855E−02 |
| S5 | −2.5919E−02 | −1.6294E−02 | 1.5143E−02 | −3.2473E−02 | 4.5499E−02 |
| S6 | −2.9674E−02 | −2.9358E−03 | −1.8330E−02 | 3.2897E−02 | −3.4786E−02 |
| S7 | −7.7419E−02 | 8.5639E−02 | −2.5633E−01 | 4.5873E−01 | −5.3729E−01 |
| S8 | −8.0304E−02 | 1.1155E−01 | −1.5086E−01 | 1.3190E−01 | −7.6824E−02 |
| S9 | −9.5694E−02 | 1.5599E−01 | −1.2859E−01 | 6.4979E−02 | −2.0864E−02 |
| S10 | −2.1981E−03 | 3.3007E−03 | 1.1838E−03 | −5.4673E−03 | 4.5416E−03 |
| S11 | 1.0786E−01 | −7.0077E−02 | 2.2766E−02 | −5.1698E−03 | 9.4828E−04 |
| S12 | 7.0185E−02 | −5.6600E−02 | 1.9899E−02 | −4.5410E−03 | 6.9967E−04 |
| S13 | −3.7231E−02 | −1.5811E−02 | 8.0772E−03 | −1.5507E−03 | 1.6724E−04 |
| S14 | −4.7276E−02 | 6.5981E−03 | −3.5499E−04 | 3.8565E−06 | −1.3905E−06 |

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | −1.6481E−02 | 3.2493E−03 | 0.0000E+00 | 0.0000E+00 |
| S4 | −2.5123E−02 | 5.3075E−03 | 0.0000E+00 | 0.0000E+00 |
| S5 | −4.0256E−02 | 2.0106E−02 | −4.1576E−03 | 0.0000E+00 |
| S6 | 2.2959E−02 | −8.3499E−03 | 1.2484E−03 | 0.0000E+00 |
| S7 | 4.1327E−01 | −1.9769E−01 | 5.2792E−02 | −5.9535E−03 |
| S8 | 2.9676E−02 | −7.2388E−03 | 9.9280E−04 | −5.5648E−05 |
| S9 | 4.0670E−03 | −4.1391E−04 | 9.5485E−06 | 1.2246E−06 |
| S10 | −1.8058E−03 | 3.8912E−04 | −4.3878E−05 | 2.0341E−06 |
| S11 | −1.5618E−04 | 2.0078E−05 | −1.5435E−06 | 5.0095E−08 |
| S12 | −7.1877E−05 | 4.7052E−06 | −1.7690E−07 | 2.8965E−09 |
| S13 | −1.0979E−05 | 4.3621E−07 | −9.6652E−09 | 9.1816E−11 |
| S14 | 2.9717E−07 | −2.1790E−08 | 7.1514E−10 | −8.9888E−12 |

Figure 14A:
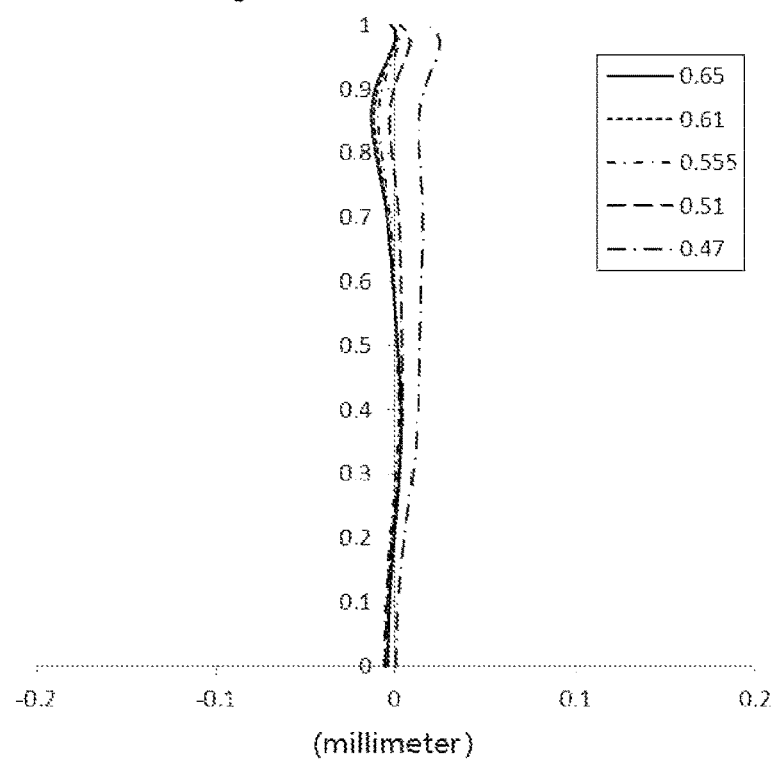
FIG. 14A to FIG. 14D show a longitudinal aberration curve, an astigmatism curve, a distortion curve and a lateral color curve of an optical imaging lens according to embodiment 7 respectively.
Figure 14B:
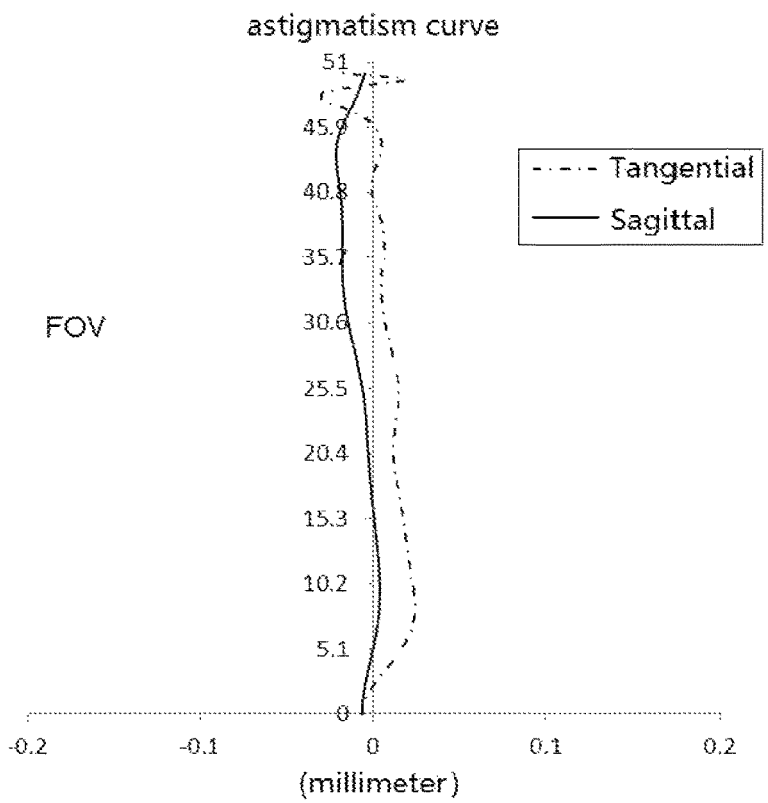
Figure 14C:
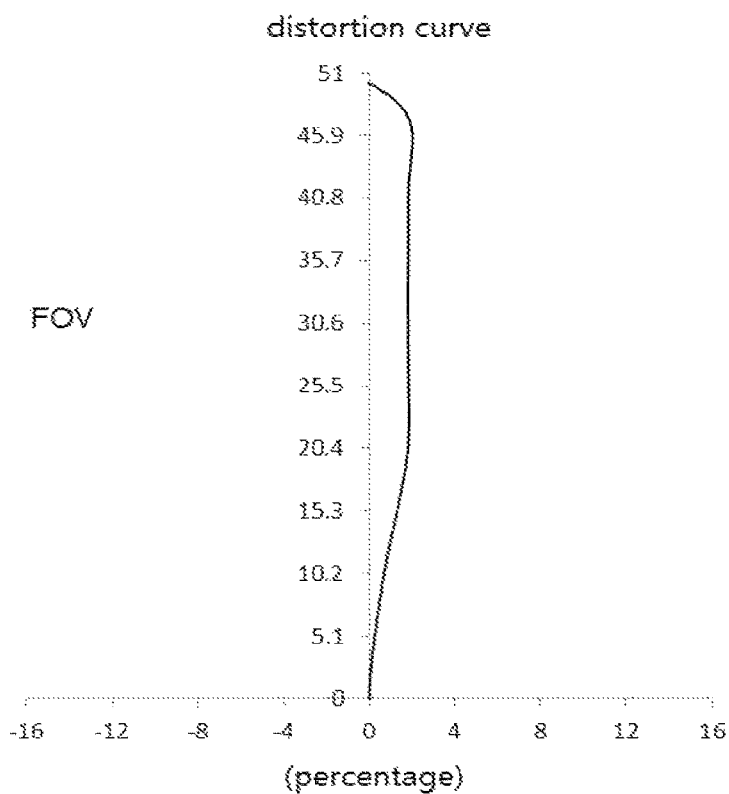
Figure 14D:
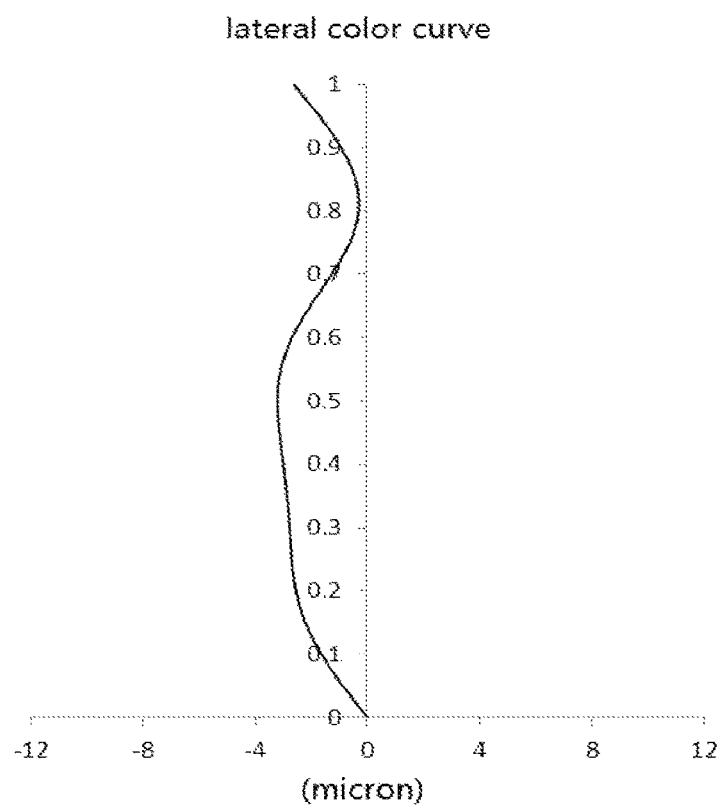

FIG. 14A shows a longitudinal aberration curve of the optical imaging lens according to embodiment 7 to represent deviation of a convergence focal point after light with different wavelengths passes through the lens. FIG. 14B shows an astigmatism curve of the optical imaging lens according to embodiment 7 to represent a meridian image surface curvature and a sagittal image surface curvature. FIG. 14C shows a distortion curve of the optical imaging lens according to embodiment 7 to represent distortion values corresponding to different fields of view. FIG. 14D shows a lateral color curve of the optical imaging lens according to embodiment 7 to represent deviation of different image heights on the imaging surface after the light passes through the lens. According to FIG. 14A to FIG. 14D, it can be seen that the optical imaging lens provided in embodiment 7 may achieve high imaging quality.

Embodiment 8

Figure 15:
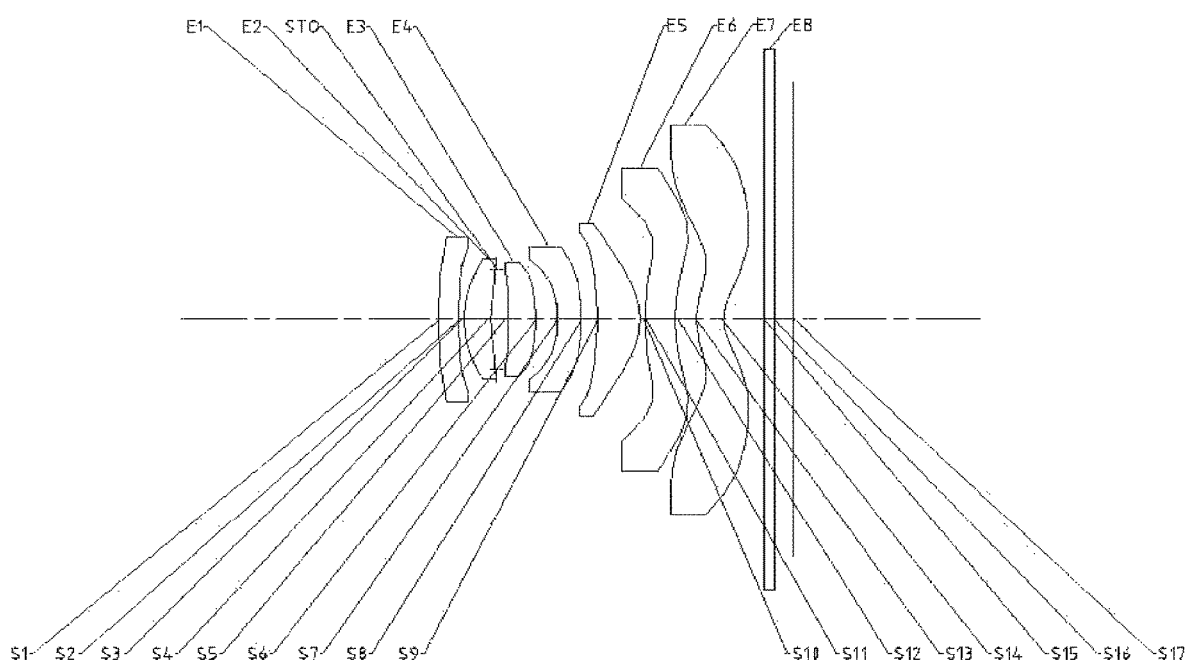
FIG. 15 shows a structure diagram of an optical imaging lens according to embodiment 8 of the disclosure.

An optical imaging lens according to embodiment 8 of the disclosure is described below with reference to FIG. 15 to FIG. 16D. FIG. 15 shows a structure diagram of an optical imaging lens according to embodiment 8 of the disclosure.

As shown in FIG. 15, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has negative refractive power, an object-side surface S1 thereof is a convex surface, while an image-side surface S2 is a concave surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, and an image-side surface S10 is a convex surface. The sixth lens E6 has negative refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 15 is a basic parameter table of the optical imaging lens of embodiment 8, and units of the curvature radius, the thickness and the focal length are all millimeter (mm). Table 16 shows high-order coefficients applied to each aspherical mirror surface in embodiment 8. A surface type of each aspherical surface may be defined by formula (1) given in embodiment 1.

TABLE 15

Embodiment 8: f = 4.39 mm, TTL = 6.97 mm, ImgH = 5.35 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| S1 | Aspherical | 82.1409 | 0.3925 | 1.65 | 23.53 | −278.13 | 95.0000 |
| S2 | Aspherical | 57.0963 | 0.0996 | | | | −74.9493 |
| S3 | Aspherical | 2.5189 | 0.5319 | 1.551 | 56.1 | 8.48 | −0.3828 |
| S4 | Aspherical | 5.1120 | 0.1070 | | | | −51.7999 |
| STO | Spherical | Infinite | 0.2289 | | | | |
| S5 | Aspherical | 36.9870 | 0.5502 | 1.55 | 56.11 | 8.15 | −82.5731 |
| S6 | Aspherical | −5.0315 | 0.4225 | | | | 11.3977 |
| S7 | Aspherical | −3.1501 | 0.4650 | 1.68 | 19.25 | −7.83 | 2.7367 |
| S8 | Aspherical | −8.2103 | 0.3431 | | | | 9.0430 |
| S9 | Aspherical | −9.5221 | 0.8229 | 1.55 | 56.11 | 3.97 | 19.0131 |
| S10 | Aspherical | −1.8191 | 0.1046 | | | | −2.2705 |
| S11 | Aspherical | 26.9997 | 0.5833 | 1.67 | 20.37 | −12.51 | −42.1798 |
| S12 | Aspherical | 6.3147 | 0.4118 | | | | 0.4583 |
| S13 | Aspherical | 1.5817 | 0.5328 | 1.53 | 55.87 | −8.94 | −6.8526 |
| S14 | Aspherical | 1.0497 | 0.7975 | | | | −3.4140 |
| S15 | Aspherical | Infinite | 0.2100 | 1.52 | 64.17 | | |
| S16 | Aspherical | Infinite | 0.3700 | | | | |
| S17 | Spherical | Infinite | Infinite | | | | |

TABLE 16

| Surface number | A4 | A6 | A8 | A10 | A12 |
|---|---|---|---|---|---|
| S1 | 1.4577E−02 | 3.5118E−04 | −8.4412E−04 | 3.3634E−04 | −6.1384E−05 |
| S2 | 2.4506E−02 | −1.8597E−03 | 1.0706E−03 | −1.1419E−04 | −3.8174E−05 |
| S3 | 3.8605E−03 | −2.5758E−02 | 6.4249E−02 | −9.5380E−02 | 7.9396E−02 |
| S4 | 2.3939E−02 | −5.8543E−02 | 7.8883E−02 | −9.9561E−02 | 8.5959E−02 |
| S5 | −2.6313E−02 | −2.3848E−02 | 3.9884E−02 | −8.2556E−02 | 9.9080E−02 |
| S6 | −3.5021E−02 | 3.0173E−02 | −1.1675E−01 | 2.0601E−01 | −2.1891E−01 |
| S7 | −9.2919E−02 | 1.5118E−01 | −4.1381E−01 | 7.2682E−01 | −8.5852E−01 |
| S8 | −9.4919E−02 | 1.6013E−01 | −2.3822E−01 | 2.2823E−01 | −1.4575E−01 |
| S9 | −9.5568E−02 | 1.7536E−01 | −1.6154E−01 | 9.3204E−02 | −3.5933E−02 |
| S10 | −1.9619E−02 | 3.1781E−02 | −2.2075E−02 | 6.6800E−03 | 8.1504E−05 |
| S11 | 9.8297E−02 | −6.6715E−02 | 2.3333E−02 | −6.2866E−03 | 1.4103E−03 |
| S12 | 6.9843E−02 | −5.2780E−02 | 1.7385E−02 | −3.6878E−03 | 5.2943E−04 |
| S13 | −3.8274E−02 | −1.5375E−02 | 8.0006E−03 | −1.5451E−03 | 1.6765E−04 |
| S14 | −4.3394E−02 | 4.8813E−03 | 9.5792E−05 | −8.6559E−05 | 1.0657E−05 |

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | −3.5198E−02 | 6.5096E−03 | 0.0000E+00 | 0.0000E+00 |
| S4 | −4.2783E−02 | 9.8080E−03 | 0.0000E+00 | 0.0000E+00 |
| S5 | −6.7478E−02 | 2.4333E−02 | −3.3944E−03 | 0.0000E+00 |
| S6 | 1.3984E−01 | −4.9203E−02 | 7.3058E−03 | 0.0000E+00 |
| S7 | 6.7332E−01 | −3.3102E−01 | 9.1233E−02 | −1.0644E−02 |
| S8 | 6.1756E−02 | −1.6582E−02 | 2.5292E−03 | −1.6320E−04 |
| S9 | 9.2949E−03 | −1.5576E−03 | 1.5226E−04 | −6.4877E−06 |
| S10 | −6.3597E−04 | 1.8256E−04 | −2.2375E−05 | 1.0547E−06 |
| S11 | −2.4858E−04 | 2.9680E−05 | −2.0181E−06 | 5.7890E−08 |
| S12 | −5.1074E−05 | 3.1661E−06 | −1.1340E−07 | 1.7738E−09 |
| S13 | −1.1101E−05 | 4.4660E−07 | −1.0071E−08 | 9.7963E−11 |
| S14 | −6.8833E−07 | 2.5700E−08 | −5.2296E−10 | 4.4855E−12 |

Figure 16A:
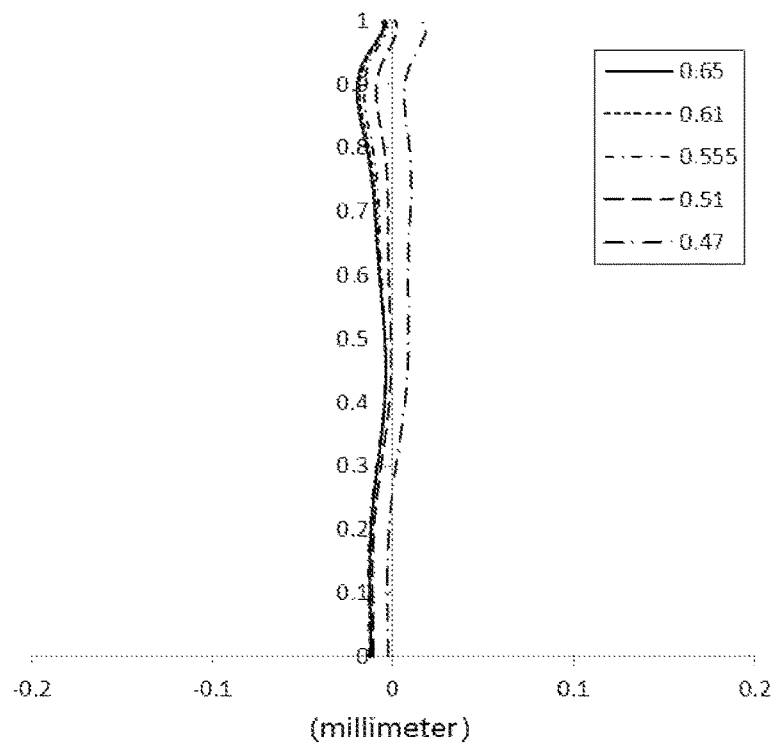
FIG. 16A to FIG. 16D show a longitudinal aberration curve, an astigmatism curve, a distortion curve and a lateral color curve of an optical imaging lens according to embodiment 8 respectively.
Figure 16B:
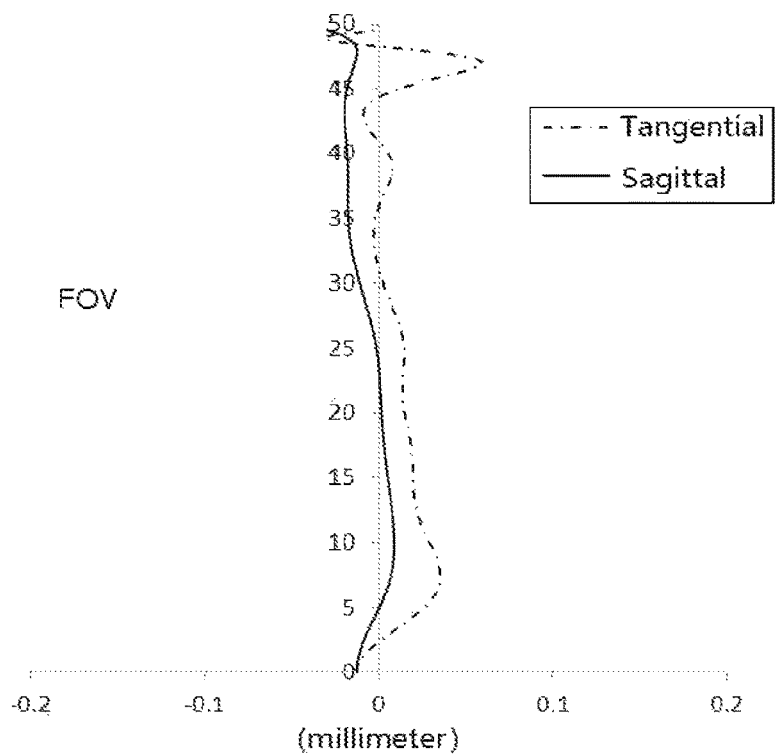
Figure 16C:
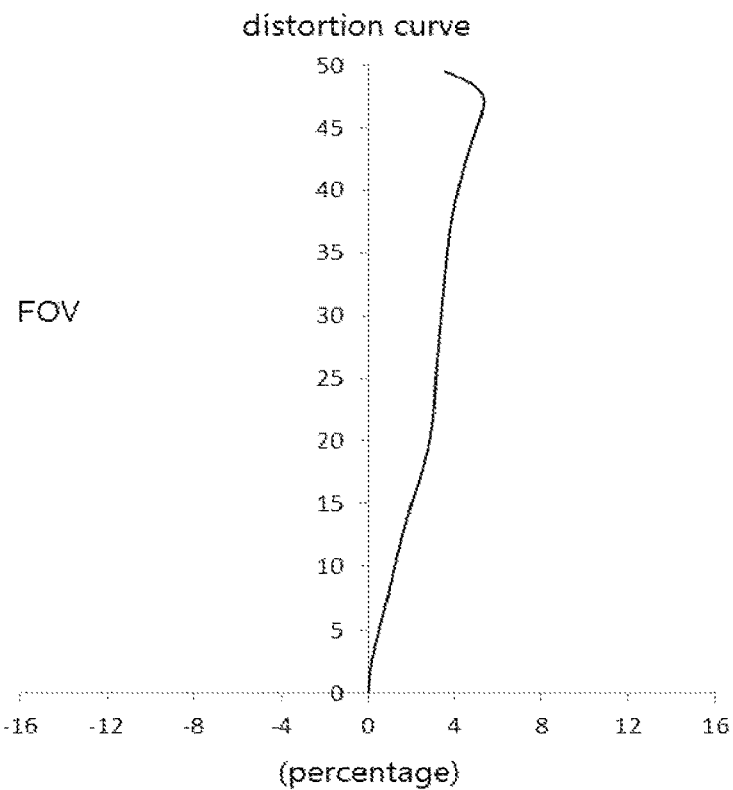
Figure 16D:
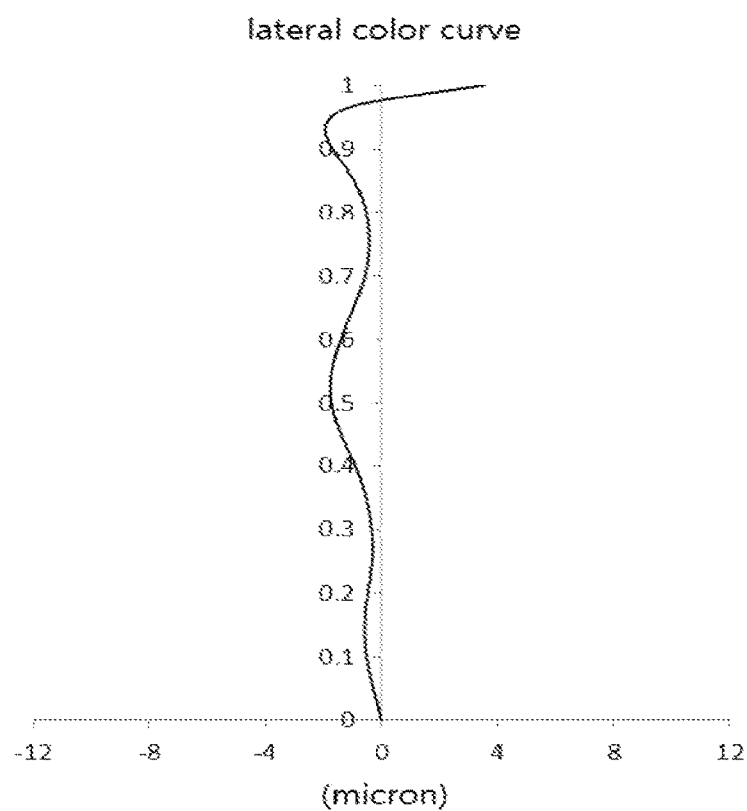

FIG. 16A shows a longitudinal aberration curve of the optical imaging lens according to embodiment 8 to represent deviation of a convergence focal point after light with different wavelengths passes through the lens. FIG. 16B shows an astigmatism curve of the optical imaging lens according to embodiment 8 to represent a meridian image surface curvature and a sagittal image surface curvature. FIG. 16C shows a distortion curve of the optical imaging lens according to embodiment 8 to represent distortion values corresponding to different fields of view. FIG. 16D shows a lateral color curve of the optical imaging lens according to embodiment 8 to represent deviation of different image heights on the imaging surface after the light passes through the lens. According to FIG. 16A to FIG. 16D, it can be seen that the optical imaging lens provided in embodiment 8 may achieve high imaging quality.

Embodiment 9

Figure 17:
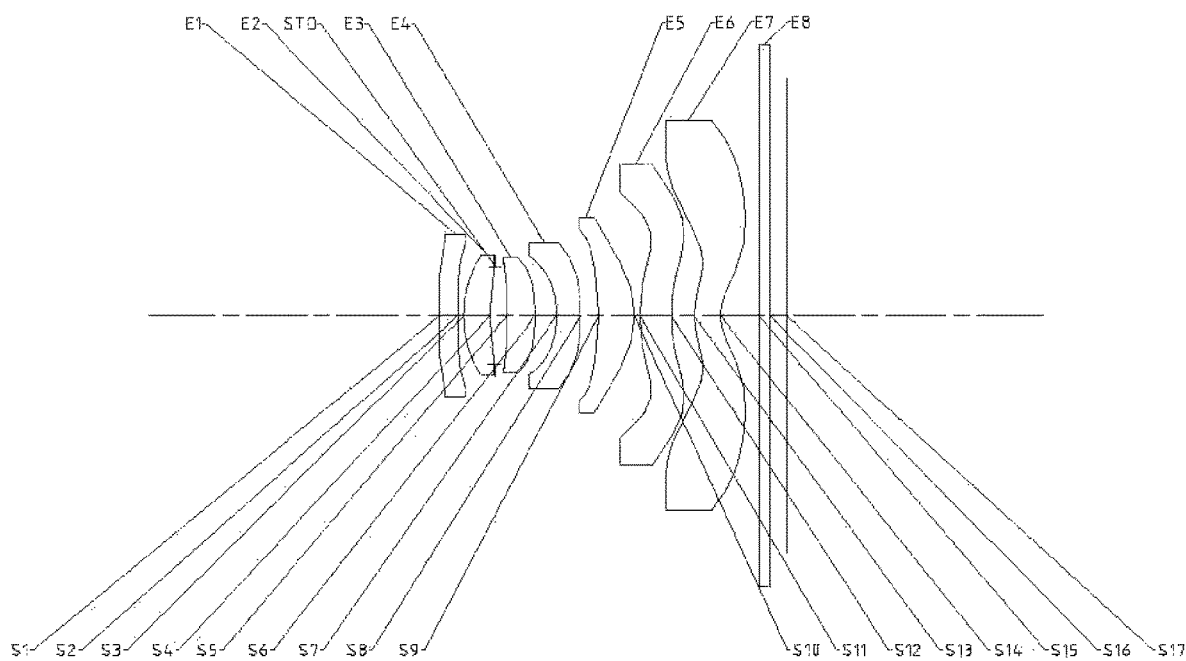
FIG. 17 shows a structure diagram of an optical imaging lens according to embodiment 9 of the disclosure.

An optical imaging lens according to embodiment 9 of the disclosure is described below with reference to FIG. 17 to FIG. 18D. FIG. 17 shows a structure diagram of an optical imaging lens according to embodiment 9 of the disclosure.

As shown in FIG. 17, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a convex surface, and an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has positive refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 17 is a basic parameter table of the optical imaging lens of embodiment 9, and units of the curvature radius, the thickness and the focal length are all millimeter (mm). Table 18 shows high-order coefficients applied to each aspherical mirror surface in embodiment 9. A surface type of each aspherical surface may be defined by formula (1) given in embodiment 1.

TABLE 17

Embodiments f = 4.31 mm, TTL = 6.85 mm, ImgH = 5.35 mm

| Surface number | Surface type | Curvature radius | Thickness | Material Refractive index | Material Abbe number | Focal length | Conic coefficient |
|---|---|---|---|---|---|---|---|
| OBJ | Spherical | Infinite | Infinite | | | | |
| S1 | Aspherical | 150.1798 | 0.3751 | 1.65 | 23.53 | 57.49 | 95.0350 |
| S2 | Aspherical | −52.5409 | 0.0999 | | | | 24.7632 |
| S3 | Aspherical | 2.7266 | 0.5200 | 1.55 | 56.11 | 10.94 | −0.3963 |
| S4 | Aspherical | 4.6781 | 0.1014 | | | | −49.8403 |
| STO | Spherical | Infinite | 0.2297 | | | | |
| S5 | Aspherical | 22.6030 | 0.5676 | 1.55 | 56.11 | 7.63 | −94.5536 |
| S6 | Aspherical | −5.0573 | 0.4125 | | | | 11.4075 |
| S7 | Aspherical | −3.1625 | 0.4763 | 1.68 | 19.25 | −8.15 | 2.6175 |
| S8 | Aspherical | −7.8449 | 0.3633 | | | | 10.5883 |
| S9 | Aspherical | −9.0524 | 0.7051 | 1.55 | 56.11 | 6.00 | 19.1808 |
| S10 | Aspherical | −2.4712 | 0.1000 | | | | −1.9665 |
| S11 | Aspherical | 5.9693 | 0.6231 | 1.67 | 20.37 | 85.36 | −72.3990 |
| S12 | Aspherical | 6.3906 | 0.4438 | | | | 0.4960 |
| S13 | Aspherical | 1.7129 | 0.5130 | 1.53 | 55.87 | −8.24 | −6.9354 |
| S14 | Aspherical | 1.1056 | 0.7683 | | | | −3.3552 |
| S15 | Aspherical | Infinite | 0.2100 | 1.52 | 64.17 | | |
| S16 | Aspherical | Infinite | 0.3408 | | | | |
| S17 | Spherical | Infinite | Infinite | | | | |

TABLE 18

| Surface number | A4 | A6 | A8 | A10 | A12 |
|---|---|---|---|---|---|
| S1 | 1.2197E−02 | 2.0517E−03 | −1.5752E−03 | 5.3334E−04 | −8.4586E−05 |
| S2 | 2.6914E−02 | −2.9048E−03 | 1.1206E−03 | −7.2077E−05 | −3.4459E−05 |
| S3 | 3.6980E−03 | −1.3400E−02 | 2.6830E−02 | −4.3613E−02 | 3.9798E−02 |
| S4 | 2.9694E−02 | −7.6384E−02 | 1.1148E−01 | −1.4824E−01 | 1.3284E−01 |
| S5 | −2.5113E−02 | −3.1290E−02 | 7.1023E−02 | −1.6963E−01 | 2.3949E−01 |
| S6 | −3.4110E−02 | 2.0134E−02 | −9.0228E−02 | 1.6163E−01 | −1.7342E−01 |
| S7 | −9.9155E−02 | 1.9234E−01 | −5.4320E−01 | 9.7083E−01 | −1.1368E+00 |
| S8 | −9.7667E−02 | 1.6804E−01 | −2.5814E−01 | 2.5377E−01 | −1.6376E−01 |
| S9 | −9.7834E−02 | 2.1332E−01 | −2.2881E−01 | 1.5202E−01 | −6.6416E−02 |
| S10 | −3.9352E−02 | 6.5297E−02 | −5.3607E−02 | 2.3714E−02 | −5.1576E−03 |
| S11 | 1.0529E−01 | −7.5966E−02 | 2.8191E−02 | −7.6601E−03 | 1.6269E−03 |
| S12 | 7.6968E−02 | −5.9235E−02 | 1.9961E−02 | −4.3146E−03 | 6.3028E−04 |
| S13 | −4.2575E−02 | −1.7611E−02 | 9.6727E−03 | −1.9577E−03 | 2.2172E−04 |
| S14 | −4.7491E−02 | 6.6876E−03 | −2.4623E−04 | −4.3834E−05 | 6.7508E−06 |

TABLE 18-continued

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | −1.9247E−02 | 3.9036E−03 | 0.0000E+00 | 0.0000E+00 |
| S4 | −6.7063E−02 | 1.5076E−02 | 0.0000E+00 | 0.0000E+00 |
| S5 | −1.9477E−01 | 8.4969E−02 | −1.5129E−02 | 0.0000E+00 |
| S6 | 1.1177E−01 | −3.9478E−02 | 5.8563E−03 | 0.0000E+00 |
| S7 | 8.6811E−01 | −4.1280E−01 | 1.1007E−01 | −1.2469E−02 |
| S8 | 6.9171E−02 | −1.8347E−02 | 2.7483E−03 | −1.7343E−04 |
| S9 | 1.9126E−02 | −3.5055E−03 | 3.7024E−04 | −1.7058E−05 |
| S10 | 2.1787E−04 | 1.3128E−04 | −2.5451E−05 | 1.4611E−06 |
| S11 | −2.6443E−04 | 2.9464E−05 | −1.9072E−06 | 5.2847E−08 |
| S12 | −6.1899E−05 | 3.9099E−06 | −1.4279E−07 | 2.2784E−09 |
| S13 | −1.5253E−05 | 6.3408E−07 | −1.4680E−08 | 1.4546E−10 |
| S14 | −4.3549E−07 | 1.5166E−08 | −2.7575E−10 | 2.0290E−12 |

Figure 18A:
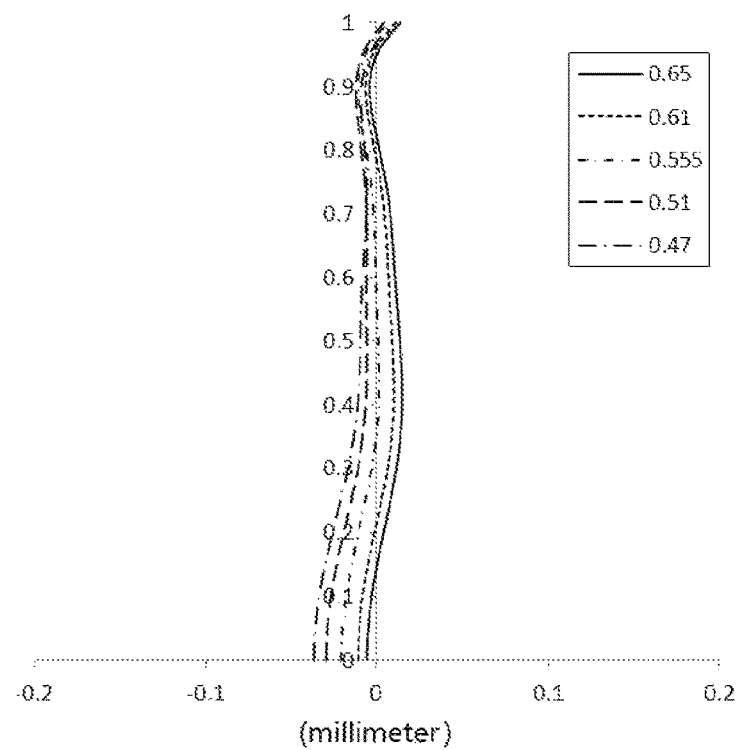
FIG. 18A to FIG. 18D show a longitudinal aberration curve, an astigmatism curve, a distortion curve and a lateral color curve of an optical imaging lens according to embodiment 9 respectively.
Figure 18B:
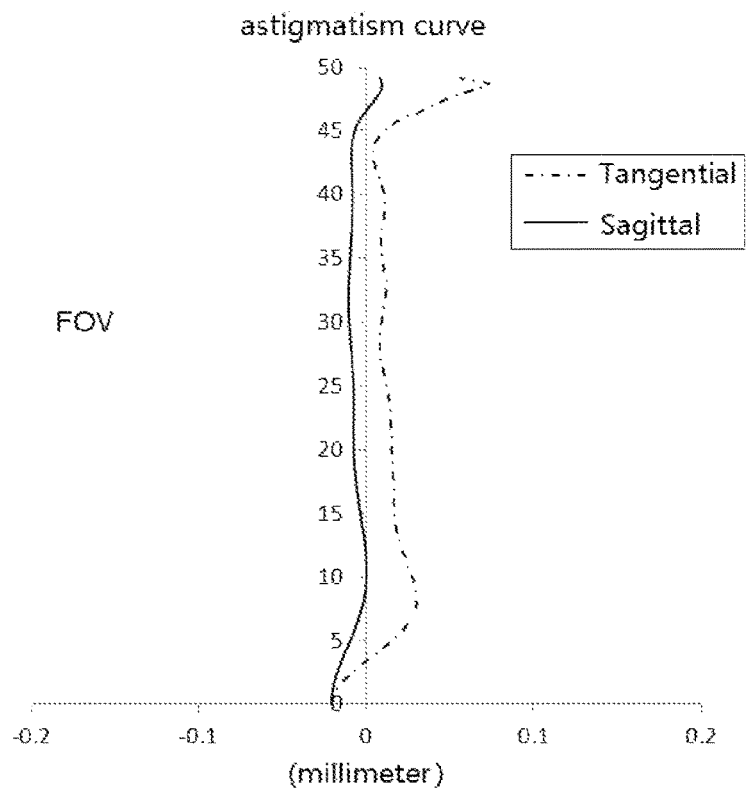
Figure 18C:
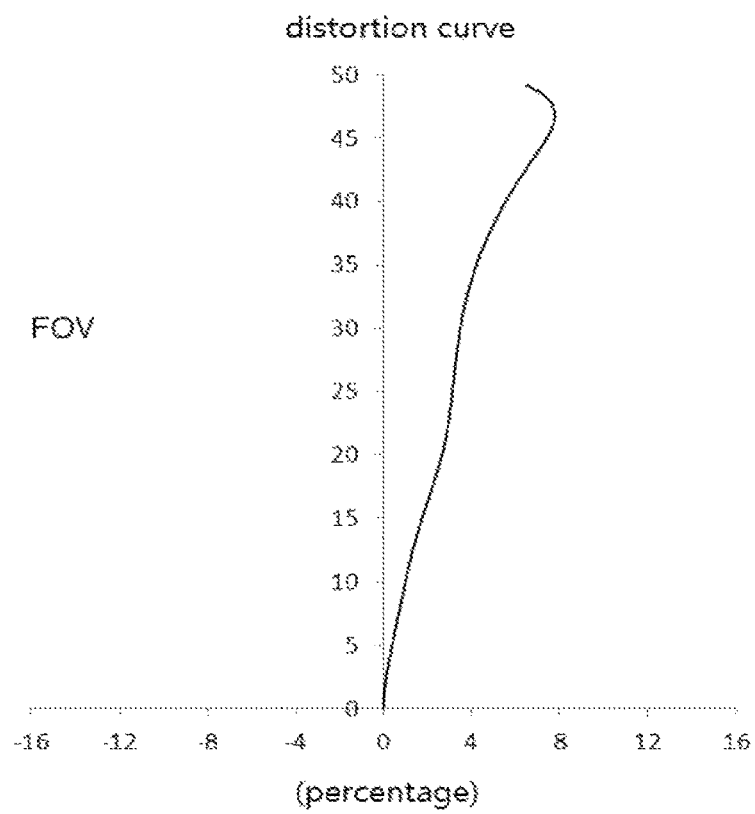
Figure 18D:
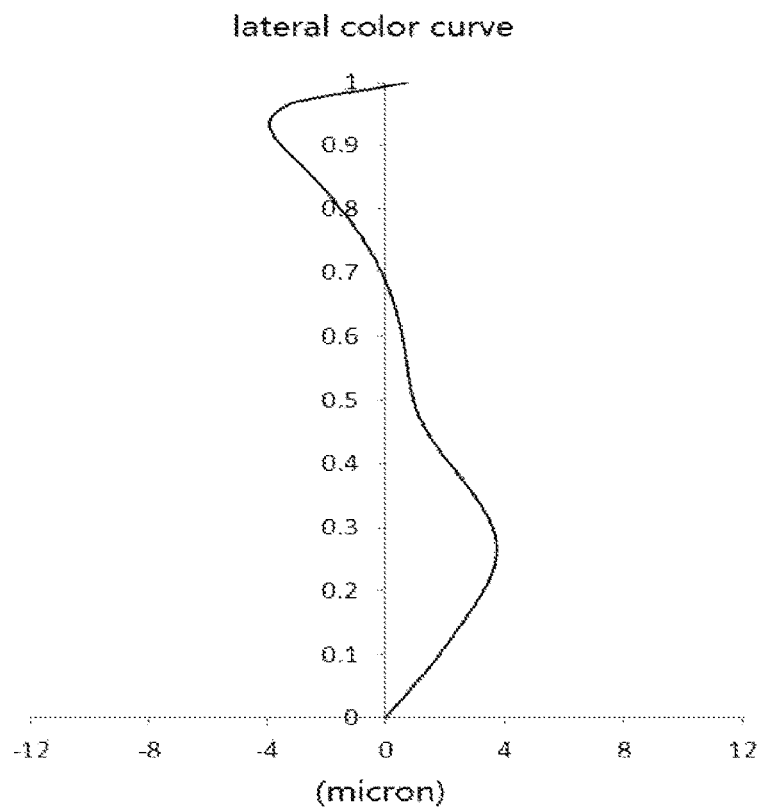

FIG. 18A shows a longitudinal aberration curve of the optical imaging lens according to embodiment 9 to represent deviation of a convergence focal point after light with different wavelengths passes through the lens. FIG. 18B shows an astigmatism curve of the optical imaging lens according to embodiment 9 to represent a meridian image surface curvature and a sagittal image surface curvature. FIG. 18C shows a distortion curve of the optical imaging lens according to embodiment 9 to represent distortion values corresponding to different fields of view. FIG. 18D shows a lateral color curve of the optical imaging lens according to embodiment 9 to represent deviation of different image heights on the imaging surface after the light passes through the lens. According to FIG. 18A to FIG. 18D, it can be seen that the optical imaging lens provided in embodiment 9 may achieve high imaging quality.

Embodiment 10

Figure 19:
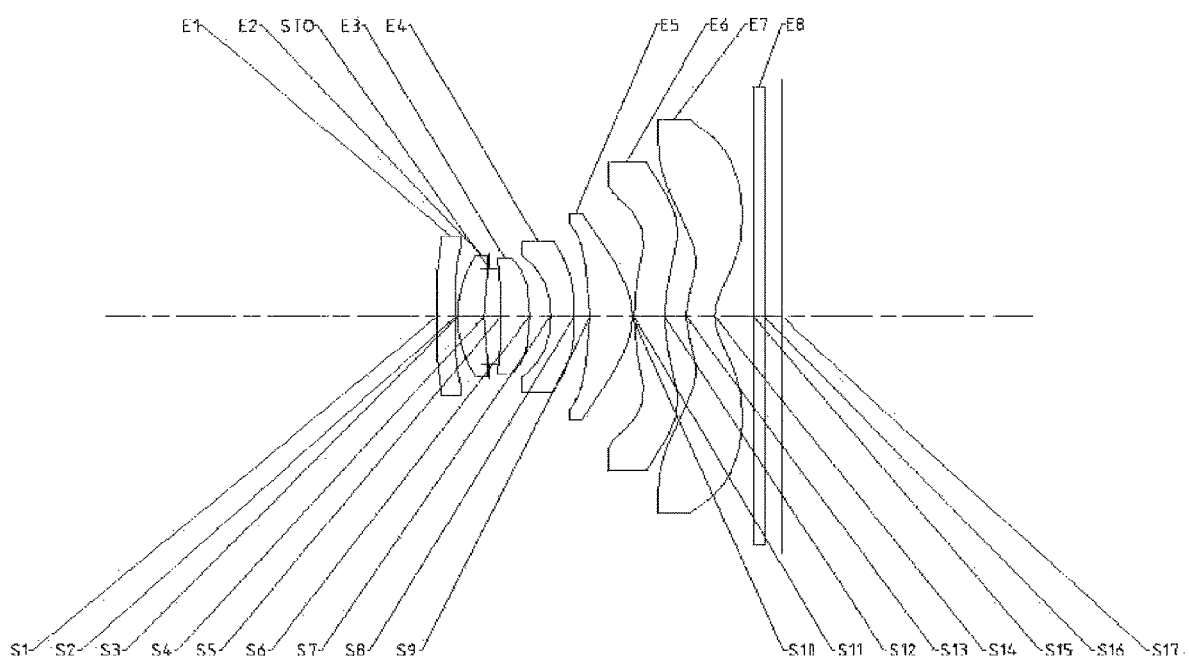
FIG. 19 shows a structure diagram of an optical imaging lens according to embodiment 10 of the disclosure.

An optical imaging lens according to embodiment 10 of the disclosure is described below with reference to FIG. 19 to FIG. 20D. FIG. 19 shows a structure diagram of an optical imaging lens according to embodiment 10 of the disclosure.

As shown in FIG. 19, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a concave surface, while an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has negative refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 19 is a basic parameter table of the optical imaging lens of embodiment 10, and units of the curvature radius, the thickness and the focal length are all millimeter (mm). Table 20 shows high-order coefficients applied to each aspherical mirror surface in embodiment 10. A surface type of each aspherical surface may be defined by formula (1) given in embodiment 1.

TABLE 19

Embodiment 10: f = 4.20 mm, TTL = 6.82 mm, ImgH = 5.35 mm

| Surface number | Surface type | Curvature radius | Thickness | Material Refractive index | Material Abbe number | Focal length | Conic coefficient |
|---|---|---|---|---|---|---|---|
| OBJ | Spherical | Infinite | Infinite | | | | |
| S1 | Aspherical | −126.9925 | 0.3708 | 1.65 | 23.53 | 64.54 | −95.0000 |
| S2 | Aspherical | −32.5677 | 0.0404 | | | | −95.0000 |
| S3 | Aspherical | 2.7323 | 0.5202 | 1.55 | 56.11 | 11.01 | −0.4187 |
| S4 | Aspherical | 4.6719 | 0.1053 | | | | −49.0743 |
| STO | Spherical | Infinite | 0.2227 | | | | |
| S5 | Aspherical | 22.2799 | 0.5758 | 1.55 | 56.11 | 7.60 | −95.0000 |
| S6 | Aspherical | −5.0507 | 0.4154 | | | | 11.4856 |
| S7 | Aspherical | −3.1887 | 0.4692 | 1.68 | 19.25 | −7.91 | 2.7012 |
| S8 | Aspherical | −8.3470 | 0.3184 | | | | 9.3493 |
| S9 | Aspherical | −9.7875 | 0.8325 | 1.55 | 56.11 | 4.40 | 18.9984 |
| S10 | Aspherical | −1.9853 | 0.0400 | | | | −2.1528 |
| S11 | Aspherical | 13.1721 | 0.6103 | 1.67 | 20.37 | −21.33 | −55.0598 |

TABLE 19-continued

Embodiment 10: f = 4.20 mm, TTL = 6.82 mm, ImgH = 5.35 mm

| Surface number | Surface type | Curvature radius | Thickness | Material Refractive index | Abbe number | Focal length | Conic coefficient |
|---|---|---|---|---|---|---|---|
| S12 | Aspherical | 6.7096 | 0.4130 | | | | 0.5094 |
| S13 | Aspherical | 1.5954 | 0.5668 | 1.53 | 55.87 | −9.22 | −6.7674 |
| S14 | Aspherical | 1.0569 | 0.7734 | | | | −3.3736 |
| S15 | Aspherical | Infinite | 0.2100 | 1.52 | 64.17 | | |
| S16 | Aspherical | Infinite | 0.3390 | | | | |
| S17 | Spherical | Infinite | Infinite | | | | |

TABLE 20

| Surface number | A4 | A6 | A8 | A10 | A12 |
|---|---|---|---|---|---|
| S1 | 1.1458E−02 | 2.4070E−03 | −1.8031E−03 | 6.0773E−04 | −9.3329E−05 |
| S2 | 2.7028E−02 | −3.9474E−03 | 1.7409E−03 | −2.1868E−04 | −1.7164E−05 |
| S3 | 4.8782E−03 | −1.5870E−02 | 2.8501E−02 | −4.1587E−02 | 3.5463E−02 |
| S4 | 2.6831E−02 | −5.5686E−02 | 4.6307E−02 | −2.8231E−02 | 7.1290E−03 |
| S5 | −2.3912E−02 | −1.5407E−02 | −4.434 0E−03 | 2.3235E−02 | −3.4039E−02 |
| S6 | −3.1038E−02 | 7.3963E−03 | −4.7669E−02 | 8.0612E−02 | −8.2968E−02 |
| S7 | −8.2954E−02 | 1.2487E−01 | −4.0376E−01 | 7.8104E−01 | −9.6225E−01 |
| S8 | −9.0460E−02 | 1.5403E−01 | −2.3677E−01 | 2.3081E−01 | −1.4630E−01 |
| S9 | −1.0962E−01 | 2.2462E−01 | −2.3448E−01 | 1.5404E−01 | −6.6957E−02 |
| S10 | −2.4018E−02 | 4.5829E−02 | −4.0429E−02 | 1.8828E−02 | −4.6418E−03 |
| S11 | 9.9492E−02 | −6.9584E−02 | 2.5276E−02 | −6.6925E−03 | 1.3689E−03 |
| S12 | 6.9021E−02 | −5.1507E−02 | 1.7143E−02 | −3.6973E−03 | 5.3867E−04 |
| S13 | −3.9646E−02 | −1.2927E−02 | 6.7973E−03 | −1.2590E−03 | 1.2867E−04 |
| S14 | −4.4824E−02 | 8.4771E−03 | −1.2651E−03 | 1.7466E−04 | −1.9230E−05 |

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | −1.6427E−02 | 3.2393E−03 | 0.0000E+00 | 0.0000E+00 |
| S4 | 1.9209E−03 | −3.8576E−04 | 0.0000E+00 | 0.0000E+00 |
| S5 | 2.1426E−02 | −4.8239E−03 | 1.2867E−04 | 0.0000E+00 |
| S6 | 5.3082E−02 | −1.9177E−02 | 2.9781E−03 | 0.0000E+00 |
| S7 | 7.5831E−01 | −3.6632E−01 | 9.8043E−02 | −1.1042E−02 |
| S8 | 6.0227E−02 | −1.5465E−02 | 2.2282E−03 | −1.3424E−04 |
| S9 | 1.9217E−02 | −3.5041E−03 | 3.6670E−04 | −1.6661E−05 |
| S10 | 4.9974E−04 | 1.4764E−05 | −8.2657E−06 | 5.3338E−07 |
| S11 | −2.1456E−04 | 2.3333E−05 | −1.4891E−06 | 4.0882E−08 |
| S12 | −5.2453E−05 | 3.2637E−06 | −1.1688E−07 | 1.8247E−09 |
| S13 | −7.8940E−06 | 2.8881E−07 | −5.7884E−09 | 4.8601E−11 |
| S14 | 1.4193E−06 | −6.3961E−08 | 1.5825E−09 | −1.6429E−11 |

Figure 20A:
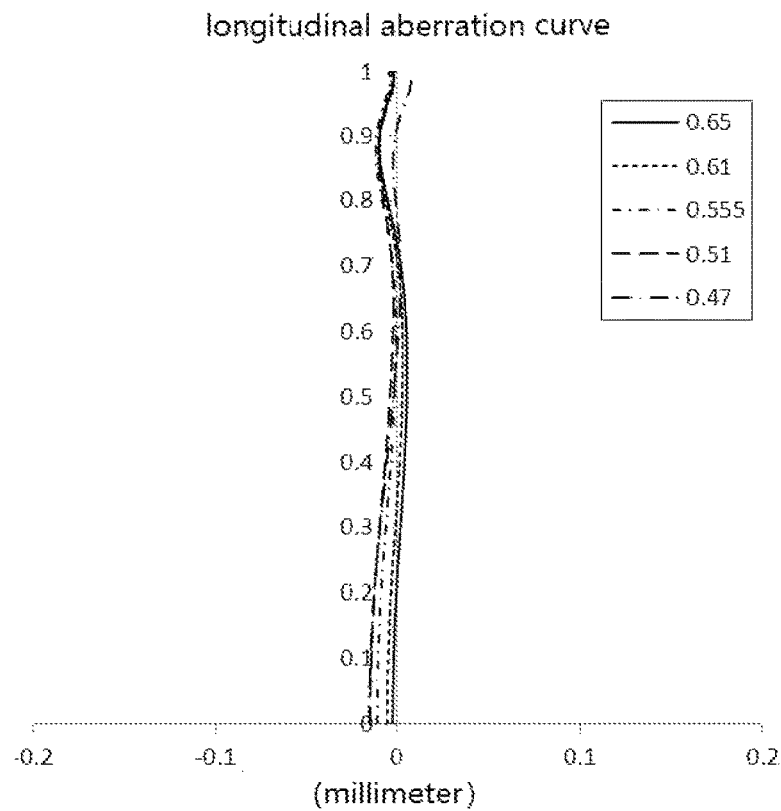
FIG. 20A to FIG. 20D show a longitudinal aberration curve, an astigmatism curve, a distortion curve and a lateral color curve of an optical imaging lens according to embodiment 10 respectively.
Figure 20B:
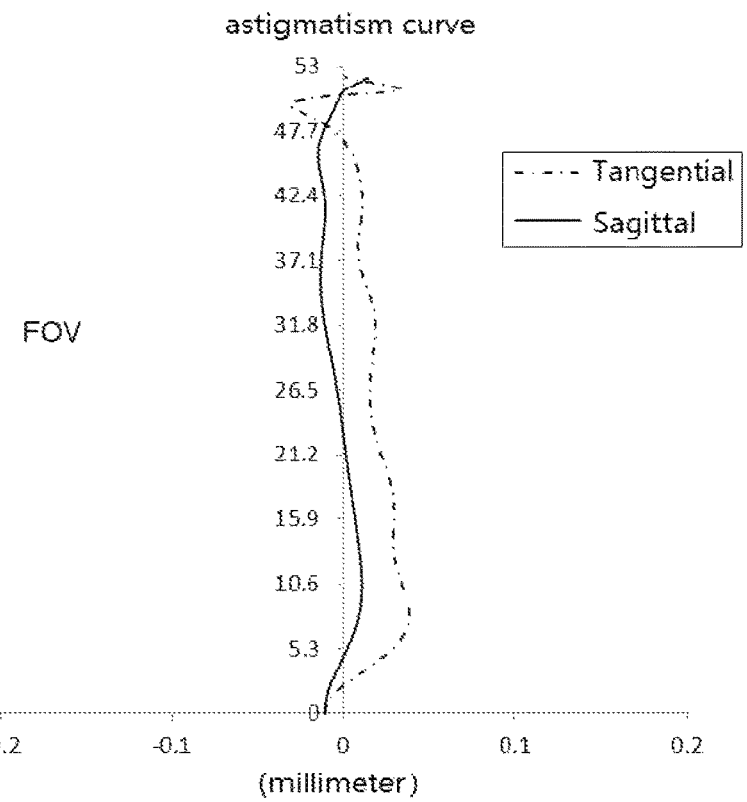
Figure 20C:
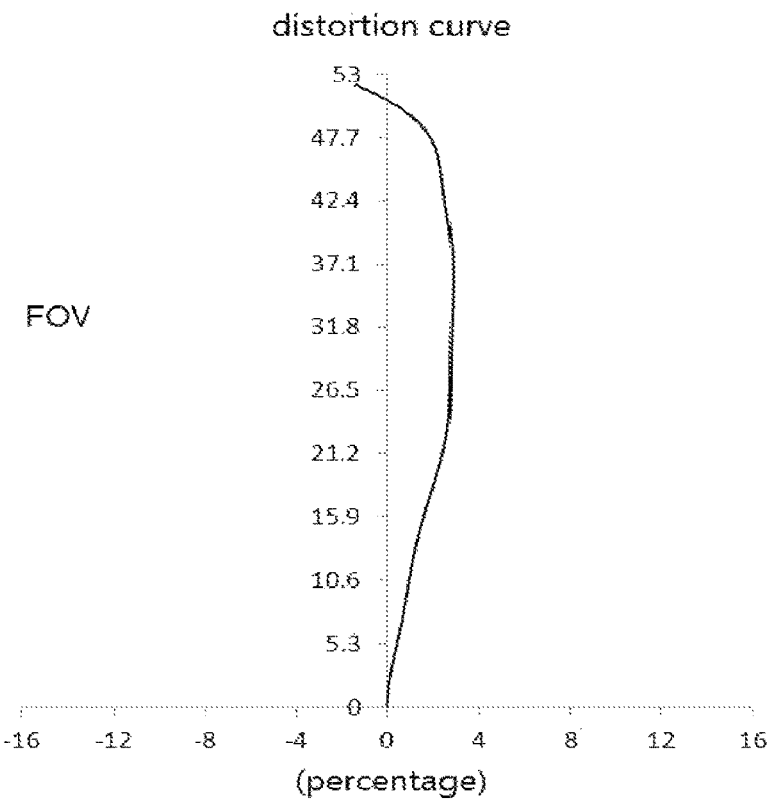
Figure 20D:
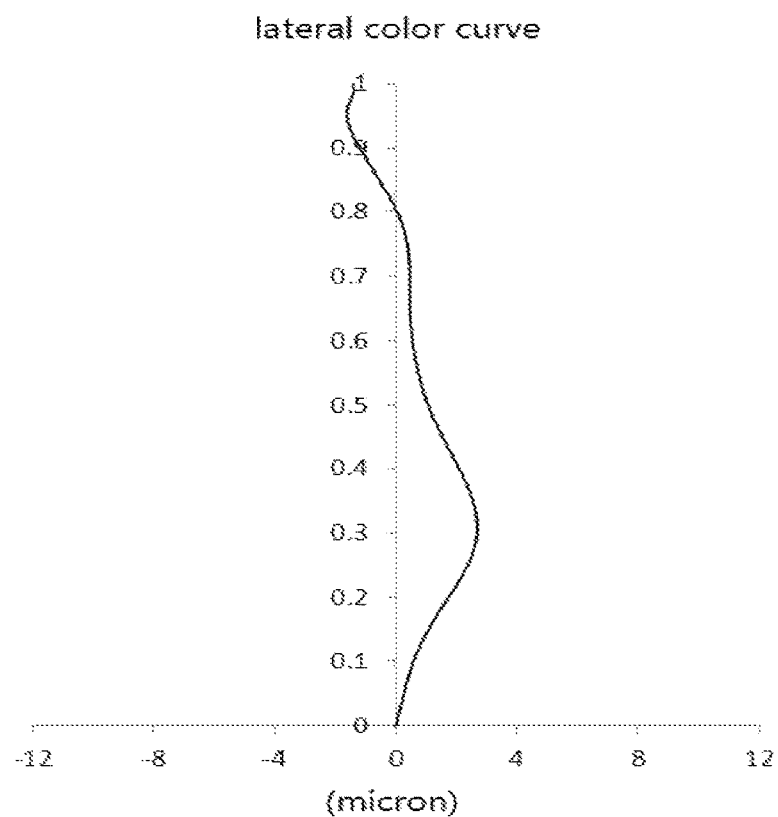

FIG. 20A shows a longitudinal aberration curve of the optical imaging lens according to embodiment 10 to represent deviation of a convergence focal point after light with different wavelengths passes through the lens. FIG. 20B shows an astigmatism curve of the optical imaging lens according to embodiment 10 to represent a meridian image surface curvature and a sagittal image surface curvature. FIG. 20C shows a distortion curve of the optical imaging lens according to embodiment 10 to represent distortion values corresponding to different fields of view. FIG. 20D illustrates a lateral color curve of the optical imaging lens according to embodiment 10 to represent deviation of different image heights on the imaging surface after the light passes through the lens. According to FIG. 20A to FIG. 20D, it can be seen that the optical imaging lens provided in embodiment 10 may achieve high imaging quality.

Embodiment 11

Figure 21:
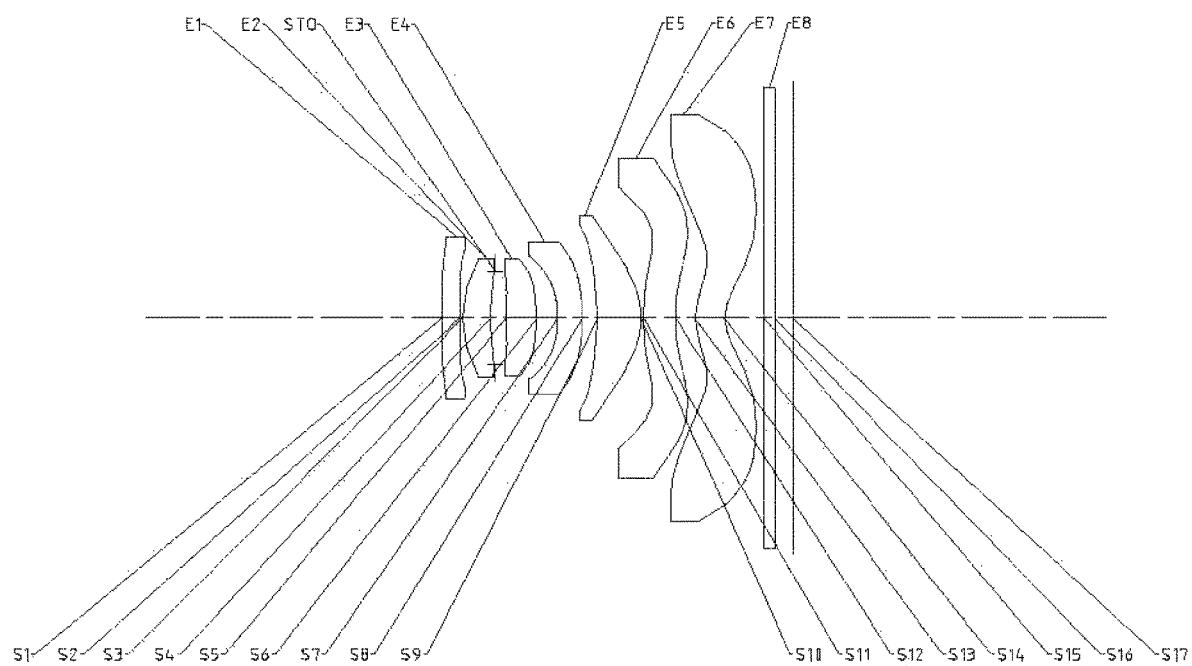
FIG. 21 shows a structure diagram of an optical imaging lens according to embodiment 11 of the disclosure.

An optical imaging lens according to embodiment 11 of the disclosure is described below with reference to FIG. 21 to FIG. 22D. FIG. 21 shows a structure diagram of an optical imaging lens according to embodiment 11 of the disclosure.

As shown in FIG. 21, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a concave surface, while an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has negative refractive power, an object-side surface S11 thereof is a convex surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 21 is a basic parameter table of the optical imaging lens of embodiment 11, and units of the curvature radius, the thickness and the focal length are all millimeter (mm). Table 22 shows high-order coefficients applied to each aspherical mirror surface in embodiment 11. A surface type of each aspherical surface may be defined by formula (1) given in embodiment 1.

TABLE 21

Embodiment 11: f = 4.05 mm, TTL = 6.92 mm, ImgH = 5.30 mm

| Surface number | Surface type | Curvature radius | Thickness | Material Refractive index | Material Abbe number | Focal length | Conic coefficient |
|---|---|---|---|---|---|---|---|
| OBJ | Spherical | Infinite | Infinite | | | | |
| S1 | Aspherical | −73.0758 | 0.3691 | 1.65 | 23.53 | 67.52 | 67.8536 |
| S2 | Aspherical | −28.1926 | 0.0494 | | | | −93.8081 |
| S3 | Aspherical | 2.8412 | 0.5278 | 1.55 | 56.11 | 11.35 | −0.4239 |
| S4 | Aspherical | 4.9023 | 0.1072 | | | | −49.2569 |
| STO | Spherical | Infinite | 0.2271 | | | | |
| S5 | Aspherical | 22.0632 | 0.5859 | 1.55 | 56.11 | 7.72 | 70.3955 |
| S6 | Aspherical | −5.1635 | 0.4148 | | | | 11.5023 |
| S7 | Aspherical | −3.2334 | 0.4781 | 1.68 | 19.25 | −8.10 | 2.7458 |
| S8 | Aspherical | −8.3374 | 0.3246 | | | | 9.5645 |
| S9 | Aspherical | −9.7420 | 0.8506 | 1.55 | 56.11 | 4.48 | 18.5171 |
| S10 | Aspherical | −2.0154 | 0.0410 | | | | −2.1286 |
| S11 | Aspherical | 13.4366 | 0.6224 | 1.67 | 20.37 | −21.80 | −55.8230 |
| S12 | Aspherical | 6.8514 | 0.3934 | | | | 0.3394 |
| S13 | Aspherical | 1.4160 | 0.5778 | 1.53 | 55.87 | −12.08 | −6.7548 |
| S14 | Aspherical | 0.9966 | 0.7808 | | | | −3.3086 |
| S15 | Aspherical | Infinite | 0.2100 | 1.52 | 64.17 | | |
| S16 | Aspherical | Infinite | 0.3564 | | | | |
| S17 | Spherical | Infinite | Infinite | | | | |

TABLE 22

| Surface number | A4 | A6 | A8 | A10 | A12 |
|---|---|---|---|---|---|
| S1 | 1.0605E−02 | 2.4878E−03 | −1.7284E−03 | 5.4213E−04 | −7.7498E−05 |
| S2 | 2.5964E−02 | −4.5165E−03 | 2.1859E−03 | −4.2016E−04 | 1.6082E−05 |
| S3 | −1.4813E−03 | 1.3777E−02 | −3.3821E−02 | 3.2805E−02 | −1.5273E−02 |
| S4 | 2.2075E−02 | −4.6358E−02 | 6.2102E−02 | −9.2211E−02 | 8.7506E−02 |
| S5 | −1.4040E−02 | −8.4641E−02 | 2.5938E−01 | −5.1508E−01 | 6.1377E−01 |
| S6 | −3.6909E−02 | 3.6288E−02 | −9.5138E−02 | 1.1308E−01 | −7.1197E−02 |
| S7 | −7.8584E−02 | 1.0846E−01 | −3.1857E−01 | 5.6203E−01 | −6.4954E−01 |
| S8 | −9.0836E−02 | 1.6007E−01 | −2.6255E−01 | 2.7748E−01 | −1.9250E−01 |
| S9 | −1.0605E−01 | 2.1312E−01 | −2.2361E−01 | 1.4889E−01 | −6.5572E−02 |
| S10 | −1.5233E−02 | 2.1261E−02 | −1.4496E−02 | 4.6325E−03 | −3.3820E−04 |
| S11 | 9.4444E−02 | −6.4400E−02 | 2.2478E−02 | −5.3320E−03 | 8.7400E−04 |
| S12 | 6.4346E−02 | −4.7323E−02 | 1.6089E−02 | −3.6374E−03 | 5.5800E−04 |
| S13 | −3.4362E−02 | −9.9279E−03 | 4.8224E−03 | −8.1607E−04 | 7.5837E−05 |
| S14 | −4.3484E−02 | 9.6153E−03 | −1.8084E−03 | 2.7662E−04 | −2.9227E−05 |

| Surface number | A14 | A16 | A18 | A20 |
|---|---|---|---|---|
| S1 | 9.5988E−08 | 5.6123E−08 | 1.2601E−08 | −4.6831E−09 |
| S2 | 1.0586E−07 | 1.2104E−08 | 4.6078E−08 | −3.4816E−09 |
| S3 | 2.2668E−03 | 2.8417E−04 | 0.0000E+00 | 0.0000E+00 |
| S4 | −4.3439E−02 | 9.0644E−03 | 0.0000E+00 | 0.0000E+00 |
| S5 | −4.3655E−01 | 1.7058E−01 | −2.7973E−02 | 0.0000E+00 |
| S6 | 2.1295E−02 | −1.6691E−03 | −2.5744E−04 | 0.0000E+00 |
| S7 | 4.9371E−01 | −2.3424E−01 | 6.2165E−02 | −6.9706E−03 |
| S8 | 8.6998E−02 | −2.4518E−02 | 3.8862E−03 | −2.6198E−04 |
| S9 | 1.8975E−02 | −3.4633E−03 | 3.6025E−04 | −1.6196E−05 |
| S10 | −1.9185E−04 | 5.8161E−05 | −6.5046E−06 | 2.6693E−07 |

TABLE 22-continued

| | | | | |
|---|---|---|---|---|
| S11 | −1.0119E−04 | 8.2053E−06 | −4.1863E−07 | 9.8697E−09 |
| S12 | −5.6613E−05 | 3.6090E−06 | −1.3020E−07 | 2.0196E−09 |
| S13 | −4.2081E−06 | 1.3834E−07 | −2.4712E−09 | 1.8305E−11 |
| S14 | 1.9436E−06 | −7.6743E−08 | 1.6302E−09 | −1.4218E−11 |

Figure 22A:
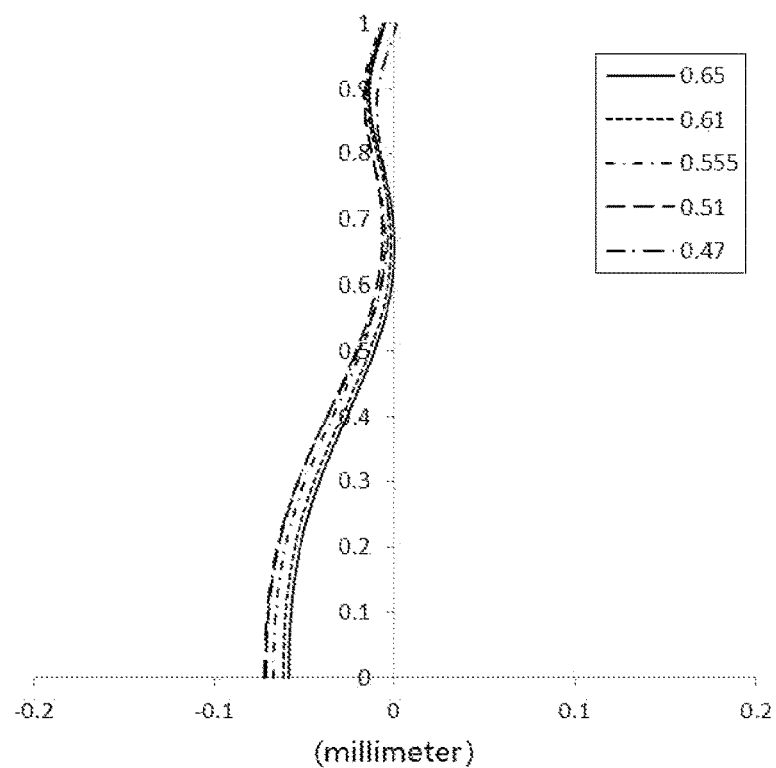
FIG. 22A to FIG. 22D show a longitudinal aberration curve, an astigmatism curve, a distortion curve and a lateral color curve of an optical imaging lens according to embodiment 11 respectively.
Figure 22B:
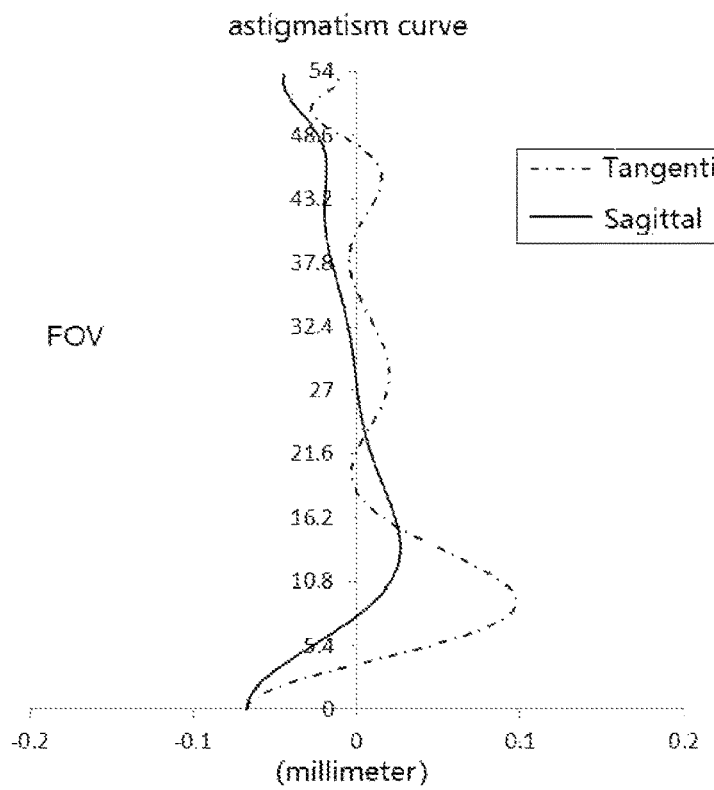
Figure 22C:
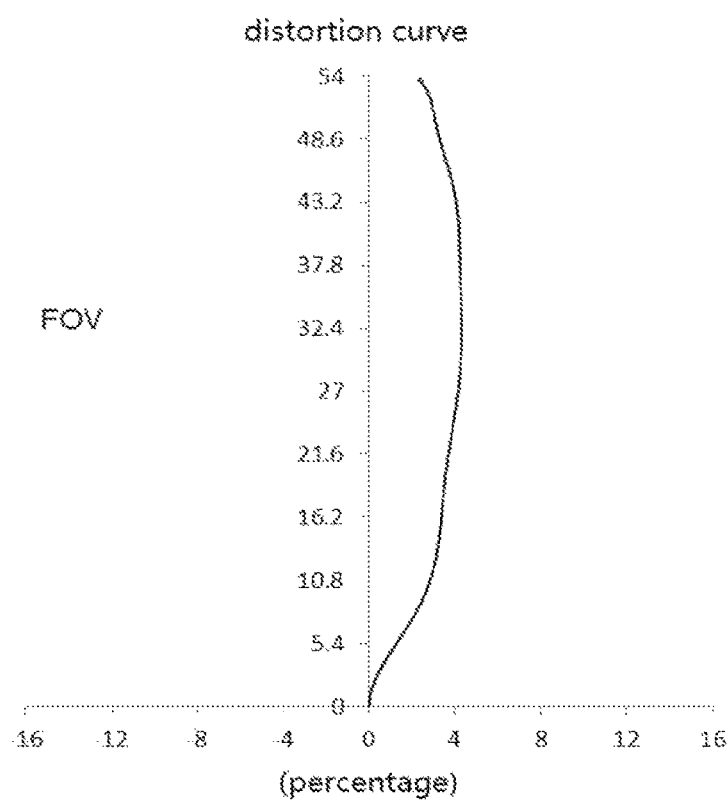
Figure 22D:
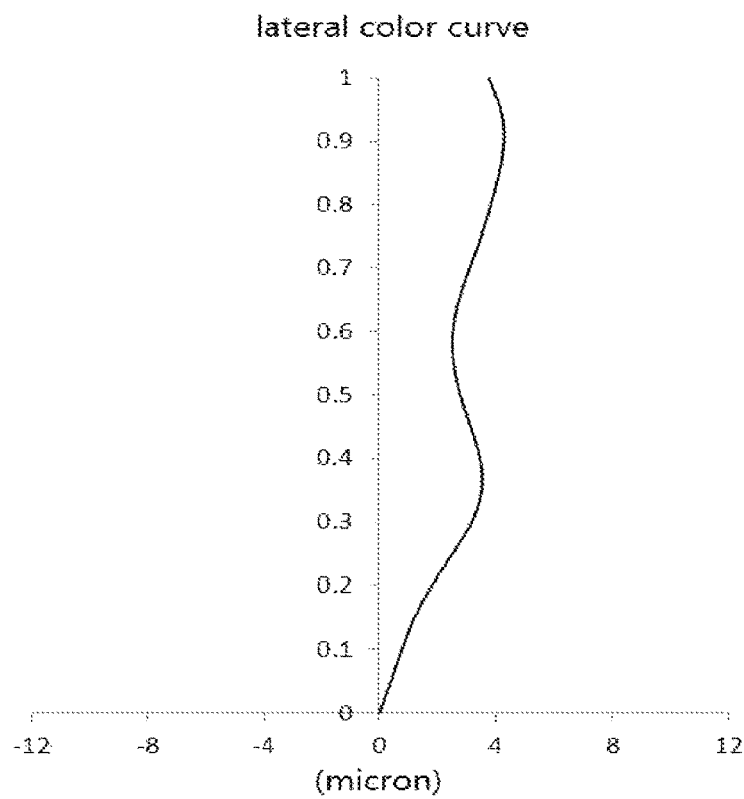

FIG. 22A shows a longitudinal aberration curve of the optical imaging lens according to embodiment 11 to represent deviation of a convergence focal point after light with different wavelengths passes through the lens. FIG. 22B shows an astigmatism curve of the optical imaging lens according to embodiment 11 to represent a meridian image surface curvature and a sagittal image surface curvature. FIG. 22C shows a distortion curve of the optical imaging lens according to embodiment 11 to represent distortion values corresponding to different fields of view. FIG. 22D illustrates a lateral color curve of the optical imaging lens according to embodiment 11 to represent deviation of different image heights on the imaging surface after the light passes through the lens. According to FIG. 22A to FIG. 22D, it can be seen that the optical imaging lens provided in embodiment 11 may achieve high imaging quality.

Embodiment 12

Figure 23:
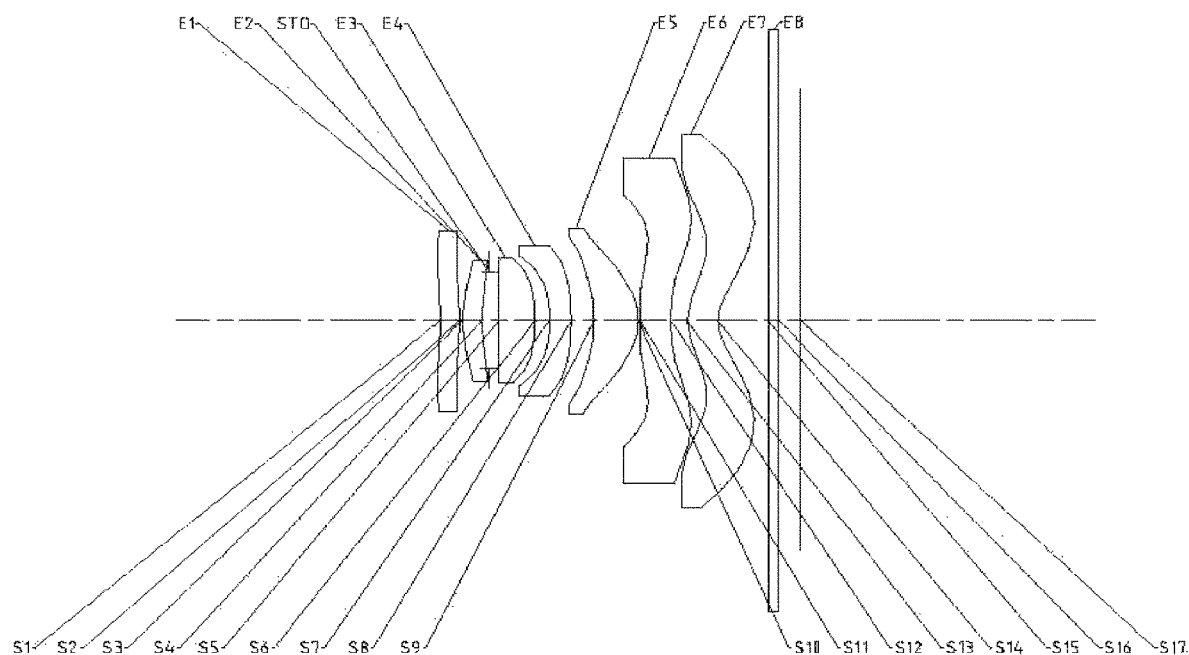
FIG. 23 shows a structure diagram of an optical imaging lens according to embodiment 12 of the disclosure.

An optical imaging lens according to embodiment 12 of the disclosure is described below with reference to FIG. 23 to FIG. 24D. FIG. 23 shows a structure diagram of an optical imaging lens according to embodiment 12 of the disclosure.

As shown in FIG. 23, the optical imaging lens sequentially includes, from an object side to an image side along an optical axis, a first lens E1, a second lens E2, a diaphragm STO, a third lens E3, a fourth lens E4, a fifth lens E5, a sixth lens E6, a seventh lens E7, an optical filter E8 and an imaging surface S17.

The first lens E1 has positive refractive power, an object-side surface S1 thereof is a concave surface, while an image-side surface S2 is a convex surface. The second lens E2 has positive refractive power, an object-side surface S3 thereof is a convex surface, while an image-side surface S4 is a concave surface. The third lens E3 has positive refractive power, an object-side surface S5 thereof is a convex surface, while an image-side surface S6 is a convex surface. The fourth lens E4 has negative refractive power, an object-side surface S7 thereof is a concave surface, while an image-side surface S8 is a convex surface. The fifth lens E5 has positive refractive power, an object-side surface S9 thereof is a concave surface, while an image-side surface S10 is a convex surface. The sixth lens E6 has negative refractive power, an object-side surface S11 thereof is a concave surface, while an image-side surface S12 is a concave surface. The seventh lens E7 has negative refractive power, an object-side surface S13 thereof is a convex surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

Table 23 is a basic parameter table of the optical imaging lens of embodiment 12, and units of the curvature radius, the thickness and the focal length are all millimeter (mm). Table 24 shows high-order coefficients applied to each aspherical mirror surface in embodiment 12. A surface type of each aspherical surface may be defined by formula (1) given in embodiment 1.

TABLE 23

Embodiment 12: f = 4.20 mm, TTL = 7.10 mm, ImgH = 5.35 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| S1 | Aspherical | −7.9917 | 0.3808 | 1.65 | 23.53 | 30.58 | −95.0000 |
| S2 | Aspherical | −5.7925 | 0.0400 | | | | −95.0000 |
| S3 | Aspherical | 2.9811 | 0.3781 | 1.55 | 56.11 | 31.42 | −8.0562 |
| S4 | Aspherical | 3.4466 | 0.1617 | | | | −44.4213 |
| STO | Spherical | Infinite | 0.1813 | | | | |
| S5 | Aspherical | 14.7796 | 0.7161 | 1.55 | 56.11 | 7.21 | −53.3742 |
| S6 | Aspherical | −5.2749 | 0.2863 | | | | 11.0532 |
| S7 | Aspherical | −4.8131 | 0.4249 | 1.68 | 19.25 | −17.99 | 8.6447 |
| S8 | Aspherical | −8.2375 | 0.4587 | | | | 14.6573 |
| S9 | Aspherical | −5.2141 | 0.8702 | 1.55 | 56.11 | 4.48 | 5.1693 |
| S10 | Aspherical | −1.7636 | 0.0400 | | | | −1.6598 |
| S11 | Aspherical | −34.2607 | 0.5999 | 1.67 | 20.37 | −9.06 | 94.6282 |
| S12 | Aspherical | 7.3830 | 0.3177 | | | | −1.8964 |
| S13 | Aspherical | 1.3991 | 0.6081 | 1.53 | 55.87 | −23.73 | −4.8943 |
| S14 | Aspherical | 1.0692 | 0.9921 | | | | −3.1052 |
| S15 | Aspherical | Infinite | 0.2100 | 1.52 | 64.17 | | |
| S16 | Aspherical | Infinite | 0.4341 | | | | |
| S17 | Spherical | Infinite | Infinite | | | | |

TABLE 24

| Surface number | A4 | A6 | A8 | A10 | A12 |
|---|---|---|---|---|---|
| S1 | 3.4073E−03 | 3.3166E−03 | −1.3323E−03 | 2.2225E−04 | −1.3541E−05 |
| S2 | 1.6780E−03 | 7.3124E−03 | −3.4163E−03 | 6.5839E−04 | −3.9773E−05 |
| S3 | 3.4071E−02 | −5.0845E−02 | 3.8493E−02 | −1.8174E−02 | −1.4516E−03 |
| S4 | 7.2671E−02 | −1.6636E−01 | 2.2019E−01 | −2.0988E−01 | 1.1844E−01 |
| S5 | −1.4600E−02 | 9.0589E−04 | −2.0912E−02 | 2.4897E−02 | −1.0930E−02 |
| S6 | −3.3988E−02 | 1.1187E−02 | −4.7054E−02 | 7.2106E−02 | −6.5136E−02 |
| S7 | −6.244 IE−02 | 3.3339E−02 | −6.9648E−02 | 8.2885E−02 | −7.3130E−02 |
| S8 | −4.3146E−02 | 3.5159E−02 | −1.9858E−02 | −2.8014E−03 | 1.1496E−02 |
| S9 | −7.4825E−02 | 5.4658E−02 | 1.4089E−02 | −3.8704E−02 | 2.445 IE−02 |
| S10 | −6.0907E−02 | 7.4980E−02 | −5.7864E−02 | 2.9192E−02 | −9.4831E−03 |
| S11 | 7.3656E−02 | −2.1707E−02 | −2.2765E−03 | 2.9997E−03 | −9.4849E−04 |
| S12 | 5.6259E−02 | −2.6889E−02 | 6.0398E−03 | −8.5666E−04 | 7.7786E−05 |
| S13 | −6.3423E−03 | −1.3318E−02 | 4.4198E−03 | −7.7048E−04 | 8.5913E−05 |
| S14 | −2.0386E−02 | −9.3972E−04 | 1.0326E−03 | −2.3810E−04 | 2.9326E−05 |

| Surface number | A14 | A16 | A18 | A20 |
|---|---|---|---|---|
| S1 | 0.0000E+00 | 0.0000E+00 | 0.0000E+00 | 0.0000E+00 |
| S2 | 0.0000E+00 | 0.0000E+00 | 0.0000E+00 | 0.0000E+00 |
| S3 | 4.0307E−03 | −8.5502E−04 | 0.0000E+00 | 0.0000E+00 |
| S4 | −3.3762E−02 | 3.8361E−03 | 0.0000E+00 | 0.0000E+00 |
| S5 | −5.7271E−03 | 7.3943E−03 | −1.8467E−03 | 0.0000E+00 |
| S6 | 3.5631E−02 | −1.0908E−02 | 1.4599E−03 | 0.0000E+00 |
| S7 | 4.8969E−02 | −2.1358E−02 | 4.9698E−03 | −4.2350E−04 |
| S8 | −7.8199E−03 | 2.6812E−03 | −4.9025E−04 | 3.9070E−05 |
| S9 | −8.1773E−03 | 1.5614E−03 | −1.5893E−04 | 6.5809E−06 |
| S10 | 1.7871E−03 | −1.3907E−04 | −5.3019E−06 | 1.0628E−06 |
| S11 | 1.6424E−04 | −1.6633E−05 | 9.2152E−07 | −2.1525E−08 |
| S12 | −4.3655E−06 | 1.4199E−07 | −2.3502E−09 | 1.4272E−11 |
| S13 | −6.1772E−06 | 2.7442E−07 | −6.8261E−09 | 7.2628E−11 |
| S14 | −2.1000E−06 | 8.6754E−08 | −1.9062E−09 | 1.7139E−11 |

Figure 24A:
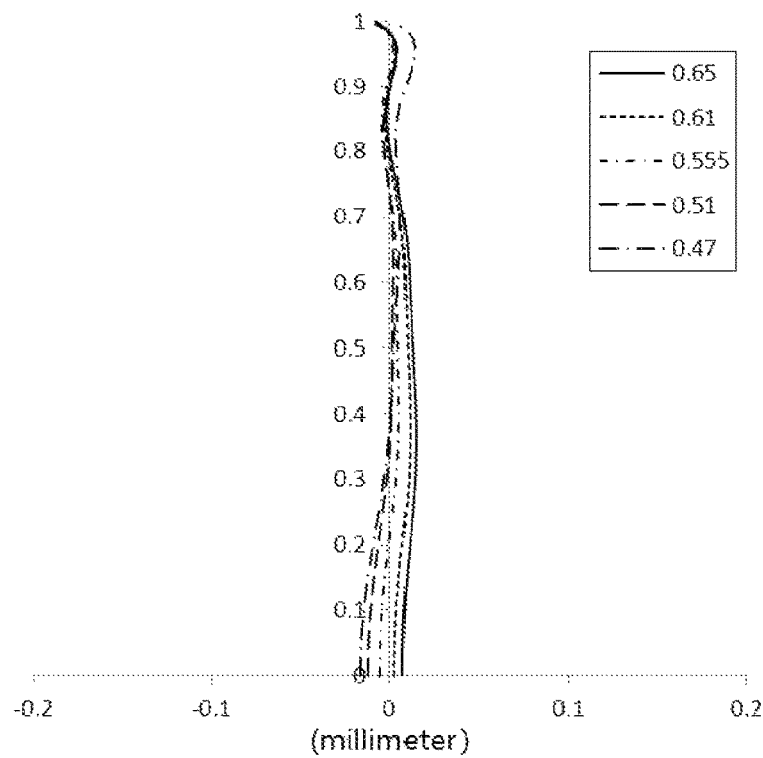
FIG. 24A to FIG. 24D show a longitudinal aberration curve, an astigmatism curve, a distortion curve and a lateral color curve of an optical imaging lens according to embodiment 12 respectively.
Figure 24B:
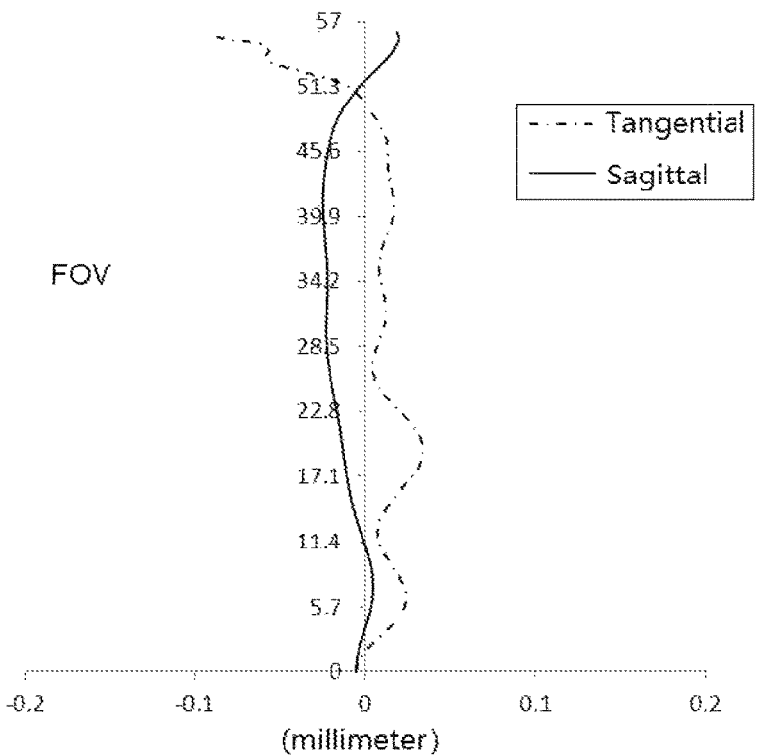
Figure 24C:
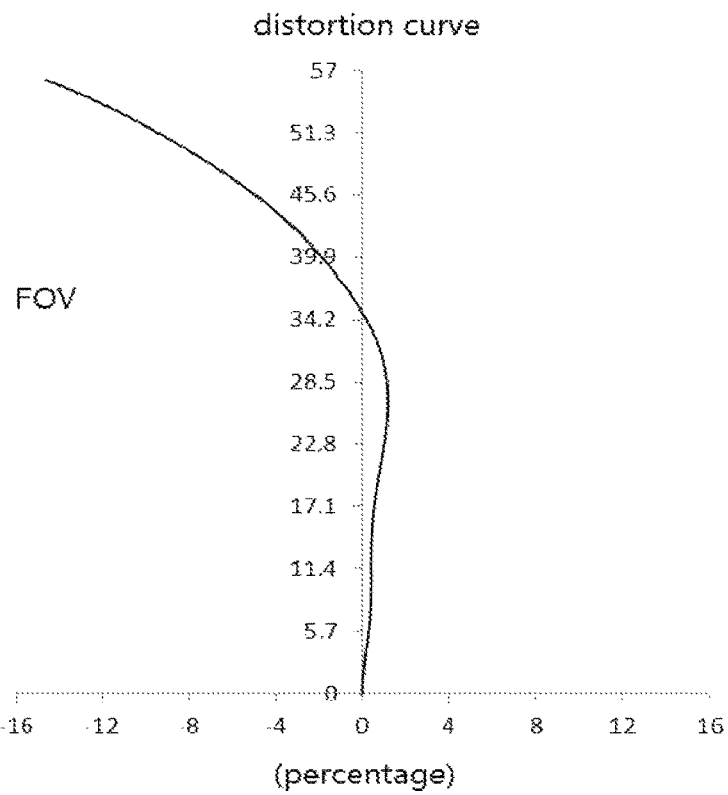
Figure 24D:
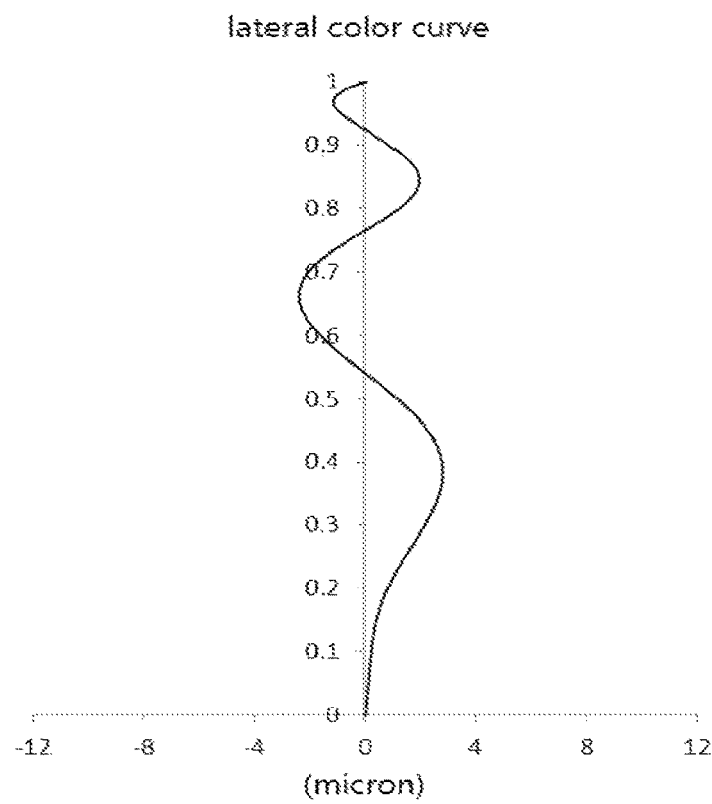

FIG. 24A shows a longitudinal aberration curve of the optical imaging lens according to embodiment 12 to represent deviation of a convergence focal point after light with different wavelengths passes through the lens. FIG. 24B shows an astigmatism curve of the optical imaging lens according to embodiment 12 to represent a meridian image surface curvature and a sagittal image surface curvature. FIG. 24C shows a distortion curve of the optical imaging lens according to embodiment 12 to represent distortion values corresponding to different fields of view. FIG. 24D illustrates a lateral color curve of the optical imaging lens according to embodiment 12 to represent deviation of different image heights on the imaging surface after the light passes through the lens. According to FIG. 24A to FIG. 24D, it can be seen that the optical imaging lens provided in embodiment 12 may achieve high imaging quality.

From the above, embodiment 1 to embodiment 12 meet a relationship shown in Table 25 respectively.

TABLE 25

| Conditional expression/ embodiment | 1 | 2 | 3 | 4 | 5 | 6 | 7 | 8 | 9 | 10 | 11 | 12 |
|---|---|---|---|---|---|---|---|---|---|---|---|---|
| R4/f | 0.96 | 1.10 | 1.12 | 1.04 | 1.00 | 1.07 | 1.06 | 1.16 | 1.08 | 1.11 | 1.21 | 0.82 |
| FOV (°) | 102.4 | 103.2 | 102.1 | 97.3 | 99.8 | 100.0 | 100.3 | 99.1 | 98.4 | 104.3 | 107.6 | 112.3 |
| TTL/(ImgH × 2) | 0.64 | 0.64 | 0.60 | 0.68 | 0.66 | 0.65 | 0.65 | 0.65 | 0.64 | 0.64 | 0.65 | 0.66 |
| f/f2 | 0.36 | 0.40 | 0.40 | 0.42 | 0.40 | 0.43 | 0.41 | 0.52 | 0.39 | 0.38 | 0.36 | 0.13 |
| f/f3 | 0.55 | 0.55 | 0.53 | 0.59 | 0.58 | 0.57 | 0.57 | 0.54 | 0.57 | 0.55 | 0.53 | 0.58 |
| f5/R9 | −0.57 | −0.43 | −0.49 | −0.44 | −0.47 | −0.46 | −0.33 | −0.42 | −0.66 | −0.45 | −0.46 | −0.86 |
| \|R8 − R7\|/\|R8 + R7\| | 0.50 | 0.45 | 0.43 | 0.45 | 0.43 | 0.44 | 0.46 | 0.45 | 0.43 | 0.45 | 0.44 | 0.26 |
| f/R6 | −0.73 | −0.84 | −0.85 | −0.89 | −0.76 | −0.88 | −0.88 | −0.87 | −0.85 | −0.83 | −0.79 | −0.80 |
| T23/CT3 | 0.64 | 0.58 | 0.61 | 0.60 | 0.58 | 0.59 | 0.60 | 0.61 | 0.58 | 0.57 | 0.57 | 0.48 |
| DT11/DT71 | 0.45 | 0.46 | 0.47 | 0.48 | 0.47 | 0.48 | 0.47 | 0.47 | 0.47 | 0.45 | 0.44 | 0.52 |
| T12/T34 | 0.10 | 0.10 | 0.09 | 0.26 | 0.10 | 0.12 | 0.09 | 0.24 | 0.24 | 0.10 | 0.12 | 0.14 |
| f/EPD | 1.88 | 1.88 | 1.88 | 1.91 | 1.80 | 1.87 | 1.87 | 1.88 | 1.89 | 1.88 | 1.95 | 1.87 |
| R14/R13 | 0.61 | 0.68 | 0.64 | 0.63 | 0.63 | 0.64 | 0.61 | 0.66 | 0.65 | 0.66 | 0.70 | 0.76 |

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned optical imaging lens.

The above description is only description about the preferred embodiments of the disclosure and adopted technical principles. It is understood by those skilled in the art that the scope of the disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens, sequentially comprising, from an object side to an image side along an optical axis:
   a first lens with refractive power;
   a second lens with positive refractive power;
   a third lens with positive refractive power, wherein an image-side surface thereof is a convex surface;
   a fourth lens with refractive power, wherein an object-side surface thereof is a concave surface;
   a fifth lens with positive refractive power, wherein an object-side surface thereof is a concave surface;
   a sixth lens with refractive power; and
   a seventh lens with refractive power, wherein
   a total effective focal length f of the optical imaging lens and a curvature radius R4 of an image-side surface of the second lens meet $0.6<R4/f<1.5$; and
   TTL is a distance from an object-side surface of the first lens to an imaging surface of the optical imaging lens on the optical axis, and ImgH is a half of a diagonal length of an effective pixel region on the imaging surface of the optical imaging lens, TTL and ImgH meet $0.55<TTL/(ImgH\times2)<0.75$.

2. The optical imaging lens as claimed in claim 1, wherein the total effective focal length f of the optical imaging lens and an effective focal length f2 of the second lens meet $0<f/f2<0.8$.

3. The optical imaging lens as claimed in claim 1, wherein the total effective focal length f of the optical imaging lens and an effective focal length f3 of the third lens meet $0.2<f/f3<0.7$.

4. The optical imaging lens set as claimed in claim 1, wherein a maximum effective radius DT11 of the object-side surface of the first lens and a maximum effective radius DT71 of an object-side surface of the seventh lens meet $0.2<DT11/DT71<0.7$.

5. The optical imaging lens as claimed in claim 1, wherein a center thickness CT3 of the third lens on the optical axis and an air space T23 of the second lens and the third lens on the optical axis meet $0.1<T23/CT3<0.9$.

6. The optical imaging lens as claimed in claim 1, wherein an air space T12 of the first lens and the second lens on the optical axis and an air space T34 of the third lens and the fourth lens on the optical axis meet $0<T12/T34<0.4$.

7. The optical imaging lens as claimed in claim 1, wherein an effective focal length f5 of the fifth lens and a curvature radius R9 of the object-side surface of the fifth lens meet $-1<f5/R9<0$.

8. The optical imaging lens as claimed in claim 1, wherein a curvature radius R7 of the object-side surface of the fourth lens and a curvature radius R8 of an image-side surface of the fourth lens meet $0<|R8-R7|/|R8+R7|\leq0.5$.

9. The optical imaging lens as claimed in claim 1, wherein the total effective focal length f of the optical imaging lens and a curvature radius R6 of an image-side surface of the third lens meet $-1<f/R6<-0.5$.

10. The optical imaging lens as claimed in claim 1, wherein a curvature radius R13 of an object-side surface of the seventh lens and a curvature radius R14 of an image-side surface of the seventh lens meet $0.4<R14/R13<0.9$.

11. The optical imaging lens as claimed in claim 1, wherein the total effective focal length f of the optical imaging lens and an entrance pupil diameter (EPD) of the optical imaging lens meet $f/EPD<2$.

12. The optical imaging lens as claimed in claim 1, wherein a maximum field of view (FOV) of the optical imaging lens meets $FOV>90°$.

13. An optical imaging lens, sequentially comprising, from an object side to an image side along an optical axis:
    a first lens with refractive power;
    a second lens with positive refractive power;
    a third lens with positive refractive power, wherein an image-side surface thereof is a convex surface;
    a fourth lens with refractive power, wherein an object-side surface thereof is a concave surface;
    a fifth lens with positive refractive power, wherein an object-side surface thereof is a concave surface;
    a sixth lens with refractive power; and
    a seventh lens with refractive power, wherein
    a maximum effective radius DT11 of an object-side surface of the first lens and a maximum effective radius DT71 of an object-side surface of the seventh lens meet $0.2<DT11/DT71<0.7$.

14. The optical imaging lens as claimed in claim 13, wherein a total effective focal length f of the optical imaging lens and an effective focal length f2 of the second lens meet $0<f/f2<0.8$.

15. The optical imaging lens as claimed in claim 13, wherein a total effective focal length f of the optical imaging lens and an effective focal length f3 of the third lens meet $0.2<f/f3<0.7$.

16. The optical imaging lens as claimed in claim 13, wherein a center thickness CT3 of the third lens on the optical axis and an air space T23 of the second lens and the third lens on the optical axis meet $0.1<T23/CT3<0.9$.

17. The optical imaging lens as claimed in claim 13, wherein an air space T12 of the first lens and the second lens on the optical axis and an air space T34 of the third lens and the fourth lens on the optical axis meet $0<T12/T34<0.4$.

18. The optical imaging lens as claimed in claim 13, wherein an effective focal length f5 of the fifth lens and a curvature radius R9 of the object-side surface of the fifth lens meet $-1<f5/R9<0$.

19. The optical imaging lens as claimed in claim 13, wherein a curvature radius R7 of the object-side surface of the fourth lens and a curvature radius R8 of an image-side surface of the fourth lens meet $0<|R8-R7|/|R8+R7|\leq0.5$.

20. The optical imaging lens as claimed in claim 13, wherein a total effective focal length f of the optical imaging lens and a curvature radius R6 of the image-side surface of the third lens meet $-1<f/R6<-0.5$.

* * * * *